United States Patent
Cooley et al.

(10) Patent No.: US 9,206,672 B2
(45) Date of Patent: Dec. 8, 2015

(54) INERTIAL ENERGY GENERATOR FOR SUPPLYING POWER TO A DOWNHOLE TOOL

(71) Applicant: FastCAP SYSTEMS Corporation, Boston, MA (US)

(72) Inventors: John J. Cooley, Boston, MA (US); Riccardo Signorelli, Cambridge, MA (US); Joseph Lane, Cambridge, MA (US)

(73) Assignee: FastCAP Systems Corporation, Boston, MA (US)

( * ) Notice: Subject to any disclaimer, the term of this patent is extended or adjusted under 35 U.S.C. 154(b) by 346 days.

(21) Appl. No.: 13/843,765

(22) Filed: Mar. 15, 2013

(65) Prior Publication Data
US 2014/0265580 A1    Sep. 18, 2014

(51) Int. Cl.
*E21B 41/00*    (2006.01)
*F03G 7/08*    (2006.01)
*H02K 7/18*    (2006.01)
*G05F 3/06*    (2006.01)

(52) U.S. Cl.
CPC .............. *E21B 41/0085* (2013.01); *F03G 7/08* (2013.01); *H02K 7/1853* (2013.01); *Y10T 307/522* (2015.04)

(58) Field of Classification Search
USPC ......................................................... 307/151
See application file for complete search history.

(56) References Cited

U.S. PATENT DOCUMENTS

| | | |
|---|---|---|
| 3,448,305 A | 6/1969 | Raynal et al. |
| 4,491,738 A | 1/1985 | Kamp |
| 5,839,508 A | 11/1998 | Tubel et al. |
| 5,923,619 A | 7/1999 | Knapen et al. |
| 6,265,793 B1 | 7/2001 | Korenaga |
| 6,504,258 B2 | 1/2003 | Schultz et al. |
| 6,538,349 B1 | 3/2003 | Lee et al. |
| 6,691,802 B2 | 2/2004 | Schultz et al. |
| 6,700,229 B2 | 3/2004 | Sadarangani et al. |
| 6,739,413 B2 | 5/2004 | Sharp et al. |
| 6,768,214 B2 | 7/2004 | Schultz et al. |
| 6,914,341 B1 | 7/2005 | McIntyre et al. |
| 7,025,152 B2 | 4/2006 | Sharp et al. |
| 7,141,901 B2 | 11/2006 | Spring |
| 7,168,510 B2 | 1/2007 | Boyle et al. |
| 7,199,480 B2 | 4/2007 | Fripp et al. |
| 7,208,845 B2 | 4/2007 | Masters et al. |
| 7,242,103 B2 | 7/2007 | Tips |
| 7,347,283 B1 | 3/2008 | Sharp et al. |
| 7,400,262 B2 | 7/2008 | Chemali et al. |
| 7,420,287 B2 | 9/2008 | Smushkovich |
| 7,453,163 B2 | 11/2008 | Roberts et al. |
| 7,498,681 B1 | 3/2009 | Kellogg et al. |

(Continued)

OTHER PUBLICATIONS

Trimble, "Energy Harvesting of Random Wide-band Vibrations with Applications to an Electro-Magnetic Rotational Energy Harvester," PhD Thesis, Massachusetts Institute of Technology.

(Continued)

*Primary Examiner* — Robert Deberadinis
(74) *Attorney, Agent, or Firm* — Wolf, Greenfield & Sacks, P.C.

(57) ABSTRACT

A downhole power supply is provided that includes an energy storage adapted to operate at high temperatures, and a rotary inertial energy generator to capture the shock energy and vibrational energy of downhole movement of the drill string. The energy storage may include at least one ultracapacitor.

25 Claims, 24 Drawing Sheets

(56) References Cited

U.S. PATENT DOCUMENTS

| | | | |
|---|---|---|---|
| 7,514,804 B2 | 4/2009 | Wang | |
| 7,692,366 B2 | 4/2010 | Thiesen | |
| 7,810,582 B2 | 10/2010 | Webb | |
| 7,906,861 B2 | 3/2011 | Guerrero et al. | |
| 7,999,402 B2 | 8/2011 | Freeland et al. | |
| 8,127,833 B2 | 3/2012 | Pabon et al. | |
| 8,234,932 B2 | 8/2012 | Tips | |
| 8,350,394 B2 | 1/2013 | Cottone et al. | |
| 8,471,439 B2 | 6/2013 | Moon et al. | |
| 8,508,193 B2 | 8/2013 | Keating et al. | |
| 8,604,634 B2 | 12/2013 | Pabon et al. | |
| 8,629,569 B2 | 1/2014 | Roberts et al. | |
| 8,680,694 B2 | 3/2014 | Parker et al. | |
| 8,770,292 B2 | 7/2014 | McClung, III | |
| 2001/0006108 A1 | 7/2001 | Brett et al. | |
| 2004/0144570 A1 | 7/2004 | Spring | |
| 2005/0218728 A1 | 10/2005 | Stewart et al. | |
| 2005/0225181 A1 | 10/2005 | Tu et al. | |
| 2006/0175838 A1 | 8/2006 | Tips | |
| 2007/0040384 A1 | 2/2007 | Bernhoff et al. | |
| 2007/0228736 A1 | 10/2007 | Smushkovich | |
| 2008/0074083 A1 | 3/2008 | Yarger et al. | |
| 2008/0296984 A1 | 12/2008 | Honma et al. | |
| 2008/0303357 A1 | 12/2008 | Battlogg et al. | |
| 2009/0011330 A1 | 1/2009 | Onodera et al. | |
| 2009/0021890 A1 | 1/2009 | Bourcier et al. | |
| 2009/0127976 A1 | 5/2009 | Ward et al. | |
| 2009/0146508 A1 | 6/2009 | Peng et al. | |
| 2009/0250409 A1 | 10/2009 | Fiene et al. | |
| 2009/0272935 A1 | 11/2009 | Hata et al. | |
| 2009/0272946 A1 | 11/2009 | Lu | |
| 2009/0294753 A1 | 12/2009 | Hauge et al. | |
| 2009/0303658 A1 | 12/2009 | Hiroyuki et al. | |
| 2010/0046142 A1 | 2/2010 | Aitchison et al. | |
| 2010/0119934 A1 | 5/2010 | Ushio et al. | |
| 2010/0134955 A1 | 6/2010 | O'Connor et al. | |
| 2010/0194117 A1 | 8/2010 | Pabon et al. | |
| 2010/0196600 A1 | 8/2010 | Shibuya et al. | |
| 2010/0308599 A1 | 12/2010 | Pabon et al. | |
| 2011/0004444 A1 | 1/2011 | Farrow et al. | |
| 2011/0080689 A1 | 4/2011 | Bielawski et al. | |
| 2011/0085285 A1 | 4/2011 | Zednicek et al. | |
| 2011/0141661 A1 | 6/2011 | Muthu et al. | |
| 2011/0150736 A1 | 6/2011 | Hagiwara et al. | |
| 2011/0151317 A1 | 6/2011 | Giroud et al. | |
| 2011/0170236 A1 | 7/2011 | Young | |
| 2011/0233936 A1 | 9/2011 | Pabon et al. | |
| 2012/0154979 A1 | 6/2012 | Signorelli et al. | |
| 2012/0313586 A1 | 12/2012 | Signorelli et al. | |
| 2013/0026978 A1 | 1/2013 | Cooley et al. | |
| 2013/0029215 A1 | 1/2013 | Signorelli et al. | |
| 2013/0044130 A1 | 2/2013 | Geisner et al. | |
| 2013/0044405 A1 | 2/2013 | Brambilla et al. | |
| 2013/0045157 A1 | 2/2013 | Brambilla et al. | |
| 2013/0141840 A1 | 6/2013 | Cooley et al. | |
| 2014/0021825 A1 | 1/2014 | Ocalan et al. | |
| 2014/0042988 A1 | 2/2014 | Kuttipillai | |
| 2014/0057164 A1 | 2/2014 | Brambilla et al. | |
| 2014/0167422 A1 | 6/2014 | Murphree et al. | |
| 2014/0265565 A1 | 9/2014 | Cooley et al. | |
| 2014/0265580 A1 | 9/2014 | Cooley et al. | |

OTHER PUBLICATIONS

Trimble, "Downhole vibration sensing by vibration energy harvesting," Masters Thesis, Massachusetts Institute of Technology.
International Search Report from PCT/US2007/068314, mailed Feb. 13, 2008.
International Search Report from PCT/US2012/039342, mailed Dec. 6, 2012.
International Search Report from PCT/US2012/041438, mailed Nov. 19, 2012.
International Search Report from PCT/US2012/045994, mailed Jan. 25, 2013.
International Search Report from PCT/US2012/047474, mailed Jan. 31, 2013.
International Search Report from PCT/US2013/027697, mailed Jun. 26, 2013.
International Search Report from PCT/US2014/02992, mailed Oct. 7, 2014.
International Search Report from PCT/US2014/030310, mailed Oct. 10, 2014.
Written Opinion of the International Searching Authority from PCT/US2007/068314, mailed Feb. 13, 2008.
Written Opinion of the International Searching Authority from PCT/US2012/039342, mailed Dec. 6, 2012.
Written Opinion of the International Searching Authority from PCT/US2012/041438, mailed Nov. 19, 2012.
Written Opinion of the International Searching Authority from PCT/US2012/045994, mailed Dec. 26, 2012.
Written Opinion of the International Searching Authority from PCT/US2012/047474, mailed Jan. 27, 2014.
Written Opinion of the International Searching Authority from PCT/US2013/027697, mailed Jun. 26, 2013.
Written Opinion of the International Searching Authority from PCT/US2012/027697, mailed Mar. 25, 2013.
International search Report of the International Searching Authority from PCT/US2012/027697, mailed Mar. 21, 2013.

Primary Structures of Cations

Power Converter - 181

Power Converter - 181

Power Converter - 181

INERTIAL ENERGY GENERATOR FOR SUPPLYING POWER TO A DOWNHOLE TOOL

BACKGROUND OF THE INVENTION

1. Field of the Invention

The invention herein is directed to providing power to instruments in a downhole environment.

2. Description of the Related Art

As people and companies continue to search for and extract oil, the quest for hydrocarbons has grown increasingly complex. For example, it is well known that the "easy oil" is generally gone, and exploration now requires searching to greater depths than ever before by drilling a wellbore deep into the Earth. While drilling of the wellbore permits individuals and companies to evaluate sub-surface materials and to extract desired hydrocarbons, many problems are encountered in these harsh environments, where downhole temperatures may range up to or in excess of 300 degrees Celsius.

As well drilling and logging plunges ever deeper into the Earth's crust, the exposure of downhole tooling to high temperature environments continues to increase. Moreover, present day instrumentation is generally not built to operate in such an environment, and will fail well before reaching ambient temperatures within this range. This complication has given rise to all sorts of complex instrumentation. Consistent with other segments of technology, increasing complexity of instrumentation presents users with increasing power demands.

In particular, elevated temperatures often present technical limitations where conventional systems fail. For example, conventional power systems comprising electronics and energy storage will fail at temperatures found in downhole environments either due to degradation or destruction of the conventional energy storage or of the conventional electronics. Moreover, improved instrumentation systems often demand greater capabilities of power systems.

As such, there is a growing need for power systems comprising an energy storage device for downhole operations in high temperature environments up to about 200 degrees Celsius, or higher. Preferably, the energy storage device would provide users with power where conventional devices fail to provide useful power.

BRIEF SUMMARY OF THE INVENTION

Accordingly, the present invention provides a downhole power supply that includes an energy storage adapted to operate at high temperatures, and a rotary inertial energy generator to capture the shock energy and vibrational energy of downhole movement of the drill string. The energy storage may include at least one ultracapacitor, e.g., as described herein.

In one aspect, the invention provides a rotational inertial energy generator (RIEG) comprising an inertial mass rotating around a central axis; a ratcheting assembly that prevents the mass from rotating in one direction while providing a free-wheeling motion in the other direction; and a rotor/stator assembly, wherein the rotation translates the shock and vibration energy of the inertial mass into electrical power.

In another aspect, the invention provides a power supply adapted to supply power to a downhole tool, the power supply comprising: an energy generator coupled to a control circuit and a rechargeable energy storage device that is configured to operate at a temperature within a temperature range between about minus 40 degrees Celsius to about 210 degrees Celsius; wherein the energy generator comprises a rotary inertial energy generator (RIEG) that is configured for translating shock and vibration energy experienced by the RIEG, into electrical energy; and wherein the control circuit is configured for receiving electrical energy from the RIEG and storing the electrical energy in the rechargeable energy storage device.

In another aspect, the invention provides a power supply adapted to supply power to a downhole tool, the power supply comprising: an energy generator coupled to a control circuit and a rechargeable energy storage device that is configured to operate at a temperature within a temperature range between about minus 40 degrees Celsius to about 210 degrees Celsius; wherein the energy generator comprises a directionally biased rotary inertial energy generator (RIEG) that is configured for translating shock and vibration energy experienced by the RIEG, in a directionally biased manner into electrical energy; and wherein the control circuit is configured for receiving electrical energy from the RIEG and storing the electrical energy in the rechargeable energy storage device.

In another aspect, the invention provides a power supply adapted to supply power to a downhole tool, the power supply comprising: a plurality of energy generators coupled to a control circuit and a rechargeable energy storage device that is configured to operate at a temperature within a temperature range between about minus 40 degrees Celsius to about 210 degrees Celsius; wherein each energy generator comprises a rotary inertial energy generator (RIEG) that is configured for translating shock and vibration energy experienced by the RIEG, e.g., in the downhole environment, into electrical energy; and wherein the control circuit is configured for receiving electrical energy from the RIEG and storing the electrical energy in the rechargeable energy storage device.

In another aspect, the invention provides a method of generating power comprising rotating an inertial mass around a central axis, preventing the mass from rotating in one direction while providing a free-wheeling motion in the other direction with a ratcheting assembly; and translating the shock and vibration energy of the inertial mass into electrical power, such that power is generated.

In another aspect, the invention provides a method of providing power to a load comprising rotating an inertial mass around a central axis, preventing the mass from rotating in one direction while providing a free-wheeling motion in the other direction with a ratcheting assembly; translating the shock and vibration energy of the inertial mass into electrical power, and delivering the electrical power to an electrically coupled load, such that power is provided to the load.

Other advantages and novel features will become apparent from the following detailed description of various non-limiting embodiments when considered in conjunction with the accompanying figures. In cases where the present specification and a document incorporated by reference include conflicting and/or inconsistent disclosure, the present specification shall control.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings. The accompanying figures are schematic and are not intended to be drawn to scale. In the figures, each identical or nearly identical component illustrated is typically represented by a single numeral. For purposes of clarity, not every component is labeled in every figure, nor is every component of each embodiment shown where illustration is not necessary to allow those of ordinary skill in the art to understand the invention. In the figures:

DETAILED DESCRIPTION OF THE INVENTION

Disclosed herein are various configurations of a downhole power supply that includes an energy storage adapted to operate at high temperatures, and a rotary inertial energy generator to capture the shock energy and vibrational energy of downhole movement of the drill string. The power supply systems provide users with greater capabilities than previously achieved downhole. Such systems, while shown specifically for use in downhole environments, may be used for any application where similar environments exist, such as engine compartments of planes, cars, etc, or energy production plants/turbines. However, in order to provide context for the downhole power supply systems and methods for use, some background information and definitions are provided.

Figure 1:
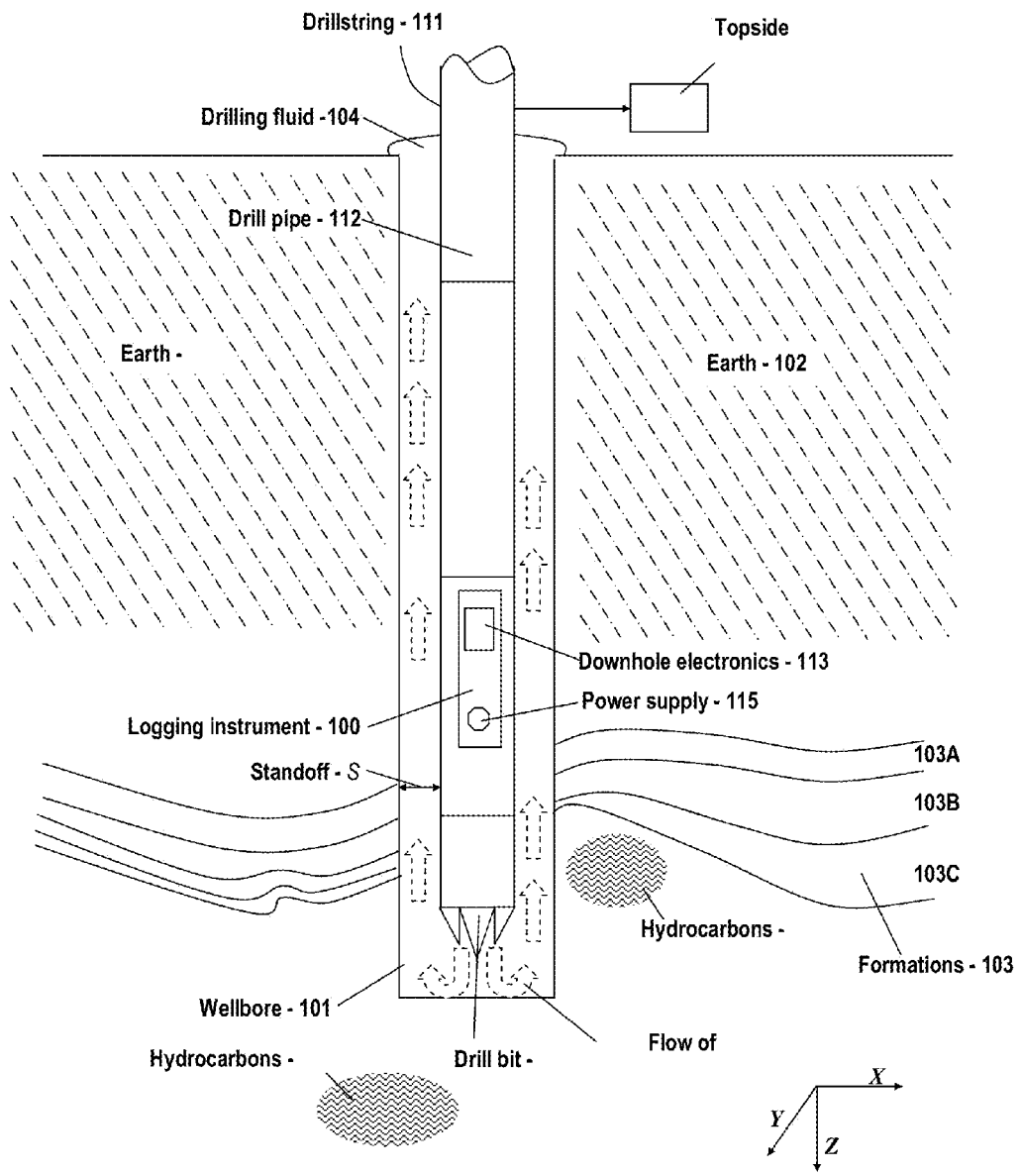
FIG. 1 illustrates an exemplary embodiment of a drill string that includes a logging instrument.

Refer now to FIG. 1 where aspects of an apparatus for drilling a wellbore 101 (also referred to as a "borehole") are shown. As a matter of convention, a depth of the wellbore 101 is described along a Z-axis, while a cross-section is provided on a plane described by an X-axis and a Y-axis.

In this example, the wellbore 101 is drilled into the Earth 102 using a drill string 111 driven by a drilling rig (not shown) which, among other things, provides rotational energy and downward force. The wellbore 101 generally traverses sub-surface materials, which may include various formations 103 (shown as formations 103A, 103B, 103C). One skilled in the art will recognize that the various geologic features as may be encountered in a subsurface environment may be referred to as "formations," and that the array of materials down the borehole (i.e., downhole) may be referred to as "sub-surface materials." That is, the formations 103 are formed of sub-surface materials. Accordingly, as used herein, it should be considered that while the term "formation" generally refers to geologic formations, and "sub-surface material," includes any materials, and may include materials such as solids, fluids, gases, liquids, and the like.

In this example, the drill string 111 includes lengths of drill pipe 112 which drive a drill bit 114. The drill bit 114 also provides a flow of a drilling fluid 104, such as drilling mud. The drilling fluid 104 is often pumped to the drill bit 114 through the drill pipe 112, where the fluid exits into the wellbore 101. This results in an upward flow, F, of drilling fluid 104 within the wellbore 101. The upward flow, F, generally cools the drill string 111 and components thereof, carries away cuttings from the drill bit 114 and prevents blowout of pressurized hydrocarbons 105.

The drilling fluid 104 (also referred to as "drilling mud") generally includes a mixture of liquids such as water, drilling fluid, mud, oil, gases, and formation fluids as may be indigenous to the surroundings. Although drilling fluid 104 may be introduced for drilling operations, use or the presence of the drilling fluid 104 is neither required for nor necessarily excluded from well logging operations. Generally, a layer of materials will exist between an outer surface of the drill string 111 and a wall of the wellbore 101. This layer is referred to as a "standoff layer," and includes a thickness, referred to as "standoff, S."

The drill string 111 generally includes equipment for performing "measuring while drilling" (MWD), also referred to as "logging while drilling" (LWD). Performing MWD or LWD generally calls for operation of a logging instrument 100 that in incorporated into the drill string 111 and designed for operation while drilling. Generally, the logging instrument 100 for performing MWD is coupled to an electronics package which is also on board the drill string 111, and therefore referred to as "downhole electronics 113." Generally, the downhole electronics 113 provides for at least one of operational control and data analysis. Often, the logging instrument 100 and the downhole electronics 113 are coupled to topside equipment 107. The topside equipment 107 may be included to further control operations, provide greater analysis capabilities, and/or log data, and the like. A communications channel (not shown) may provide for communications to the topside equipment 107, and may operate via pulsed mud, wired pipe, and/or any other technologies as are known in the art.

Generally, data from the MWD apparatus provide users with enhanced capabilities. For example, data made available from MWD evolutions may be useful as inputs to geo steering (i.e., steering the drill string 111 during the drilling process) and the like.

Figure 2:
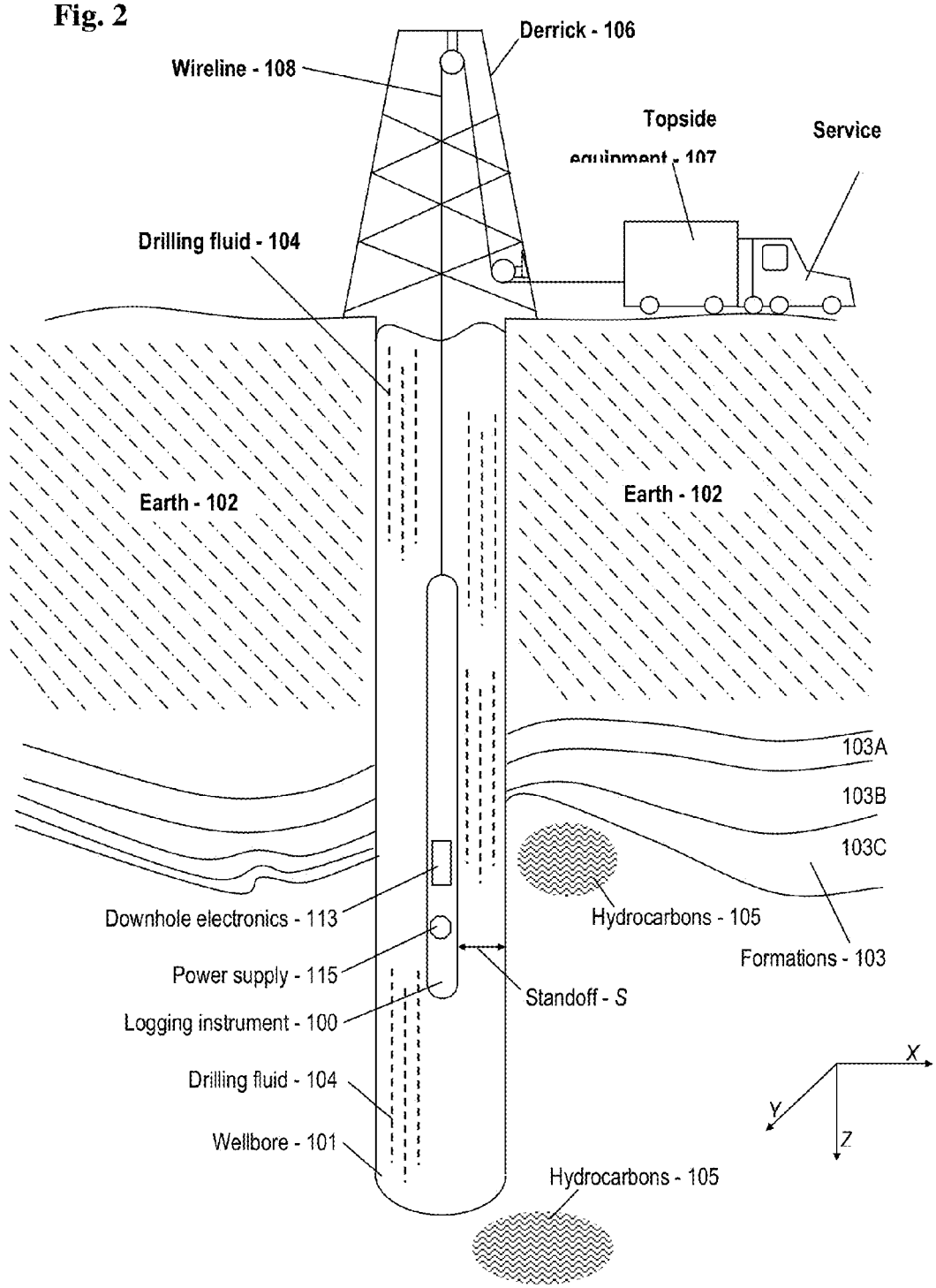
FIG. 2 illustrates an exemplary embodiment for well logging with an instrument deployed by a wireline.

Referring now to FIG. 2, an exemplary logging instrument 100 for wireline logging of the wellbore 101 is shown. As a matter of convention, a depth of the wellbore 101 is described along a Z-axis, while a cross-section is provided on a plane described by an X-axis and a Y-axis. Prior to well logging with the logging instrument 100, the wellbore 101 is drilled into the Earth 102 using a drilling apparatus, such as the one shown in FIG. 1.

In some embodiments, the wellbore 101 has been filled, at least to some extent, with drilling fluid 104. The drilling fluid 104 (also referred to as "drilling mud") generally includes a mixture of liquids such as water, drilling fluid, mud, oil, gases, and formation fluids as may be indigenous to the surroundings. Although drilling fluid 104 may be introduced for drilling operations, use or the presence of the drilling fluid 104 is neither required for nor necessarily excluded from logging operations during wireline logging. Generally, a layer of materials will exist between an outer surface of the logging instrument 100 and a wall of the wellbore 101. This layer is referred to as a "standoff layer," and includes a thickness, referred to as "standoff, S."

Generally, the logging instrument 100 is lowered into the wellbore 101 using a wireline 108 deployed by a derrick 106 or similar equipment. Generally, the wireline 108 includes suspension apparatus, such as a load bearing cable, as well as other apparatus. The other apparatus may include a power supply, a communications link (such as wired or optical) and other such equipment. Generally, the wireline 108 is conveyed from a service truck 109 or other similar apparatus (such as a service station, a base station, etc). Often, the wireline 108 is coupled to topside equipment 107. The topside equipment 107 may provide power to the logging instrument 100, as well as provide computing and processing capabilities for at least one of control of operations and analysis of data.

Generally, the logging instrument 100 includes a power supply 115. The power supply 115 may provide power to downhole electronics 113 (i.e., power consuming devices) as appropriate. Generally, the downhole electronics 113 provide measurements and/or perform sampling and/or any other sequences desired to locate, ascertain and qualify a presence of hydrocarbons 105.

The present invention, including the modular signal interface devices, and related power systems and uses thereof will be described with reference to the following definitions that, for convenience, are set forth below. Unless otherwise specified, the below terms used herein are defined as follows:

DEFINITIONS

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including," "has" and "having" are intended to be inclusive such that there may be additional elements other than the listed elements.

The language "and/or" is used herein as a convention to describe either "and" or "or" as separate embodiments. For example, in a listing of A, B, and/or C, it is intended to mean both A, B, and C; as well as A, B, or C, wherein each of A, B, or C is considered a separate embodiment, wherein the collection of each in a list is merely a convenience. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

The terms "alkenyl" and "alkynyl" are recognized in the art and refer to unsaturated aliphatic groups analogous in length and possible substitution to the alkyls described below, but that contain at least one double or triple bond respectively.

The term "alkyl" is recognized in the art and may include saturated aliphatic groups, including straight-chain alkyl groups, branched-chain alkyl groups, cycloalkyl (alicyclic) groups, alkyl substituted cycloalkyl groups, and cycloalkyl substituted alkyl groups. In certain embodiments, a straight chain or branched chain alkyl has about 20 or fewer carbon atoms in its backbone (e.g., $C_1$-$C_{20}$ for straight chain, $C_1$-$C_{20}$ for branched chain). Likewise, cycloalkyls have from about 3 to about 10 carbon atoms in their ring structure, and alternatively about 5, 6 or 7 carbons in the ring structure. Examples of alkyl groups include, but are not limited to, methyl, ethyl, propyl, butyl, pentyl, hexyl, ethyl hexyl, cyclopropyl, cyclobutyl, cyclopentyl, cyclohexyl and the like.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The expression "back EMF" is art recognized and describes the induced voltage that varies with the speed and position of the rotor.

The term "buffer" as used herein, when used in the context of a system as described herein, e.g. a power system as described herein, generally relates to a decoupling of an aspect (e.g., at least one aspect) of a first input or output of said system from one aspect of second input or output of said system. Exemplary aspects include voltage, current, power, frequency, phase, and the like. The terms buffering, buffer, power buffer, source buffer and the like as used herein generally relate to the concept of the buffer as defined above.

As used herein, the term "cell" refers to an ultracapacitor cell.

As used herein, the terms "clad," "cladding" and the like refer to the bonding together of dissimilar metals. Cladding is often achieved by extruding two metals through a die as well as pressing or rolling sheets together under high pressure. Other processes, such as laser cladding, may be used. A result is a sheet of material composed of multiple layers, where the multiple layers of material are bonded together such that the material may be worked with as a single sheet (e.g., formed as a single sheet of homogeneous material would be formed).

As a matter of convention, it may be considered that a "contaminant" may be defined as any unwanted material that may negatively affect performance of the ultracapacitor 10 if introduced. Also note, that generally herein, contaminants may be assessed as a concentration, such as in parts-per-million (ppm). The concentration may be taken as by weight, volume, sample weight, or in any other manner as determined appropriate.

As used herein, use of the term "control" with reference to the power supply generally relates to governing performance of the power supply. However, in some embodiments, "control" may be construed to provide monitoring of performance of the power supply. The monitoring may be useful, for example, for otherwise controlling aspects of use of the power supply (e.g., withdrawing the power supply when a state-of-charge indicates useful charge has been expended). Accordingly, the terms "control," "controlling" and the like should be construed broadly and in a manner that would cover such additional interpretations as may be intended or otherwise indicated.

The term "cyano" is given its ordinary meaning in the art and refers to the group, CN. The term "sulfate" is given its ordinary meaning in the art and refers to the group, $SO_2$. The term "sulfonate" is given its ordinary meaning in the art and refers to the group, $SO_3X$, where X may be an electron pair, hydrogen, alkyl or cycloalkyl. The term "carbonyl" is recognized in the art and refers to the group, C=O.

The language "downhole conditions" or "downhole environments" may be used interchangeably herein to describe the general conditions experienced for equipment subjected to environments comprising high temperatures, e.g., greater than 75 degrees Celsius, e.g., greater than 100 degrees Celsius, e.g., greater than 125 degrees Celsius, e.g., greater than 150 degrees Celsius, e.g., greater than 175 degrees Celsius, e.g., greater than 200 degrees Celsius, and/or shock and vibrations greater than 5 G, e.g. greater than 10 G, e.g. greater than 20 G, e.g. greater than 50 G, e.g. greater than 100 G.

"Energy density" is one half times the square of a peak device voltage times a device capacitance divided by a mass or volume of said device As discussed herein, "hermetic" refers to a seal whose quality (i.e., leak rate) is defined in units of "atm-cc/second," which means one cubic centimeter of gas (e.g., He) per second at ambient atmospheric pressure and temperature. This is equivalent to an expression in units of "standard He-cc/sec." Further, it is recognized that 1 atm-cc/sec is equal to 1.01325 mbar-liter/sec.

The terms "heteroalkenyl" and "heteroalkynyl" are recognized in the art and refer to alkenyl and alkynyl alkyl groups as described herein in which one or more atoms is a heteroatom (e.g., oxygen, nitrogen, sulfur, and the like).

The term "heteroalkyl" is recognized in the art and refers to alkyl groups as described herein in which one or more atoms is a heteroatom (e.g., oxygen, nitrogen, sulfur, and the like). For example, alkoxy group (e.g., —OR) is a heteroalkyl group.

The term "heuristics" is art-recognized, and generally describes experience-based techniques for problem solving.

As a matter of convention, the terms "internal resistance" and "effective series resistance" and "ESR", terms that are known in the art to indicate a resistive aspect of a device, are used interchangeably herein.

As a matter of convention, the term "leakage current" generally refers to current drawn by the capacitor which is measured after a given period of time. This measurement is performed when the capacitor terminals are held at a substantially fixed potential difference (terminal voltage). When assessing leakage current, a typical period of time is seventy two (72) hours, although different periods may be used. It is noted that leakage current for prior art capacitors generally increases with increasing volume and surface area of the energy storage media and the attendant increase in the inner surface area of the housing. In general, an increasing leakage current is considered to be indicative of progressively increasing reaction rates within the ultracapacitor 10. Performance requirements for leakage current are generally defined by the environmental conditions prevalent in a particular application. For example, with regard to an ultracapacitor 10 having a volume of 20 mL, a practical limit on leakage current may fall below 200 mA.

A "lifetime" for the capacitor is also generally defined by a particular application and is typically indicated by a certain percentage increase in leakage current or degradation of another parameter such as capacitance or internal resistance (as appropriate or determinative for the given application). For instance, in one embodiment, the lifetime of a capacitor in an automotive application may be defined as the time at which the leakage current increases to 200% of its initial (beginning of life or "BOL") value. In another example, the lifetime of a capacitor in an oil and gas application may be defined as the time at which any of the following occurs: the capacitance falls to 50% of its BOL value, the internal resistance increases to 200% of its BOL value, the leakage increases to 200% of its BOL value. As a matter of convention, the terms "durability" and "reliability" of a device when used herein generally relate to a lifetime of said device as defined above.

The term "modular bus" is used herein as a convention to describe the protocol of board topology and pin assignment on each circuit board which supports the flow of power and that affords it the capability to communicate to the other circuits and/or external hardware through the aligned stackers connecting the boards.

An "operating temperature range" of a device generally relates to a range of temperatures within which certain levels of performance are maintained and is generally determined for a given application. For instance, in one embodiment, the operating temperature range for an oil and gas application may be defined as the temperature range in which the resistance of a device is less than about 1,000% of the resistance of said device at 30 degrees Celsius, and the capacitance is more than about 10% of the capacitance at 30 degrees Celsius.

In some instances, an operating temperature range specification provides for a lower bound of useful temperatures whereas a lifetime specification provides for an upper bound of useful temperatures.

The terms "optimization" and "optimize" are used herein to describe the process of moving a system or performance towards an improved system or performance as compared to a system or performance without the object or method that is being recited as causing the optimization. For clarity, it is not intended herein to suggest that by using these terms, that the most optimum value must be achieved; as such it should be understood that the an optimized range is on a spectrum of improvement.

"Peak power density" is one fourth times the square of a peak device voltage divided by an effective series resistance of said device divided by a mass or volume of said device.

The term "signal," as used herein, describes the transference of energy or data over time. Moreover, unless specified otherwise, the term signal will mean either energy transference over time, or data transference over time.

The term "subsurface" as used herein, refers to an environment below the surface of the earth or an environment having similar characteristics.

The term "system" or "systems" are used herein to include power systems, data logging systems, or a combination thereof.

The term "ultracapacitor" as used herein, describes an energy storage device exploiting art-recognized eletrolytic double layer capacitance mechanisms.

As referred to herein, a "volumetric leakage current" of the ultracapacitor 10 generally refers to leakage current divided by a volume of the ultracapacitor 10, and may be expressed, for example in units of mA/cc. Similarly, a "volumetric capacitance" of the ultracapacitor 10 generally refers to capacitance of the ultracapacitor 10 divided by the volume of the ultracapacitor 10, and may be expressed, for example in units of F/cc. Additionally, "volumetric ESR" of the ultracapacitor 10 generally refers to ESR of the ultracapacitor 10 multiplied by the volume of the ultracapacitor 10, and may be expressed, for example in units of Ohms·cc.

The terms "vibration" or "vibrational energy" or "shock" or "shock energy" as used herein generally refers to a more general mechanical excitation, i.e. it is not intended to limit the characteristics of an excitation source to be continuous, random, or wideband acceleration. Generally the terms vibration or vibrational energy or shock or shock energy may be used interchangeably herein with acceleration, mechanical excitation, or each other or the like as appropriate.

As a matter of convention, it should be considered that the term "may" as used herein is to be construed as optional; "includes" is to be construed as not excluding other options (i.e., steps, materials, components, compositions, etc); "should" does not imply a requirement, rather merely an occasional or situational preference. Other similar terminology is likewise used in a generally conventional manner.

As discussed herein, terms such as "adapting," "configuring," "constructing" and the like may be considered to involve application of any of the techniques disclosed herein, as well as other analogous techniques (as may be presently known or later devised) to provide an intended result.

Power Supplies of the Invention

Currently, power for down-hole electronics is generally supplied by one of wirelines, batteries, or generators. The power supply disclosed herein includes a generator providing benefits in reliability among other benefits over conventional downhole generators. Conventional and typical downhole generators generally comprise a form of a turbine generator and are known in the industry to present limitations in reliability. At least one aspect that is known to limit the reliability of conventional downhole generators is that the movement of said turbine is exposed to fluid flow in the well. Whereas the fluid environment in the well is generally unfavorable for mechanical and more so for moving mechanical aspects due to exemplary characteristics such as temperature, abrasiveness, pressure, turbulence, corrosivity, etc. it is generally beneficial to limit exposure of the movement to said fluid. As such, the present invention provides a device useful for generating power in downhole environments, and methods related thereto. In particular, the present invention provides a generator, e.g., for use in downhole environments, which generates electrical power by capturing mechanical energy, e.g. shock energy and vibrational energy, by using an inertial energy generator (IEG), e.g. a rotary inertial energy generator (RIEG), e.g., to capture mechanical energy in movement of the drill string. A key benefit of the IEG is that in certain embodiments, the movement may be isolated from the fluid flow. Another key benefit of certain embodiments of the IEG is that the IEG can also store mechanical energy, providing for benefits in extraction efficiency by, for instance, a power system. Another key benefit of certain embodiments of the IEG, in the case of a rotary IEG (an RIEG), is the displacement of a movement mass of said RIEG is substantially less limited as compared to a linear counterpart as it is displaced rotationally rather than linearly. Thus a velocity and therefore a stored kinetic energy is relatively less limited as compared to a linear counterpart of said RIEG. Such energy may then be used by a system or power system and/or stored in a rechargeable energy storage device, e.g., HTRES, e.g. a high temperature ultracapacitor.

Accordingly, in one embodiment, the present invention provides a power supply adapted to supply power to a downhole tool, the power supply comprising: an energy generator coupled to a control circuit and a rechargeable energy storage device that is configured to operate at a temperature within a temperature range between about minus 40 degrees Celsius to about 210 degrees Celsius; wherein the energy generator comprises a rotary inertial energy generator (RIEG) that is configured for translating shock and vibration energy experienced by the RIEG, e.g., in the downhole environment, into electrical energy; and wherein the control circuit is configured for receiving electrical energy from the RIEG and storing the electrical energy in the rechargeable energy storage device.

In another embodiment, the present invention provides a power supply adapted to supply power to a downhole tool, the power supply comprising: an energy generator coupled to a control circuit and a rechargeable energy storage device that is configured to operate at a temperature within a temperature range between about minus 40 degrees Celsius to about 210 degrees Celsius; wherein the energy generator comprises a directionally biased rotary inertial energy generator (RIEG) that is configured for translating shock and vibration energy experienced by the RIEG, e.g., in the downhole environment, in a directionally biased manner into electrical energy; and wherein the control circuit is configured for receiving electrical energy from the RIEG and storing the electrical energy in the rechargeable energy storage device.

In yet another embodiment, the present invention provides a power supply adapted to supply power to a downhole tool, the power supply comprising: a plurality of energy generators coupled to a control circuit and a rechargeable energy storage device that is configured to operate at a temperature within a temperature range between about minus 40 degrees Celsius to about 210 degrees Celsius; wherein each energy generator comprises a rotary inertial energy generator (RIEG) that is configured for translating shock and vibration energy experienced by the RIEG, e.g., in the downhole environment, into electrical energy; and wherein the control circuit is configured for receiving electrical energy from the RIEG and storing the electrical energy in the rechargeable energy storage device. In certain embodiments, such as that shown in FIG. 40, each RIEG 210 is oriented to harvest vibrational energy of a predetermined direction. In one particular embodiment, the energy generators are aligned in the same direction. In one particular embodiment, the energy generators are aligned in different directions.

In certain embodiments, the RIEG is directionally biased, i.e., rotating in one direction while providing a free-wheeling motion in another direction.

The RIEG 210 may be coupled to the electronics in a parallel or in a serial arrangement, or in some combination, as deemed appropriate. The orientation of each of the various RIEG 210 may be selected as determined to be appropriate for harvesting vibrational energy with or without consideration for the number of RIEG 210 elements. The varied angular distribution of the RIEG 210 may allow for at least one of the assemblies to appropriately respond to the vibration and generate electrical power therefrom.

Any number and any orientation of the RIEG 210 may be used. For example, there could be four of the RIEG 210, instead of three, and they could be angularly spaced in different orientations, such as by positioning the assemblies orthogonal to each other, etc.

Figure 36:
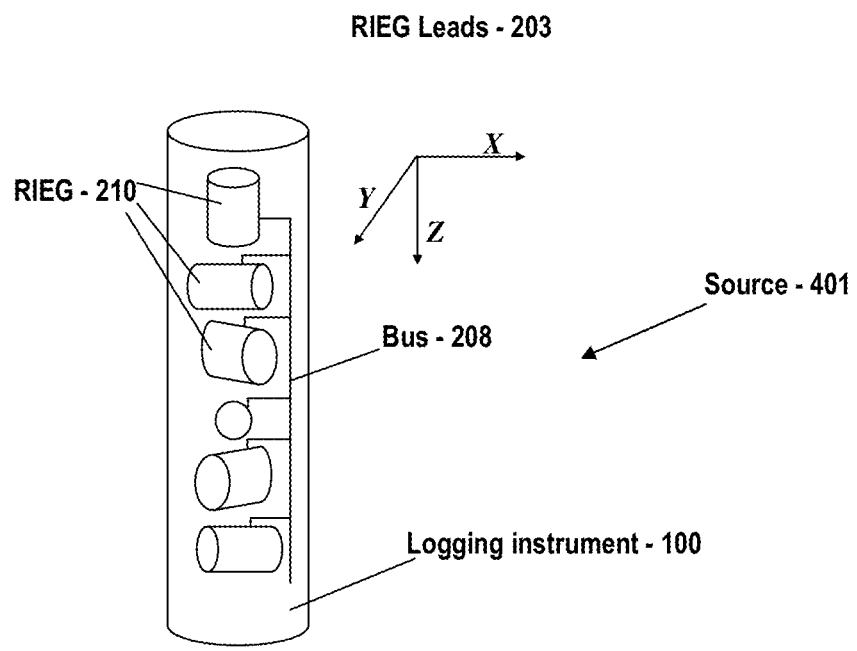
FIG. 36 depicts a schematic of a plurality of RIEG positioned in a variety of orientations.

Refer also now to FIG. 36, where a plurality of RIEG 210 are shown. In this example, the RIEG 210 are disposed within the drill string 111, specifically, within the logging instrument 100. The plurality of RIEG 210 may be coupled together electrically via a bus 208. The bus 208 may be coupled in turn to other electronics for charging the energy storage, such as a plurality of the ultracapacitors 10.

It may be seen that the plurality of RIEG 210 may be arranged within the logging instrument 100 such that vibrational energy will drive at least one of the RIEG 210 on a virtually continuing basis. That is, in one embodiment, the RIEG 210 are disposed along each major axis (X, Y, and Z) as well as major divisions thereof.

Another embodiment of the invention provides a method of generating power, e.g., in downhole environments, comprising rotating an inertial mass around a central axis, preventing the mass from rotating in one direction while providing a free-wheeling motion in the other direction with a ratcheting assembly; and translating the shock and vibration energy of the inertial mass into electrical power, e.g., by utilizing an RIEG of the present invention, such that power is generated. In certain embodiments, the power is used directly by a load. In certain embodiments, the power is stored in a rechargeable energy storage device before use by a load, i.e., the load draws the energy from the rechargeable energy storage device. In certain embodiments, the energy is stored mechanically in a motion of the inertial mass before it is directed electrically to a load or a rechargeable energy storage device.

In yet another embodiment, the invention provides a method of providing power to a load comprising rotating an inertial mass around a central axis, preventing the mass from rotating in one direction while providing a free-wheeling motion in the other direction with a ratcheting assembly; translating the shock and vibration energy of the inertial mass into electrical power, e.g., by utilizing an RIEG of the present invention, and delivering the electrical power to an electrically coupled load, such that power is provided to the load In certain embodiments, the power supply is configured to continuously provide power to a load.

In certain embodiments, the power supply is configured to periodically provide power to a load.

In certain embodiments, the power supply is configured to intermittently provide power to a load.

In certain embodiments, the power supply is configured to provide alternating current (AC) to a load.

In certain embodiments, the power supply is configured to provide substantially direct current (DC) to the load.

In certain embodiments, the power supply is disposed in a housing, e.g., as described herein. In certain embodiments, the power supply is hermetically sealed in a housing In certain embodiments, the RIEG is hermetically sealed in a housing. Certain advantages of the hermetic sealing include, but are not limited to increased durability, increased performance, increased lifetime, and increased reliability, resulting from the reduced exposure to the mud from the mudpulser.

In certain embodiments, the control circuit is encapsulated with a material that reduces deformation of the circuit at high temperatures, e.g. a silicone elastomer gel. In a specific embodiment, the system is adapted for operation in a temperature range of between about seventy five degrees Celsius to about two hundred and ten degrees Celsius by providing sufficient number of expansion voids, e.g., at least one expansion void, in the encapsulation material in which the controller is potted in the housing, e.g., using the advanced potting method described herein.

In certain embodiments, the rechargeable energy storage device is configured to operate at a temperature within a temperature range between about 0 degrees Celsius to about 210 degrees Celsius, e.g., about 50 degrees Celsius to about 210 degrees Celsius, e.g., about 75 degrees Celsius to about 210 degrees Celsius, e.g., about 80 degrees Celsius to about 210 degrees Celsius, e.g., about 80 degrees Celsius to about 200 degrees Celsius, e.g., about 80 degrees Celsius to about 190 degrees Celsius e.g., about 80 degrees Celsius to about 180 degrees Celsius e.g., about 80 degrees Celsius to about 170 degrees Celsius e.g., about 80 degrees Celsius to about 160 degrees Celsius e.g., about 80 degrees Celsius to about 150 degrees Celsius e.g., about 85 degrees Celsius to about 145 degrees Celsius e.g., about 90 degrees Celsius to about 140 degrees Celsius e.g., about 95 degrees Celsius to about 135 degrees Celsius e.g., about 100 degrees Celsius to about 130 degrees Celsius e.g., about 105 degrees Celsius to about 125 degrees Celsius e.g., about 110 degrees Celsius to about 120 degrees Celsius.

In some embodiments, an IEG comprises a linearly displaced movement (LIEG). An LIEG is generally contained within a housing. In this example, the LIEG housing is a closed end, annular cylinder. Surrounding the LIEG housing is a set of windings. The windings provide for converting a magnetic field into electrical energy, and communicating the electrical energy through LIEG leads. The magnetic field is generated by the lateral movement of a permanent magnet (having a mass, m). Generally, the system is subjected to vibrational energy, which drives the lateral movement. Lateral movement may be aided or encouraged by the addition of at least one biasing device. Exemplary biasing devices include rubber bumpers, springs, at least one additional permanent magnet have an opposite facing pole. In one such embodiment, a permanent magnet is mounted internally at each end of the LIEG housing, with an opposing pole facing inwardly into the LIEG housing. A central permanent magnet is then arranged with its respective poles opposing the poles of each mounted magnet. Thus, the central permanent magnet is biased into a center of the LIEG, and able to oscillate freely when subjected to vibrational energy.

While the LIEG may include at least one biasing device, in some embodiments, the LIEG may include a pressure relief device. Non-limiting examples include at least one form of venting such as a vent tube or at least one hole in the permanent magnet (to prevent relative pressurization of one part of the LIEG). In some embodiments, the LIEG is sealed in a vacuum such that aerodynamic forces are relatively inconsequential to operation of the LIEG. Exemplary biasing devices include rubber dampers, mechanical springs, piezoelectric springs and at least one additional permanent magnet.

In some embodiments, a plurality of LIEG's is employed downhole. In this example, the LIEGs are disposed within the drill string, specifically, within the logging instrument. The plurality of LIEG are coupled together electrically via a bus. The bus is coupled in turn to other electronics for charging the energy storage, such as a plurality of the ultracapacitors.

It may be understood that the plurality of LIEG may be arranged within the logging instrument such that vibrational energy will drive at least one of the LIEG on a virtually continuing basis. That is, in this example, the LIEG are disposed along each major axis (X, Y, and Z) as well as major divisions thereof.

Aspects of an exemplary design of the LIEG adapted to satisfy load demand are now considered. Assuming a sinusoidal x-displacement of the permanent magnet of the full length of the LIEG housing $205$, $x(t) = \frac{1}{2} L \sin(\omega t)$ [m], the velocity is its time derivative and the peak velocity magnitude of the permanent magnet $201$ is $\frac{1}{2} L \omega$ [m/s]. The peak kinetic energy is $\frac{1}{2} m v^2 = \frac{1}{2} m (\frac{1}{2} L \omega)^2$ [J] so that the power available in the low electrical resistance limit is $P = \frac{1}{2} m (\frac{1}{2} L \omega)^2 f_{vib}$ [W] where $f_{vib}$ is the vibrational frequency and $\omega = 2\pi f_{vib}$ [rps]. The open circuit potential available from the windings may be approximated using a piecewise linear approximation to the time varying magnetic flux through the area, A, circumscribed by the windings. The time derivative of the magnetic flux is then approximately $d\Phi B/dt = +/- B_{max} A \, 4 \, f_{vib}$. However, in some embodiments, the harvesting electronics will incorporate a rectifier so the sign does not matter. From Maxwell's equations, the open circuit voltage of the windings may be approximated as $V_{oc} = N \, d\Phi B/dt = N \, B_{max} A \, 4 \, f_{vib}$ where the sign has been neglected. Given a series resistance of the windings (where the windings are fabricated from copper), the power available in the low mass limit is $V_{oc}^2/4_R$ where $R = N \, C \, RAWG$ [Ω] and C is the circumference of the LIEG housing.

Some exemplary design inputs include: $f_{vib} = 10$ Hz; $L = 2$ in.; $r = \frac{1}{2}$ in.; $m = 100$ g; $N = 100$ (for copper); and dimensions of the permanent magnet $201$ are 1 inch diameter; $\frac{3}{8}$ in. nominal length, and composed of samarium cobalt.

In this example, a low resistance limit power available is 5 W. With copper windings having a wire gauge of 30 AWG, R is approximately 3 Ohms, and the low mass limit power available is approximately 200 W. Thus, this design is limited by the mass, m, of the permanent magnet $201$, not the electrical resistance of the windings. By extrapolation, the power available will be 10 W for the permanent magnet having a mass, m, of 200 g and 1 W for a the permanent magnet having a mass, m, of 20 g. With the permanent magnet having a mass, m, of 20 g, the maximum resistance, R, of the wire allowable to support the power available is $R = 50^2/(4*1)$ is 625 Ohms. Even with a wire gauge of 30 AWG, the electrical resistance would be only 3 Ohms so any reasonable wire gauge could be used in this design. Smaller wire gauges (larger AWG values) may be used to save space, for instance.

This analysis has assumed that the windings are substantially confined to a length that is small compared to the length of the cylinder, L, and that the vibrational oscillations of the permanent magnet are periodic and sinusoidal yielding a displacement equal to the full length, L, of the LIEG housing (e.g. 2 in.).

Further adaptations of the vibrational energy generator LIEG may be made. Consider that in the downhole environment, the vibration experienced by LIEG may occur over a range of frequencies, for example from tens of hertz to hundreds of hertz. In this case, the LIEG may include a natural frequency that can be tuned during operation of the device by changing the restoring force of biasing devices. For example, if the biasing devices are two permanent magnets, the magnets may be brought closer together by, for example, a linear actuator. Bringing the magnets closer together thereby increases the restoring force and increasing the natural frequency of the LIEG. Likewise, the permanent magnets could be moved farther apart to similarly decrease the resonant frequency of the LIEG. Additionally, if the biasing devices are electromagnets, the current through the electromagnets could be increased or decreased to increase or decrease the resonant frequency of LIEG, respectively.

If piezoelectric springs are used within LIEG, they may be used to serve as a biasing device, providing a restoring force to magnet as well as to provide for additional electric generation.

The mechanical resonant frequency of LIEG containing piezoelectric biasing elements may be changed by altering the electromechanical coupling of the piezoelectric element. For example, electromechanical coupling of a piezoelectric element may be altered by electrically shunting a capacitance across the piezoelectric element, thereby changing the effective mechanical stiffness of the piezoelectric element. Altering the mechanical stiffness of the piezoelectric element changes the resonant frequency of LIEG.

It should be noted that the mechanical natural frequency, $\omega_n$, of LIEG may be simply defined as $\sqrt{k/m}$ where k represents the stiffness of the biasing spring and m represents the mass of the resonator. In one embodiment, a tuning circuit may be used to alter the electromechanical coupling of the piezoelectric element to change a portion of k, thereby changing the mechanical natural frequency, $\omega_n$. In some embodiments, the tuning circuit includes a microprocessor.

It should be noted that various elements can be used as electromechanical coupling to the piezoelectric element, including capacitance, resistance, inductance, or a combination of such elements either in series or parallel.

The piezoelectric elements may serve as an additional source of electric generation while simultaneously serving as a tunable spring element. For example, the power generated by the piezoelectric element can be harvested by a power converter. In the case of a switching power converter, the power converter can be modeled as a load resistance that varies proportional to the duty cycle of the switching power converter.

The Curie temperature of a permanent magnet is the temperature at which the magnet becomes demagnetized. So-called Neodymium magnets are popular for their high magnetic remanence. Using Samarium Cobalt for the permanent magnet is considered for higher temperature operations, as these magnets will exhibit similar remanence levels with higher Curie temperatures. Such magnets are readily available through commercial distribution channels.

In some embodiments, the power supply includes a single LIEG with accompanying electronics and at least one ultracapacitor. In other embodiments, the power supply includes a plurality of LIEG with accompanying electronics and at least one ultracapacitor. The LIEG may be coupled to the electronics in a parallel or in a serial arrangement, or in some combination, as deemed appropriate. The orientation of each of the various LIEG may be selected as determined to be appropriate for harvesting vibrational energy with or without consideration for the number of LIEG elements.

The LIEG respond to vibrations in the logging instrument by generating electrical power. The varied angular distribution of the LIEG ensures that at least one of the assemblies will appropriately respond to the vibration and generate electrical power therefrom.

Any number and any orientation of the LIEG may be used. For example, there could be four of the LIEG, instead of three, and they could be angularly spaced in different orientations, such as by positioning the assemblies orthogonal to each other, etc.

Of course, the LIEG may be differently configured, without departing from the principles of the present invention. For example, the magnet may be an electromagnet. As another example, the coil may be rigidly mounted, with the magnet displacing in response to vibration of the logging instrument.

It will be readily appreciated that the displacement of the coil relative to the magnet also has a natural frequency, which may also be adjusted, for example, by changing the restoring force of the biasing devices mentioned above, changing the mass of the coil, etc. It will further be appreciated that increased displacement of the coil relative to the magnet may be achieved by matching the natural frequency of the LIEG to the natural frequency of vibration in the logging instrument. In this way, the LIEG will vibrate at a frequency that will produce maximum electrical power output.

An example LIEG comprises a "through coil" configuration whereby a permanent magnet moves relatively through a set of coils. In another configuration, commonly referred to as an "across coil configuration", a permanent magnet moves in a perpendicular direction in relative motion to the surface defined by the coils.

A single magnet or multiple magnets may be used. Multiple magnets may be connected to move together or left unconnected to move individually. The magnets may be arranged so that adjacent magnets are characterized by opposite polarizations. In this configuration, the opposing magnet poles enhance magnetic flux density surrounding the junctions of adjacent magnets. The conducting coils may be placed in the vicinity of the magnet junction such that movement of the magnets creates larges deviations in the magnetic flux through the coils. Consequently, the device may operate under smaller relative motion than the "through hole" configuration.

A single coil or multiple coils may be incorporated. Multiple coils can overlap or not overlap and may contain multiple loops of conducting wire. The coils may be arranged in order to provide separate alternating currents with relative phases. For instance, sets of three offset coils may be used to provide relative phases of 0, 120, and 240 degrees. This may be accomplished by selecting an appropriate offset between adjacent coils that is proportional to the dimensions of the magnets. The use of three phase induced currents reduces ripple effects in power generation.

Different paths for either the permanent magnets, if the permanent magnets are moving relative to fixed coils, or the coils, if the coils are moving relative fixed magnets, are suitable for capturing different modes of vibrations. For example, lateral vibration may be captured through the linear relative movement of the magnet and coil pair. To capture torsional vibration, the path may consist of a circle whereby the magnet or coils are free to move around the circular path. In the case that the magnets are moving in the circular path across a fixed set of coils, the magnets may make up a part of the entirety of the circle.

In both "through hole" and "across coil" configurations, the use of flux focusing material to increase flux density may be used. The flux focusing material has high permeability and high flux density and may be composed of, for example soft iron, mu-metal, or another metal or metal alloy containing similar characteristics. The flux focusing material may be placed to concentrate magnetic flux through a set of coils and may or may not be fixed to the permanent magnet. The flux focusing material may also serve to provide a return path for the magnetic flux.

As with the "through-hole" configuration already discussed, piezoelectric springs may be utilized to enhance power generation and provide a tunable resonant frequency.

If the mechanical energy source is in the form of a flow induced rotation, the electromagnetic generator may take the form a standard DC electric generator whereby conducting coils are rotated around a central axis such that a magnetic field passes across the plane of each set of coil with each rotation.

Figure 37:
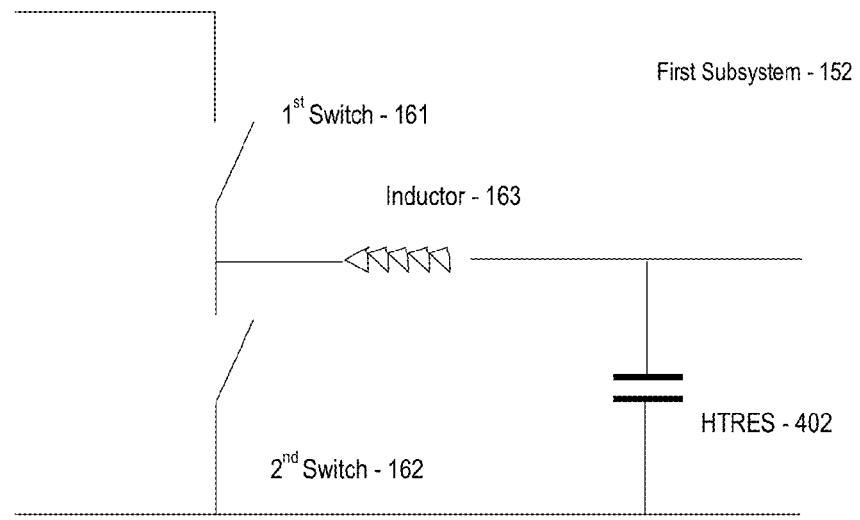
FIGS. 37-43 depict embodiments of control circuits for the power supply.

Refer now to FIGS. 37-43, where aspects of power conversion circuits are shown. As shown in FIG. 37, an exemplary embodiment of the first subsystem 152 includes a first switching device 161, and a second switching device 162 as well as a filter inductor 163. The external energy supply 151 may couple to the first subsystem 152 and to the HTRES 402 (for example, a high temperature ultracapacitor). The action of the first switching device 161 and the second switching device 162 may be controlled to achieve current limiting and source conditioning features described above. Specifically, the relative on-time of the first switching device 161 and the second switching device 162 operating in a complimentary fashion (duty ratio) may be used to adjust the conversion ratio and the flow of current. The exemplary first subsystem 152 shown in FIG. 37 may be useful when voltage of the external energy supply 151 is larger in value when compared to voltage of the HTRES 402. Current limiting or regulation may be achieved by way of a feedback control system (not shown).

An exemplary embodiment of the second subsystems 153 includes power converters either DC-DC or DC-AC depending on the tool requirements. A function of a second subsystem 153 may be to regulate the voltage or current delivered to the load (for example, the logging instrument 100 and/or the downhole electronics 113). Due to a capacitive nature of the HTRES 402, when implanted with an ultracapacitor, voltage of may decrease in an approximately linear fashion as charge is withdrawn from the HTRES 402. A function of the second subsystem 153 then may be to regulate the voltage or current delivered to the logging instrument 100, despite the varying voltage presented by the HTRES 402. Voltage limiting or regulation may be achieved by way of a feedback control system (not shown).

Figure 38:
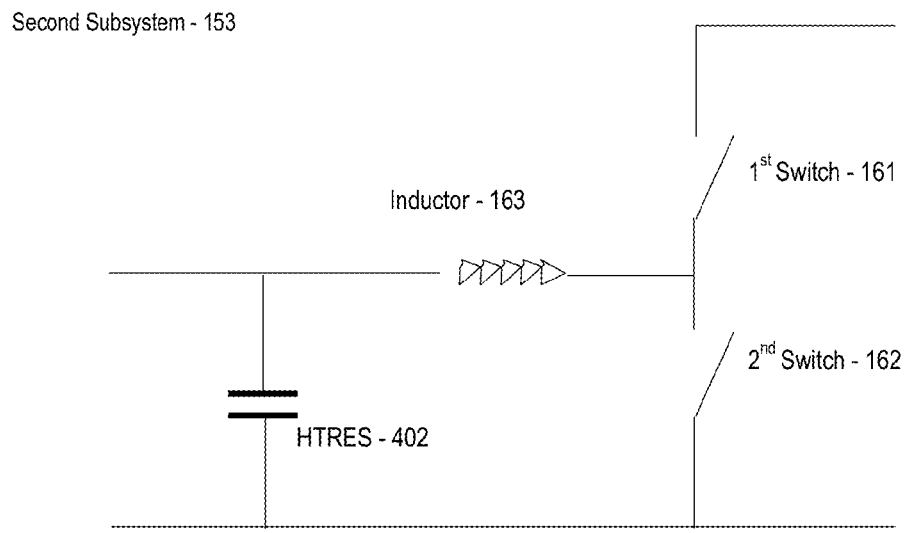

As shown in FIG. 38, an exemplary embodiment of the second subsystem 153 may include respective embodiments of the first switching device 161, the second switching device 162 as well as the filter inductor 163. The load may couple to the second subsystem 153 and to the HTRES 402. The action of the respective embodiments of the first switching device 161 the second switching device 162 may be controlled to achieve desired current or voltage regulation features described above. Specifically, the duty ratio of the relative on-time of the respective embodiments of the first switching device 161 and the second switching device 162 may be used to adjust the conversion ratio and the flow of current or the presented voltage. The exemplary second subsystem 153 shown in FIG. 38 may be useful when the voltage required is larger in value when compared to the voltage of the HTRES 402. Voltage limiting or regulation may be achieved by way of a feedback control system (not shown).

Figure 39:
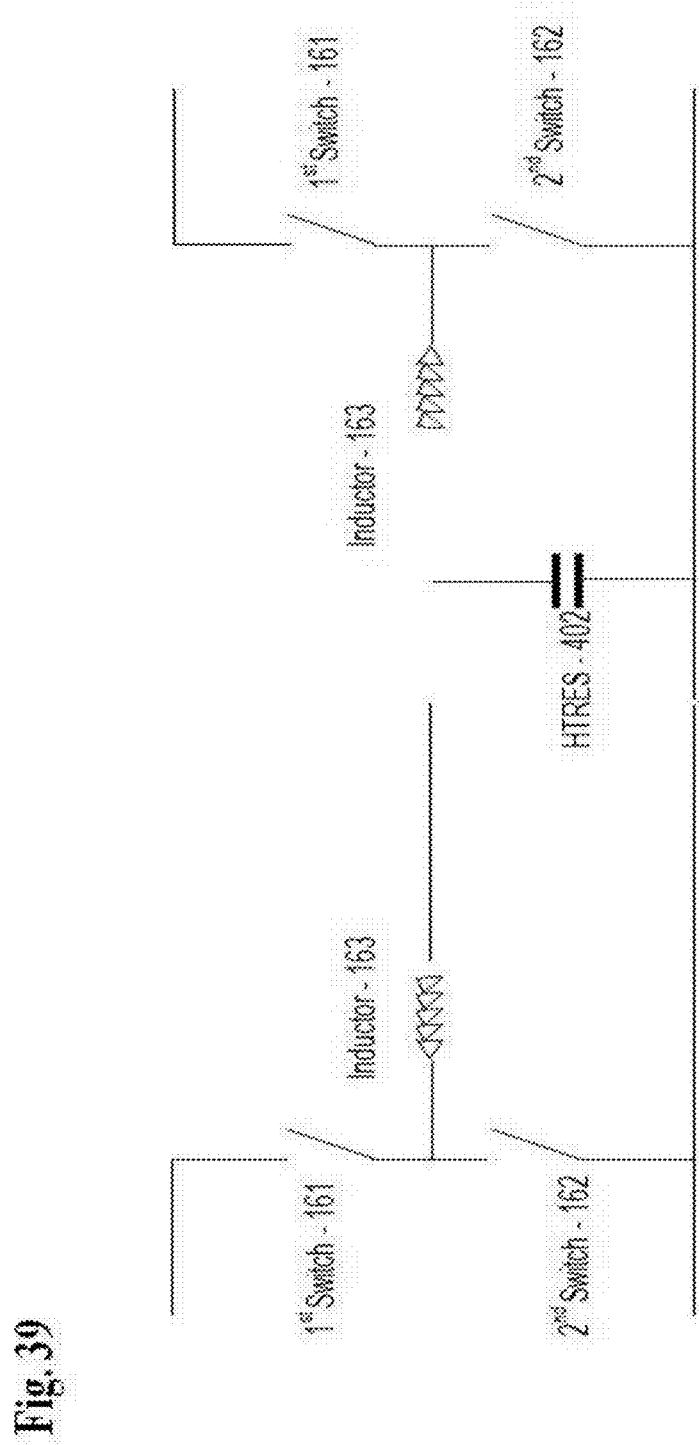

As shown in FIG. 39, the first subsystem 152 and the second subsystems 153 may be coupled together and to the HTRES 402 as well to provide an embodiment of the power supply 115. In this embodiment, the exemplary power supply 115 may be particularly advantageous when the terminal voltage of the external energy supply 151 is either larger in value or smaller in value when compared to the terminal voltage of the load as long as the terminal voltage of the HTRES 402 is smaller in value than both.

The power converters may generally be of any topology. Non-limiting examples include converters commonly referred to as "buck," "boost," "buck-boost," "flyback," "forward," "switched capacitor," and other isolated versions of non-isolated converters (e.g., Cúk, buck-boost), as well as cascades of any such converters (e.g., buck+boost).

Figure 40:
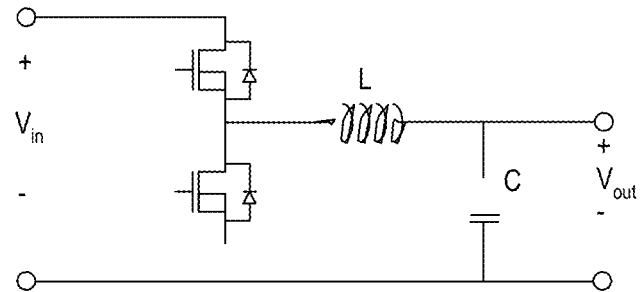

An exemplary converter 181 is shown in FIG. 40. In this example, the converter 181 is a bi-directional buck converter. This embodiment is suitable for, among other things, use as a power converter when the output voltage is required to be less than the input voltage.

Figure 41:
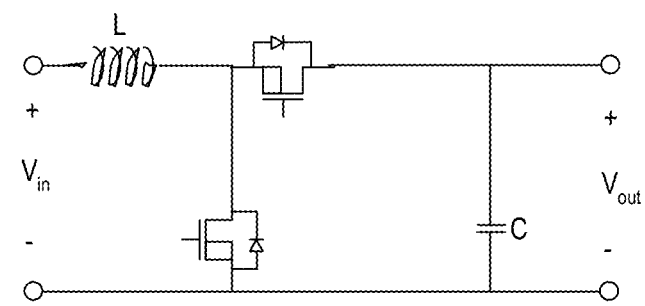
Figure 42:
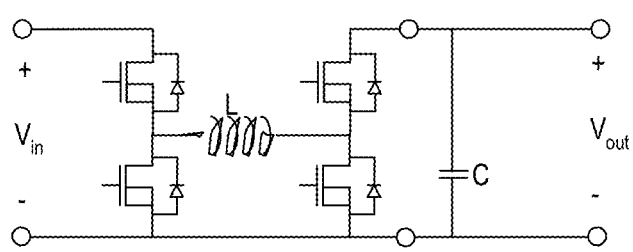

Another exemplary converter 181 is shown in FIG. 41. In this example, the converter 181 is a bi-directional boost converter. A further exemplary converter 181 is shown in FIG. 42. In this example, the converter 181 is a merged bi-directional buck-boost converter.

Figure 43:
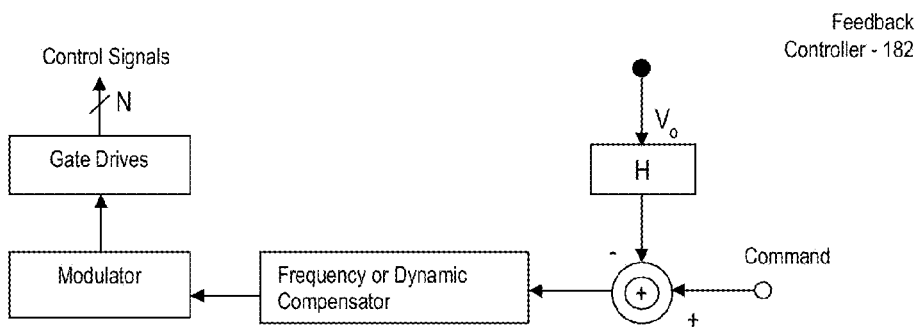

An exemplary embodiment of the feedback controller 182 is provided in FIG. 43. The components shown therein may be implemented in analog or digital domains, or in a combination, as determined appropriate by a designer, manufacturer or user. The feedback controller 182 may include elements for monitoring and controlling various properties. For example, the feedback controller 182 may include components for frequency compensation, pulse width modulation, deadtime protection, duty cycle limiting, providing for a soft start (i.e., ramping voltage) and the like.

One skilled in the art will recognize that the power supply 115 the present invention may be used in conjunction with technologies and instrumentation in support of resistivity, nuclear including pulsed neutron and gamma measuring as well as others, magnetic resonance imaging, acoustic, and/or seismic measurements, various sampling protocols, communications, data processing and storage, geo-steering and a myriad of other requirements for power use downhole. A great compliment of components may also be powered by the power supply of the present invention. Non-limiting examples include accelerometers, magnetometers, sensors, transducers, digital and/or analog devices (including those listed below) and the like.

Accordingly, it may be appropriate to account for the magnetic fields created by the at least one RIEG 210. Interference between the permanent magnet(s) of the present power supplies 115 and magnetically sensitive components may be reduced or substantially eliminated if sensitive components are placed remotely from the RIEG 210 in the logging instrument 100. If needed, a barrier of high magnetic permeability material ("μ-metal" or mu-metal) commercially available as a low-cost alloy of nickel iron copper and molybdenum can be placed between the sensitive device(s) and the magnetic fields associated with the power supply.

Mu metal may be disposed between the power supply 115 and other instruments, such as those sensitive to magnetic interference (e.g., a magnetometer, NMR, magnetic sensitive memory, or otherwise).

Further, mu metal may be disposed between the formations 103 and sensitive instruments (e.g., electronics 113). Mu metal may be shaped in many ways. For example, mu metal may appear as a flat plane separating at least two pieces of the tool, a shaped surface, a closed surface wrapped around at least one piece of the tool such as an instrument or a generator, several layers of mu metal to improve isolation, combinations of the above.

In general, "mu metal" as discussed herein is a nickel-iron alloy (approximately 75% nickel, 15% iron, plus copper and molybdenum) that has very high magnetic permeability. The high permeability makes mu-metal very effective at screening static or low-frequency magnetic fields, which cannot be attenuated by other methods. Mu-metal can have relative permeabilities of 80,000-100,000 compared to several thousand for ordinary steel. In addition it has low coercivity and magnetostriction resulting in low hysteresis loss. Other high permeability alloys such as permalloy have similar magnetic properties. Other advantages include mu-metal is more ductile and workable that ordinary steel. In short, as used herein, the term "mu metal" refers to any material exhibit desired magnetic properties, such as very high magnetic permeability.

Rotary Inertial Energy Generator (RIEG)

In one embodiment, the present invention provides a rotational inertial energy generator comprising an inertial mass rotating around a central axis and a rotor/stator assembly, wherein the rotation translates the shock and vibration energy of the inertial mass into electrical power.

In another embodiment, the present invention provides a rotational inertial energy generator comprising an inertial mass rotating around a central axis; a ratcheting assembly that prevents the mass from rotating in one direction while providing a free-wheeling motion in the other direction; and a rotor/stator assembly, wherein the rotation translates the shock and vibration energy of the inertial mass into electrical power.

In embodiments including a ratcheting assembly, as the drill string rotates around the mass in one direction, the ratchet may effectively engage the mass to the drill string. As the drill string moves in the opposite direction, the ratchet may allow for free-wheeling motion of the mass such that it may rotate freely around the central axis. The mass may continue to rotate at a maximum speed attained when the ratchet was engaged. As the drill string moves in the opposite direction, the relative velocity of the mass (or rotor) and the drill string (or stator) is increased. Given a sinusoidal excitation of the stator, this potentially creates a relative stator-rotor velocity that is double the peak velocity when the ratchet is engaged.

In certain embodiments of the RIEG, the RIEG comprises a ratchet assembly comprising a ratchet and pawl.

In certain embodiments of the RIEG, the RIEG comprises an eccentric mass.

In certain embodiments of the RIEG, the RIEG comprises a concentric mass.

In certain embodiments of the RIEG, the RIEG is configured to operate at temperatures up to about 250° C.

In certain embodiments described herein, the power supplies of the present invention may include a High Temperature Rechargeable Energy Storage (HTRES). The energy storage may include any type of technology practicable in downhole conditions. In certain embodiments, the HTRES is configured for operation at a temperature greater than 75 degrees Celsius, e.g., a temperature that is within a temperature range of between about 75 degrees Celsius to about 210 degrees Celsius, e.g., a temperature that is within a temperature range of between about 85 degrees Celsius to about 210 degrees Celsius, e.g., a temperature that is within a temperature range of between about 95 degrees Celsius to about 100 degrees Celsius, e.g., a temperature that is within a temperature range of between about 75 degrees Celsius to about 210 degrees Celsius, e.g., a temperature that is within a temperature range of between about 110 degrees Celsius to about 210 degrees Celsius, e.g., a temperature that is within a temperature range of between about 120 degrees Celsius to about 210 degrees Celsius, e.g., a temperature that is within a temperature range of between about 130 degrees Celsius to about 210 degrees Celsius, e.g., a temperature that is within a temperature range of between about 140 degrees Celsius to about 210 degrees Celsius, e.g., a temperature that is within a temperature range of between about 150 degrees Celsius to about 210 degrees Celsius, e.g., a temperature that is within a temperature range of between about 160 degrees Celsius to about 210 degrees Celsius, e.g., a temperature that is within a temperature range of between about 170 degrees Celsius to about 210 degrees Celsius, e.g., a temperature that is within a temperature range of between about 175 degrees Celsius to about 210 degrees Celsius.

In certain embodiments of the invention, the energy storage, or HTRES includes at least one ultracapacitor (which is described below with reference to FIG. 3).

Additional embodiments of HTRES include, without limitation, chemical batteries, for instance aluminum electrolytic capacitors, tantalum capacitors, ceramic and metal film capacitors, hybrid capacitors magnetic energy storage, for instance, air core or high temperature core material inductors. Other types of that may also be suitable include, for instance, mechanical energy storage devices, such as fly wheels, spring systems, spring-mass systems, mass systems, thermal capacity systems (for instance those based on high thermal capacity liquids or solids or phase change materials), hydraulic or pneumatic systems. One example is the high temperature hybrid capacitor available from Evans Capacitor Company Providence, R.I. USA part number HC2D060122 DSCC10004-16 rated for 125 degrees Celsius. Another example is the high temperature tantalum capacitor available from Evans Capacitor Company Providence, R.I. USA part number HC2D050152HT rated to 200 degrees Celsius. Yet another example is an aluminum electrolytic capacitor available from EPCOS Munich, Germany part number B41691A8107Q7, which is rated to 150 degrees Celsius. Yet another example is the inductor available from Panasonic Tokyo, Japan part number ETQ-P5M470YFM rated for 150 degrees Celsius. Additional embodiments are available from Saft, Bagnolet, France (part number Li-ion VL 32600-125) operating up to 125 degrees Celsius with 30 charge-discharge cycles, as well as a li-ion battery (experimental) operable up to about 250 degrees Celsius, and in experimental phase with Sadoway, Hu, of Solid Energy in Cambridge, Mass.

High-temperature electronics are used to provide for signal conditioning, telemetry and power electronics, and are generally adapted for operation at temperatures up to as high as about 200 degrees Celsius, and in some embodiments, up to about 300 degrees Celsius. Non-limiting embodiments of high-temperature electronics include discrete and integrated off-the-shelf bare die silicon and silicon-on-insulator active devices as well as silicon carbide active power devices. Some commercially available high temperature rated and low temperature coefficient ceramic passives (COG or NPO dielectrics) and high temperature magnetic passives may be used. In exemplary embodiments, substrate material for circuitry will be AlN (aluminum nitride) ceramics, which are chosen for excellent thermal stability and thermal conductivity. In some of these embodiments, circuit interconnects will be oxidation resistant Au traces. Bonding strategies will employ flip chip or Au wire bonding for bare die active components using AuGe high temperature solder, and/or similar types of bonding. However, for some implementations it is expected that Au wire bonding be advantageous over flip chip bonding due to the added mechanical compliance especially in the presence of thermal expansion and shock and vibration. A non-exhaustive list of suppliers for all of the components above is included in the table below:

| High Temperature Circuit Component Suppliers | |
|---|---|
| Component | Vendor |
| SiC Bare Die Transistors | Micross Components, Los Angeles, CA |
| SiC Bare Die Schottky Diodes | Micross Components, CA |
| Si and SOI Bare Die linear and digital circuits | Minco Technology Labs LLC, Austin, TX |
| Ceramic Surface Mount CGO, NPO capacitors | Digikey, Minneapolis, MN |
| Ceramic Surface Mount Resistors | Digikey, Minneapolis, MN |
| Bare Die Magnetics | Minco Technology Labs LLC, Austin, TX |
| Ceramic Printed Circuit Board | Complete Hermetics, Santa Ana, CA |
| Terminals, Headers, Packages | HCC Ametek Ind., New Bedford, MA |
| AuGe Solder | Hi-Rel Alloys, Ontario CA |

In certain embodiments, the RIEG 210 is generally contained within a RIEG housing, for example, as described herein below. In one example, the RIEG housing 205 may be a closed end, annular cylinder.

Further adaptations of the RIEG 210 may be made. Consider that in the downhole environment, the vibration experienced by RIEG 210 may occur over a range of frequencies, for example from millihertz to thousands of hertz. In this case, the RIEG 210 may include a natural frequency that can be tuned during operation of the device by changing the restoring force of biasing devices. For example, if the biasing devices are two permanent magnets 201, the magnets 201 may be brought closer together by, for example, a linear actuator. Bringing the magnets 201 closer together thereby increases the restoring force and increasing the natural frequency of the RIEG 210. Likewise, the permanent magnets 201 could be moved farther apart to similarly decrease the resonant frequency of the RIEG 210. Additionally, if the biasing devices are electromagnets, the current through the electromagnets could be increased or decreased to increase or decrease the resonant frequency of RIEG 210, respectively.

If piezoelectric springs are used within RIEG 210, they may be used to serve as a biasing device, providing a restoring force to magnet 201 as well as to provide for additional electric generation.

The mechanical resonant frequency of RIEG 210 containing piezoelectric biasing elements may be changed by altering the electromechanical coupling of the piezoelectric element. For example, electromechanical coupling of a piezoelectric element may be altered by electrically shunting a capacitance across the piezoelectric element, thereby changing the effective mechanical stiffness of the piezoelectric element. Altering the mechanical stiffness of the piezoelectric element changes the resonant frequency of RIEG 210.

In some embodiments, the tuning circuit includes a microprocessor.

It should be noted that various elements can be used as electromechanical coupling to the piezoelectric element, including capacitance, resistance, inductance, or a combination of such elements either in series or parallel.

The piezoelectric elements may serve as an additional source of electric generation while simultaneously serving as a tunable spring element. For example, the power generated by the piezoelectric element can be harvested by a power converter. In the case of a switching power converter, the power converter can be modeled as a load resistance that varies proportional to the duty cycle of the switching power converter.

In certain embodiments, the RIEG provides advantages including, but not limited to high durability, wide bandwidth, and efficient conversion.

1. High Durability

Since the generator works from the inertial vibration of the drill string, it does not require access outside of the pressure barrel. This is unlike common turbines, which must be placed in the direct flow of the mud. This has the advantage of simplifying deployment and connectivity to downhole tools as well as extending the lifetime of the generator.

Also, some typical vibrational energy generators, e.g. linear IEGs, may contain a spring/mass system to afford collecting and storing vibrational energy, notably by limiting an excursion of a movement, as is important in linearly displaced IEGs. The configuration comprising springs and masses has the disadvantageous property that those elements contribute dynamics to the response of the system. Another disadvantage of the spring mass configuration is that the spring constant and dampening change with temperature. With increasing temperature, the spring constant will typically decrease, creating a "weaker" spring. This has the effect of decreasing the resonant frequency of the system. Furthermore, the spring may become more damped or lossy. This decreases the systems efficiency in collecting vibrational energy. Finally, the lifetime of the spring is governed by the number of contractions/extensions it can endure. At high temperature, this lifetime of the spring decreases, reducing the effectiveness and lifetime of the generator.

An RIEG useful for the power supplied of the present invention does not generally rely on springs or the like or displacement limiting devices and therefore are not susceptible to the previously mentioned disadvantages.

2. Wide Bandwidth

It is common practice to utilize a linear spring/mass system in order to aid generation of electrical power from vibration. These systems typically exhibit a bandwidth dictated by aspects of the spring and mass mechanical dynamics among other things and sometimes inherently have a resonant frequency created by the mass and spring system. For example, the resonance causes the system to respond best to a small range of frequencies, effectively and substantially rejecting frequencies that are too far above or below the resonant frequency. Furthermore, linear mass/spring systems have a limited range of motion of the mass. The energy collected from a linear mass/spring configuration may be directly proportional to the range of motion of the mass. By restricting the range of motion, the possible energy collected from the generator may also be restricted.

In contrast, the invention includes a rotational mass whereby energy is stored in the movement of a rotational inertia, e.g., the rotational aspect obviating the need for displacement limiting devices such as springs or opposing magnets. Removing those displacement limiting devices removes potentially disadvantageous dynamics from the response of the system to mechanical excitation, e.g. its bandwidth may be relatively wide and its frequency response over said bandwidth may be relatively flat, e.g. in a fashion known in the art to relate to first order systems rather than second order systems. The ratcheting action of the invention has a frequency response that is flat up until a frequency that is dependent on the amplitude of vibration and spacing between ratchet teeth. Where the frequency response is flat, certain embodiments of the IEG will collect vibrational energy with relatively small amounts of dampening or attenuation.

The effect of a flat frequency response is that the generator is able to collect energy from a relatively wide range of vibration spectrums. The drill string exhibits different modes of vibration at different frequencies that are dependent on a variety of constantly changing parameters, such as depth, weight on bit, and rotational speed. Unlike resonant vibrational generators, certain embodiments of the IEG are able to effectively generate power across a full operational range of a drill string.

3. Efficient Conversion

The invention stores mechanical energy by the rotation of the inertial mass. This is very similar to flywheel currently being investigated for grid level storage, with greater than an 85% conversion efficiency. The principle that allows for high conversion efficiency relies on a certain level of stored mechanical energy at the time when energy is converted from mechanical to electrical. For instance, a relatively high level of stored mechanical energy in an inertial mass compared to a level of energy converted to electrical energy will generally yield high conversion efficiencies. For instance, and by way of example, a high amount of stored mechanical energy in an RIEG translates to a high angular velocity of a movement mass in said RIEG. Based on Faraday's law or Maxwell's equation for magnetic induction, a high rate of change of a magnetic field yields a high voltage. As a movement mass moves at a high rate of rotation, the rotor, in some examples, having an array of or at least one permanent magnet(s), passes over the stator, in some examples, having an array of or at least one winding(s), and the high rate of rotation leads to a high rate of change of magnetic field in said stator winding(s) created by the relative movement of said permanent magnetic(s) on said rotor. Thus a relatively high (sometimes alternating) voltage is created at terminals of stator winding(s). For a given amount of stator resistance, a power capability of an energized stator is approximately equal to the RMS voltage squared divided four times said resistance. Thus as the voltage increases (perhaps in a time-varying fashion), the power capability increases (perhaps in a time-varying fashion). Finally, it is well known in the art and can be shown mathematically, that it is equivalent to state that (1) a source provides for high power capability and (2) that said source provides for high efficiency at a given power level. Thus having a high degree of stored mechanical energy can be directly related to a high degree of conversion efficiency from mechanical to electrical energy.

4. Components of the Rotary Inertial Energy Generator

The energy generator of the present invention comprises an inertial mass, a rotor/stator assembly to generate electrical power from the rotation of the inertial mass, and in some examples a ratcheting assembly.

A. Inertial Mass

The inertial mass of the invention stores mechanical energy through rotation around the central axis. The energy stored in the mass is proportional its mass.

The energy stored in the mass is given as the product of one half the rotational moment of inertia of the mass around the axis of rotation and the rotational velocity of the mass around the same axis of rotation squared.

Rotational moment of inertia is increased as additional mass is concentrated farther from the axis of rotation. Therefore, the moment of inertia of the rotating mass may be increased by including additional mass or concentrating the same mass further from the rotational axis.

The material of the rotational mass may be chosen to achieve the highest kinetic energy at a given velocity of rotation. The energy stored in the rotating mass is proportional to the rotational velocity squared. Therefore, a material may be chosen to survive high rotational velocities. Concentric rings made of carbon fiber have been investigated to achieve high rotational velocity while maintaining structural integrity. Likewise, the energy stored in the rotating mass is proportional to the moment of inertia of the inertial mass. Therefore, utilizing high density materials, such as steel, offer high moments of inertia in a given volume.

In certain embodiments, by utilizing a completely concentric mass, the invention increases the weight of the mass. While a concentric mass may not be as advantageous in collecting lateral shock vibration, it is able to collect torsional shock and vibration, e.g., creating a highly effective means to collect torsional vibration.

In certain embodiments, the mass can be configured as an eccentric mass, where the centripetal force of the offset mass is asymmetric, which enables the collection of lateral and torsional vibration.

B. Ratcheting Assembly

The ratcheting assembly has the function of collecting the vibrational energy of the drill string and transferring it to movement of the inertial mass. As the drill string vibrates, the inertia of the mass will tend to keep the mass in the same absolute location, causing the drill string to rotate around the inertial mass.

Without the ratchet assembly, the mass will tend to remain in the same location, moving back and forth around the central axis as the drill string vibrates. This energy may be collected as it is available. The ratchet assembly prevents the mass from rotating in one direction while providing a free-wheeling motion in the other direction. As the drill string rotates around the mass in one direction, the ratchet may effectively engage the mass to the drill string. As the drill string moves in the opposite direction, the ratchet may allow for free-wheeling motion of the mass such that it may rotate freely around the central axis. The mass may continue to rotate at a maximum speed attained when the ratchet was engaged.

As the drill string moves in the opposite direction, the relative velocity of the mass (or rotor) and the drill string (or stator) is increased. Given a sinusoidal excitation of the stator, this potentially creates a relative stator-rotor velocity that is double the peak velocity when the ratchet is engaged.

In some embodiments, a ratchet and pawl or a configuration providing for the function of a ratchet and pawl (forced unidirectional rotation) may be included to encourage rotation of the movement in one particular direction. In these embodiments, the movement mass of the ratcheted RIEG provides a dual functionality: firstly, it captures vibrational energy by way of inertia, and, secondly, it stores mechanical energy by way of accumulating angular momentum. One benefit of providing for stored mechanical energy is that a substantial rotary kinetic energy provides for higher induced voltages at the leads of the RIEG. Higher induced voltages generally provide for higher efficiency when supplying a given amount of electrical power or equivalently higher power for a given efficiency. The effect of the ratchet and pawl may be created by way of a ratchet and pawl or by other means. For instance an "active ratchet and pawl" may employ electronic sensors to determine the precise moment at which the pawl should engage the ratchet. Generally, this moment is the one in which the relative rotational speed of the rotor and stator is zero and the relative acceleration of the stator with respect to the rotor is positive (it will contribute angular momentum to the rotor). The benefit of an active ratchet and pawl is that the pawl may cease to contact the ratchet altogether when it is disengaged thus removing a contributor of friction from the system. The designer must weigh this benefit against the power consumption of the active system, for instance the power needed to support rapid sensing and computation of the rotor and stator relative angular velocity and the actuation of the desired pawl state.

In another configuration, an eccentric mass can be used without the use of a ratchet for horizontal drilling applications. For instance, in horizontal sections, the above embodiments would have to compete with gravity in order to complete a full rotation around the central axis. By removing the ratchet, an eccentric mass will tend to hang below the axis of rotation. As the drill string rotates, it rotates around the mass creating relative motion that can be converted into electrical energy.

Thus in certain embodiments, an RIEG is configured with an eccentric mass to capture mechanical energy when the tool string or drill string has a component orthogonal to earth's gravitational field, for instance when the relative angle between the tool string axis and earth's gravitational field is more than 1 degree, e.g. more than 5 degrees, e.g. more than 10 degrees, e.g. more than 20 degrees, e.g. more than 45 degrees, e.g. about 90 degrees.

C. Stator and Rotor Assembly

The stator may be composed of any structure that is fixed relative to the drill string. As such, in one embodiment, the stator is composed of a coupling to a mechanical housing and electrical winding assembly.

In certain embodiments, the stator comprises at least part of a support structure for the rotor and may comprise part of a housing for the RIEG. The stator may be coupled to the tool string and thus to the drill string so mechanical energy from the drill string may be coupled into the RIEG by way of the stator. The stator generally comprises at least one stator winding for converting relative motion of at least one permanent magnet on at least one rotor to an electrical output. The at least one stator winding may be wound around a core. The face of the at least one stator winding—the plane that is normal to the axis of the winding—is generally oriented so that the magnetic flux imposed by the at least one rotor is directed substantially normal to it. The optimal number of turns on a winding depends on several factors including the available space for the winding and the degree to which additional turns enhance flux coupling and add series resistance. The optimal number of turns is generally the one that yields the maximum amount of available power or equivalently, the maximum conversion efficieelectrical efficiency at a given power, the maximum power generally and approximately being described by the square of the root-mean-square voltage divided by four times the series resistance. A stator generally benefits from a permeable backing or otherwise permeable structure for encouraging a particular path of the magnetic flux. Some practical magnetically permeable materials include electrical steel, steel, iron, nickel, and mu-metal. Multiple windings may be configured in a single phase—multi-pole arrangement in order to aid efficient utilization of available space for coupling magnetic fields from the rotor to the stator windings. Multiple windings may further be configured in a multi-phase arrangement in order to, for instance, aid efficient processing of electrical power by the circuits employed to withdraw power from the windings.

The rotor may be composed of any structure that moves relative to the stator. As such, in one embodiment, the rotor is composed of the inertial mass and a magnetic assembly.

In certain embodiments, the rotor comprises at least one permanent magnet configured such that its magnetic field substantially impinges the face of at least one stator winding—the plane that is normal to the axis of the at least one stator winding—and moves relative to the at least one stator winding. To improve the degree to which the magnetic field maximally impinges the face of the at least one stator winding, the magnet may be positioned as close as possible to the stator winding without risking mechanical contact that may otherwise impede rotation. Magnets may be arranged in a Halbach or alternating configuration to encourage a particular path of the magnetic flux. Additionally, a magnetically permeable backing or other structure may be employed to encourage a particular path of the magnetic flux. An advantageous flux path is generally one that favors as heavily as possible a path normal to the face of the at least one stator winding. The magnets may be glued, press-fit, welded, bolted, clamped, magnetically or ferro-magnetically attracted or otherwise affixed to a portion of the rotor.

The mass of the rotor, which comprises the various components of the rotor, whether they be included solely for contributing mass or for other purposes, may be configured to be substantially concentric or eccentric. Non-limiting examples of components of the rotor, all of which contribute mass to the rotor may include at least one permanent magnet, a rotor backing, an axle, a ratchet, adhesive, mechanical couplings, nuts, bolts, bearing components, and/or an explicit mass. Common materials for the various rotor components are steel, especially for components intended to contribute substantial mass and aluminum, especially for components not intended to contribute substantial mass. Some practical magnetically permeable materials include electrical steel, steel, iron, nickel, and mu-metal. An eccentric configuration of the mass is one whose center of mass is substantially offset from the predetermined axis of rotation. A concentric mass is one whose center of mass is not substantially offset from the predetermined axis of rotation. A benefit of an eccentric mass configuration is that the RIEG will harvest energy from lateral acceleration in addition to rotary acceleration. A benefit of a concentric mass configuration is that the RIEG will harvest more rotational energy per unit volume of the RIEG when compared to a RIEG with an eccentric mass configuration.

In one embodiment, the magnetic assembly is composed of a series of permanent, high temperature magnets. The rotor may be placed directly over the winding assembly that is composed of conductive wire wound in consecutive loops. As the magnetic rotor passes over the winding stator, magnetic induction creates a back EMF over the winding assembly. This energy is converted by the control circuit, e.g., a power converter, to be stored on a rechargeable energy storage device, e.g., a HTRES, e.g., ultracapacitors described herein, or used by down-hole electronics directly. In an axial flux configuration, the plane normal to magnetic flux is parallel to the axis of rotation. In a radial flux configuration, the plane normal to the magnetic flux is parallel to the radius of rotation.

In one embodiment, a single magnet or multiple magnets may be used. Multiple magnets may be connected to move together or left unconnected to move individually. The magnets may be arranged so that adjacent magnets are characterized by opposite polarizations. In this configuration, the opposing magnet poles enhance magnetic flux density surrounding the junctions of adjacent magnets.

The Curie temperature of a permanent magnet is the temperature at which the magnet becomes demagnetized. Curie temperatures for materials for the permanent magnet 201 are shown in the table below. So-called Neodymium magnets (first two rows) are popular for their high magnetic remanence. Using Samarium Cobalt for the permanent magnet 201 is considered for higher temperature operations, as these magnets will exhibit similar remanence levels with higher Curie temperatures. Such magnets are readily available through commercial distribution channels.

| Comparison of Materials for the Permanent Magnet | | |
|---|---|---|
| Material | Remanence (T) | Curie Temp. (° C.) |
| $Nd_2Fe_{14}B$ (sintered) | 1.0-1.4 | 310-400 |
| $Nd_2Fe_{14}B$ (bonded) | 0.6-0.7 | 310-400 |
| $SmCo_5$ (sintered) | 0.8-1.1 | 720 |
| $Sm(Co, Fe, Cu, Zr)_7$ (sintered) | 0.9-1.15 | 800 |
| Alnico (sintered) | 0.6-1.4 | 700-860 |
| Sr-ferrite (sintered) | 0.2-0.4 | 450 |

In certain embodiments, certain selections in the design of the RIEG may be made by considering the following:

Low Friction: One of the primary sources of inefficiency in a flywheel generator is friction. Friction in the bearings and ratcheting assembly must be minimized while maintaining structural integrity. Magnetic bearings are a possible solution for reducing drag caused by the bearing assembly. An active ratchet and pawl system, whereby the pawl can detach from the ratchet, is a possibility to reduce the friction caused by the ratchet assembly.

In addition, a low friction material may be added at the junction between the ratchet and pawl. Reducing friction between the ratchet and pawl reduces losses due to friction and may extend the lifetime of the ratchet and pawl assembly.

Air friction also contributes to frictional losses incurred during rotation. Placing the rotor assembly within a vacuum would eliminate air friction. In this embodiment, a sealed junction must pass any electrical signals outside of the vacuum.

Stator Core and Stall Torque: By including a ferrous core material within the stator windings, it is possible to significantly increase magnetic flux density through the windings, increasing potential power output. However, the magnetic rotor assembly will be attracted to the ferrous stator, creating what is known as a stall torque that limits the degree to which the flywheel can freely rotate. Some embodiments include a dual rotor assembly that sandwiches the stator windings between two magnets, achieving high flux density without a substantial or substantially limiting stall torque. Furthermore, including the ferrous core while staggering the magnet assembly can reduce the stall torque while maintaining the benefits of using a ferrous core.

Magnet Size: Increasing the strength of the rotor magnets increases the flux density and consequently the potential power generated. However, stronger magnets are often larger is size. Increasing the concentric weight of the rotor reduces the generators capability of collecting lateral vibration. To effectively collect lateral vibration, ideally all of the rotor mass would be eccentric, focused on one side. By including concentric mass the rotor is less able to collect lateral vibration. Magnet mass, compared to the overall stator mass, must be balanced for optimal lateral vibration collection and energy conversion.

In some embodiments, permanent magnets contribute a majority of the mass of the rotor.

Wire Gauge. The maximum power output of the generator as defined above includes effects of winding resistance and voltage. The EMF voltage is proportional to the number of coil loops in the stator winding. Increasing wire gauge enables additional coil loops in the same space but increases the overall ESR. Furthermore, an EMF voltage of at least a ~0.6V is desirable to enable the use of certain nonlinear elements in circuits that may ultimately extract energy from an IEG, e.g. a diode in a rectifier circuit. Therefore, wire gauge must be chosen to enable high enough voltage potentials while maximizing packing density and minimizing conduction losses.

5. Exemplification

Figure 44:
FIG. 44 depicts an image of an exemplary RIEG rotor.

In one example, (a design shown in FIG. 44) the designed inertial mass had a height h of 50.8 mm, inner radius $r_1$ of 3.2 mm, and an outer radius $r_2$ of 19 mm. The material chosen for the mass was stainless steel 303 for its high density and machinability. The density of stainless steel 303 was 8,027 kg per cubic meter, giving the eccentric mass a weight of 0.22 kg. The moment of inertia was then estimated as $4.2 \times 10^{-5}$ Nm.

Knowledge of the vibration frequency and magnitude can aid an estimate of the potential power generation down-hole. In order to accurately simulate lateral vibration, a vibration table was constructed where two vibration sources comprising oscillating motors with speed control. Each motor piston was connected directly to a small aluminum plate. The motors were mounted orthogonal to each other to form two independent excitation axes. The plates were connected via a damped rubber column. The rubber enables the plates to move with respect to each other.

Including ferrous core material greatly increased power density while increasing stall torque, where the stall torque reduces the ability to store energy within the movement mass. The exemplary system achieved 3.43 mW/kg Hz$^2$. At the expected 30.7 Hz angular velocity achievable with 2 g lateral acceleration at 0.64" center of mass of the moving mass, representative of conditions found in typical downhole vibrational situations, the power density given sinusoidal power output was 3.23 W/kg. Given the fixture dynamics, 1.34 W/kg was measured using the vibration table.

6. Fabrication of the Power Supplies of the Invention

A. Ultracapacitor String

In certain embodiments of the present invention, the HTRES comprises an ultracapacitor string comprised of two or more ultracapacitor cells organized in a space efficient orientation, e.g., 1-100 ultracapacitor cells. The ultracapacitors of the present invention may comprise an ultracapacitor pack wherein the capacitor assembly, e.g., the ultracapacitor string, allows for more cells to be used in a smaller length of housing. In addition, it leaves room for electrical wires to run along the sides of the pack safely with room for potting to secure them in place.

Figure 30:
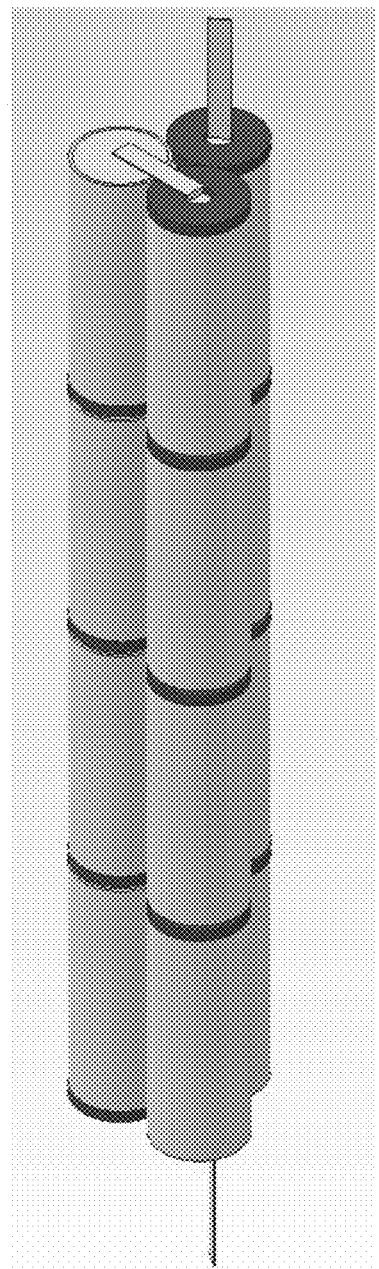
FIG. 30 depicts an exemplary ultracapacitor string in a 3 strand pack assembly of ultracapacitors.

In another embodiment, and as exemplified in FIG. 30, the invention comprises a 3 strand pack assembly of ultracapacitors, e.g., which makes the system easier to assemble because it is easier to weld together cells in a smaller group of cells then to weld one long strand of cells. In certain embodiments, an insulation technique, described herein, provides security from short circuit failures and keeps the system rigid in its structure. In particular embodiments, the potting secures the balancing and system wires in place and protects from unwanted failures, e.g., which is beneficial because more cells can now be fit in the same size ID housing tube (e.g., going from D sized form factor to AA) but in a significantly shorter housing tube.

In one embodiment, the invention provides an ultracapacitor string prepared by connecting ultracapacitors in series to be used in the systems of the invention. In certain embodiments, the cells (e.g., 12 or more) may be insulated with tape, heat shrink, washers, potting compound and/or spacers.

In one embodiment, the cell form factor is AA (~0.53" in diameter) in which 3 strands of equal number of cells are used to minimize the length of the capacitor section. In another embodiment, D cells (~1.25" in diameter) are used, but are connected in one long strand instead of three shorter strands. The insulation and assembly differs slightly for different form factors.

In certain embodiments, the ultracapacitor assembly may also include capacitor balancing wires and system wires. The AA pack allows the balancing wires to be safely wired to each cell and protected by potting and heat shrink. In certain embodiments, heat shrink is applied around each strand, balancing wires and strand, and/or the entire pack of 3 strands of cells. In certain embodiments, potting may then used between each pack of cells inside the heat shrink and between the cells. In particular embodiments, the balancing wires may be positioned in between the void spaces of the AA strands and are encapsulated in the potting. In a specific embodiment, the system wires run along the void spaces between the capacitor strands and do not increase the outermost diameter of the capacitor pack.

In certain embodiments, each cell is insulated with different layers of protection. In certain embodiments, a layer of high temperature insulation tape, such as Kapton tape, may be placed on the top of each cell with the glass to metal seal, so only the pin (positive terminal) is exposed. In certain embodiments, another piece of high temperature insulation tape may be wrapped around the top side edge of the can and folded back onto the top face of the can to hold down the first piece of tape. In a particular embodiment, a high temperature spacer disk (such as Teflon) with the same OD as the can may be positioned around the glass to metal seal pin so only the pin is exposed. In a specific embodiment, he disk sits above the top height of the pin so that when connected in series the cans do not press down onto the glass to metal when stressed but rather on the spacer.

Figure 29:
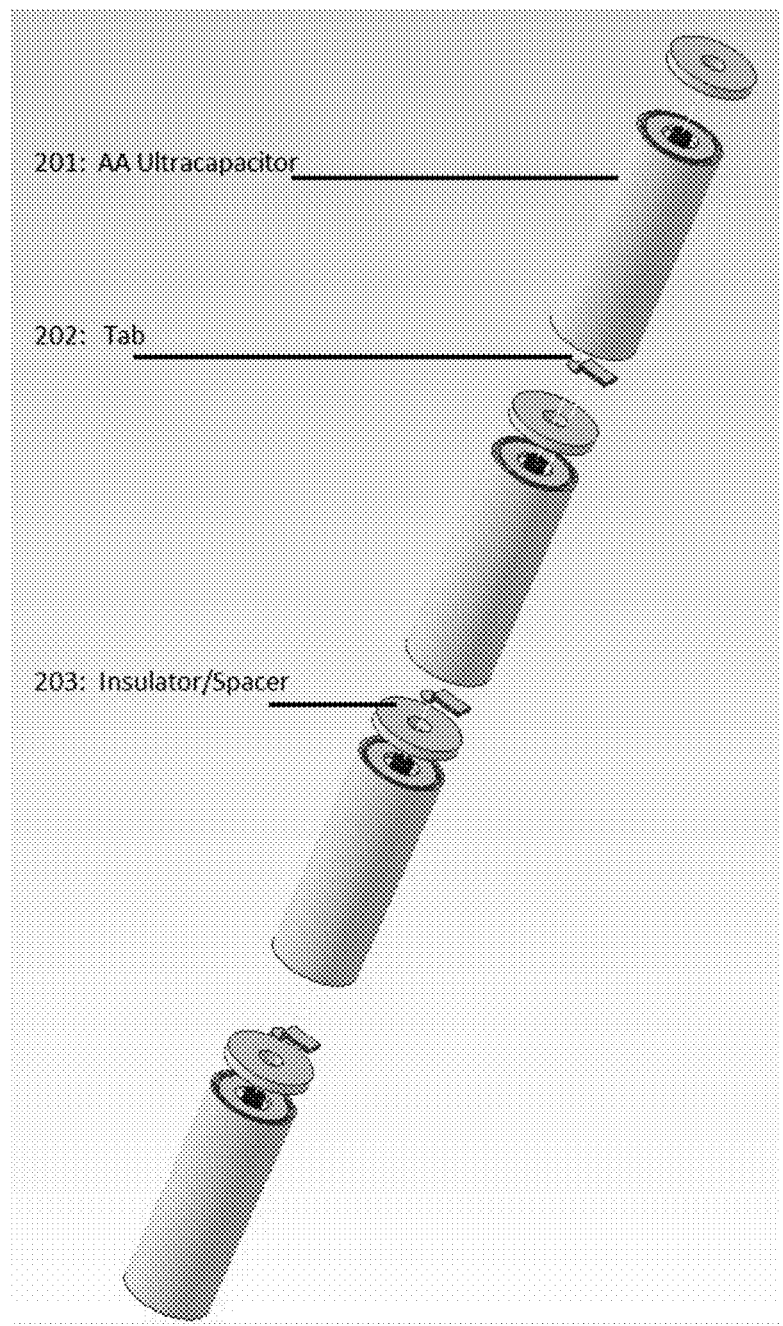
FIG. 29 depicts an exemplary ultracapacitor string, as described herein, highlighting certain components of assembly.

In certain embodiments, as shown in FIG. 29, the capacitors may be connected in series using a nickel or similar tab 202. In certain embodiments, the tab may be welded (resistance or laser) to the positive terminal (usually glass to metal seal pin) of the each capacitor. In certain embodiments, the tab is run through the center of the spacer disk. The tab may be insulated with high temperature tape or high temperature heat shrink except for where it is welded to the positive terminal and the negative terminal of the next can. The tab may be run flat across the spacer disk 203 and then welded to the bottom of the next can (negative terminal). In certain embodiments, the tab is then folded back so the one can is sitting on the spacer of the next and are in the same line. For D sized cells this is continued until all are welded together in one string. For AA cells, as shown in FIG. 30, there are 3 strands with the same number of cells in each. For example, if 12 cells are needed for one system, 3 strands of 4 would be welded together. In a particular embodiment, after welding each strand together they are heat shrunk to stabilize the cells and secure the insulation and tabs.

In certain embodiments, the cell balancing wires may be attached by removing a piece of the heat shrink on each cell and welding the balancing wire to the side of the can. In certain embodiments, after welding the balancing wires, a strip of heat shrink tubing is put around the weld to help secure and protect the wire to the can. The balancing wires may be attached to each can so that they all run along the same side of the can. In a particular embodiment, [tape is used to hold the wire in place after welding, and an additional layer of heat shrink can be used to keep all the wires in place and on the same side of the strand of cells. In this embodiment, an added benefit results from putting the three strands together in that the balancing wires can run in between the extra spaces between the cells of different strands and do not increase the pack diameter.

In certain embodiments, the three strands of cells are assembled to keep them all in series. For example, when using 12 AA cells there will be 3 strands of 4 cells each. One strand will have the positive terminal which will connect to the electronic system. The final negative tab of strand one will connect to the positive terminal of strand two, which will be in an opposite direction of strand one and the same will go for strand 3 so that all cells are connected positive to negative. In certain embodiments, all of the balancing wires are connected so they all come out the same end of the capacitor pack to make assembly easier. After welding together all 3 strands of cells a final layer of heat shrink may be used to keep all cells together in one rigid body. In between each cell strand, as well as slightly above the top and bottom of the pack, potting may be used to further protect the cell.

On the outside of the final heat shrink there are a number of system wires that run from end to end. In certain embodiments that use the AA assembly method, the wires have plenty of room to run in between the spaces of the capacitors without increasing the diameter of the pack. The system wires may be run from either of the positive terminal or negative terminal connectors. The wires (both system and balancing) may be connected by using butt joints alongside the cell pack or all can be run to another circuit board sitting near the ultracapacitor pack.

Figure 31A:
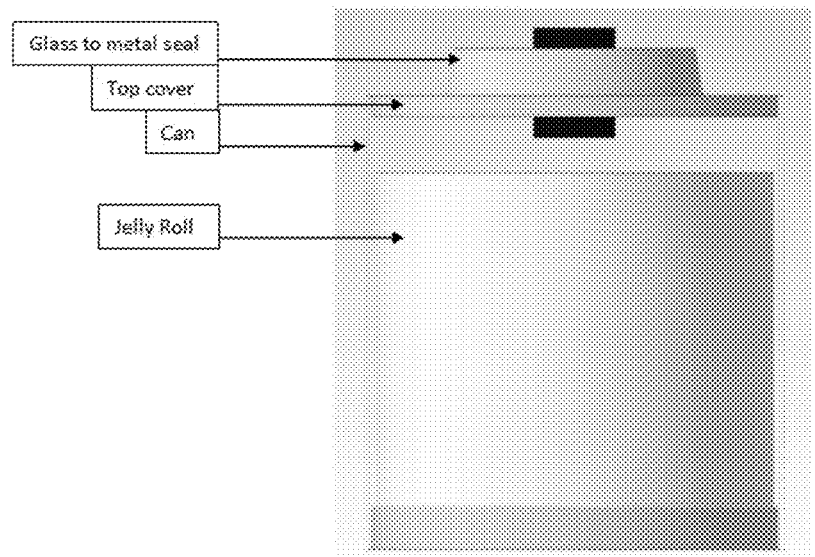
FIGS. 31A and 31B, collectively referred to herein as FIG. 31, depict a cell assembly without excess internal space.
Figure 31B:
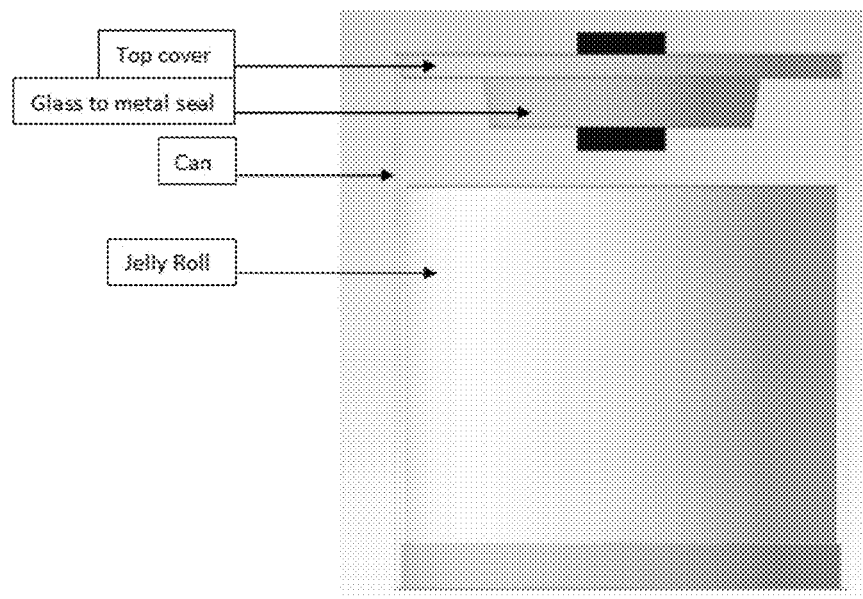
Figure 32:
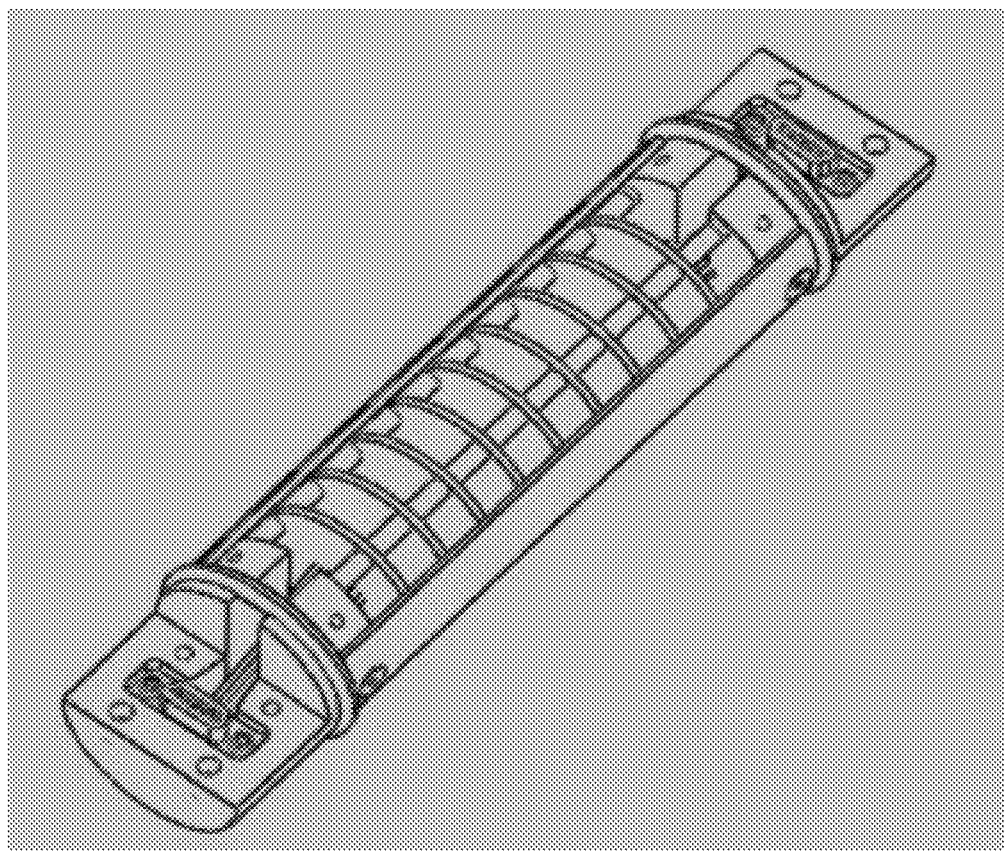
FIG. 32 depicts a downhole housing for holding the control circuits, with a cut away from the housing showing the internal components.

In certain embodiments, in order to limit the excess space in the ultracapacitors the glass to metal seal can be flipped 180 degrees so the pin is outside of the can instead of inside. Reduction of this excess space in the ultracapacitor serves to limit the amount of electrolyte needed inside the capacitor. FIGS. 31A and 31B show how excess space may be limited by flipping the glass to metal seal so that the side with the thicker housing is present on the outside of the cell rather than the inside. Such strategy may be used on any size can with any glass to metal seal that has a body housing that is thicker than the top cover being used in the can.

B. Housing of the Systems of the Invention

Figure 10A:
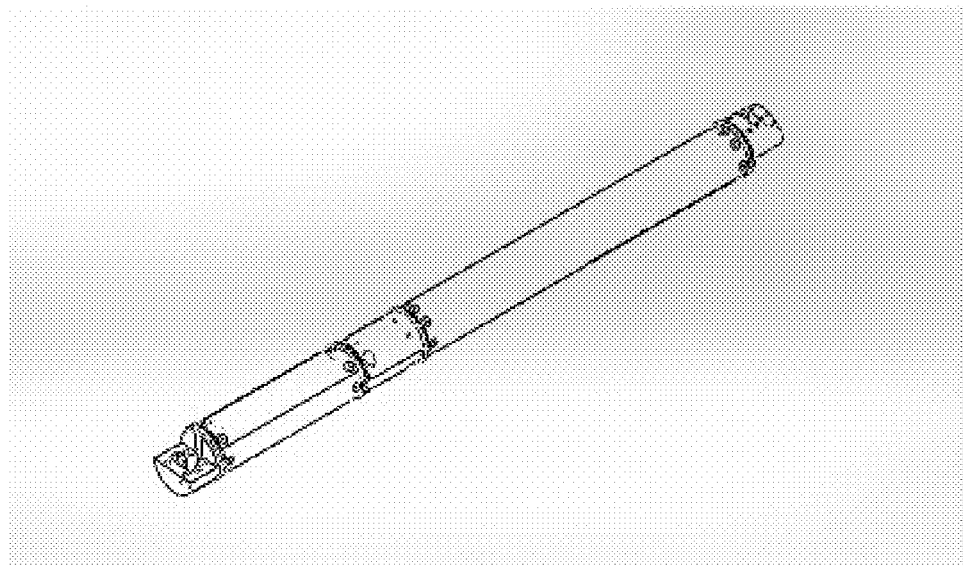
FIG. 10, depicts the modular housing system, e.g., the component housing in both assembled and disconnected views.
Figure 10B:
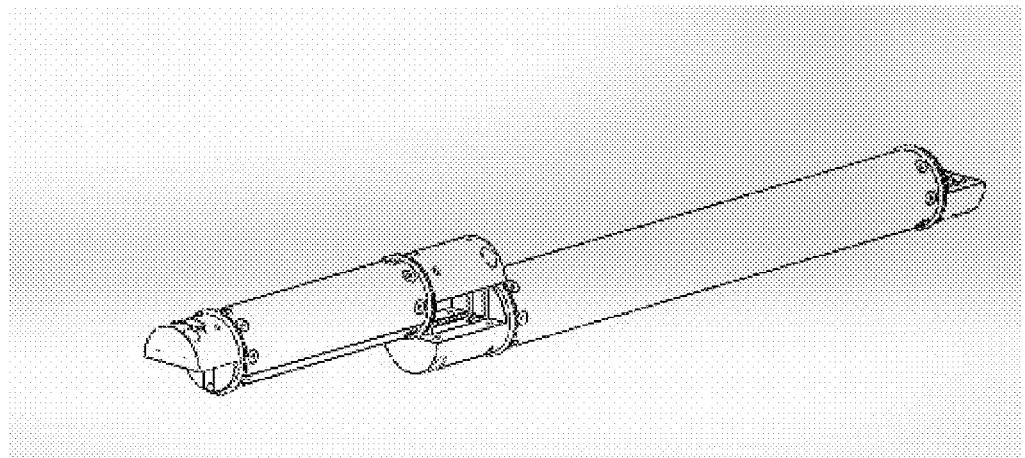
Figure 33:
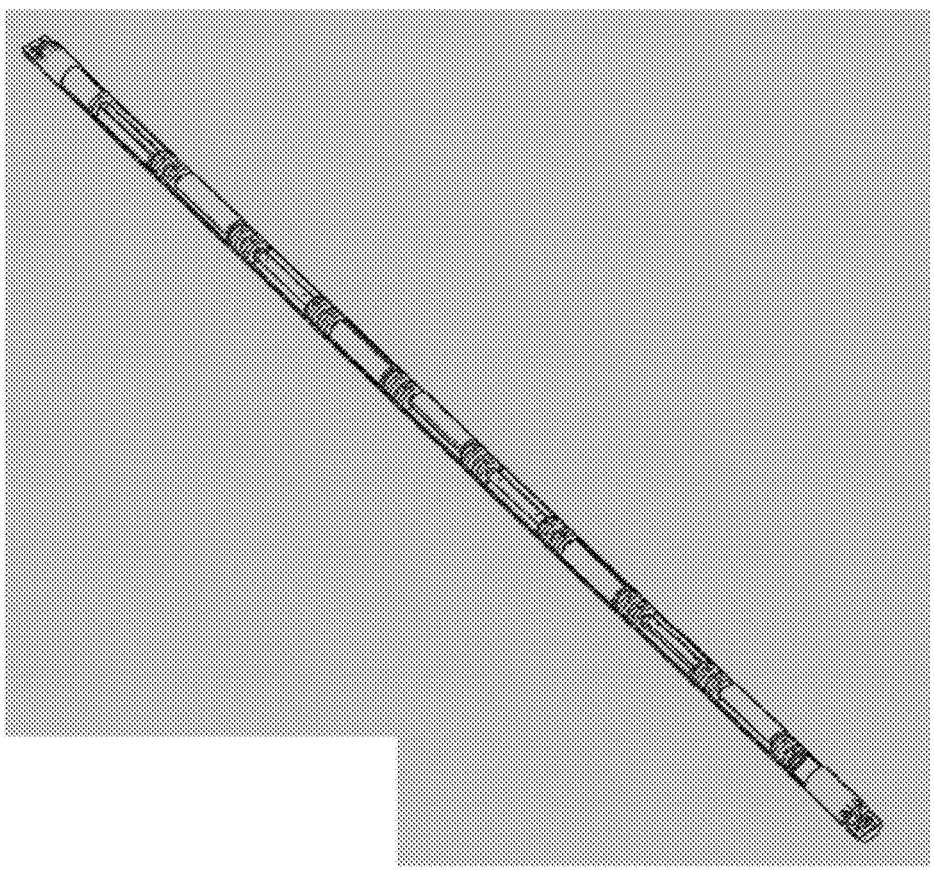
FIG. 33 depicts a downhole housing for holding the control circuits, with a cut away from the housing showing the internal components.
Figure 34:
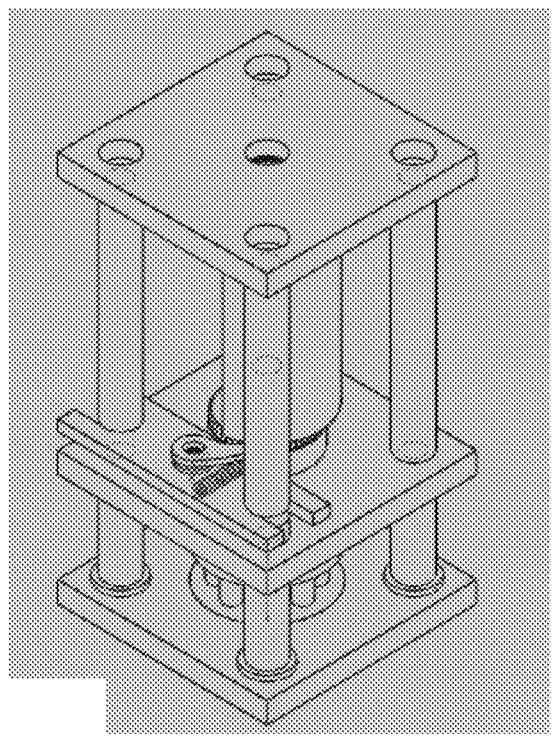
FIG. 34 depicts a schematic drawing of a plurality of RIEGs in a housing with a cut away from the housing showing the internal components.
Figure 35:
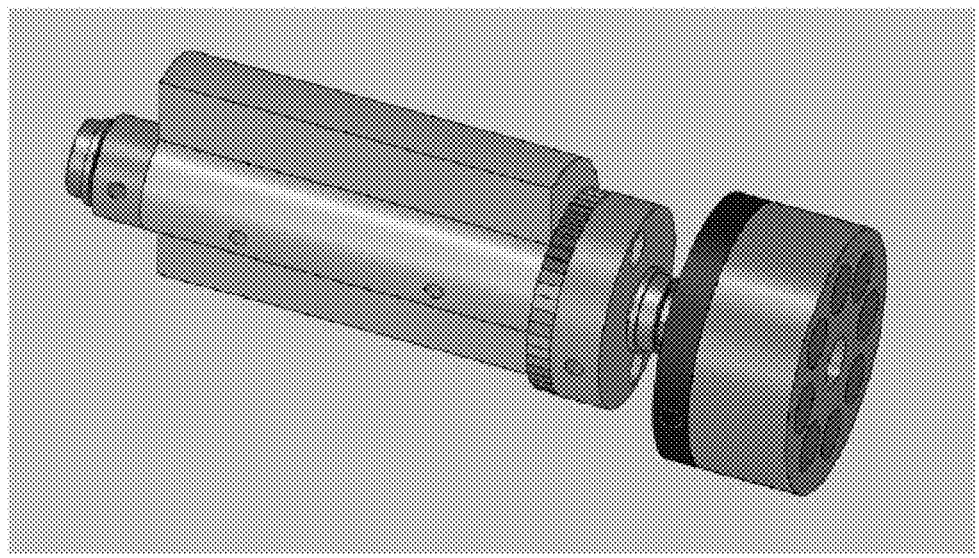
FIG. 35 depicts a schematic drawing of the RIEG device as mounted ready for testing.

Once components, including the RIEG, control circuits, and any HTRES, e.g., ultracapacitors of the present invention, have been assembled (i.e., interconnected), these may be installed/disposed within a housing. For example, the assembly may be inserted into the housing such as shown in FIG. 33 or FIG. 10. In order to ensure a mechanically robust system of the invention, as well as for prevention of electrical interference and the like, in some embodiments, encapsulant may be poured into the housing. Generally, the encapsulant fills all void spaces within the housing.

In certain embodiments, the housing size is selected to fit the RIEG, e.g., the diameter of the RIEG. As such, the dimensions of the outer diameter may be affected by circuit board diameter of the MSID.

In certain embodiments, the housing contains the RIEG and control circuit only.

In certain embodiments, the housing contains the RIEG, control circuit and the HTRES, e.g., the ultracapacitors of the present invention, e.g., an ultracapacitor string of the present invention.

In certain embodiments, the housing comprises a 15 pin connector containment channel. In certain embodiments, the 15 pin connector containment channel comprises a "through all pocket," or a cut out in the cap assembly of the housing design to provide a wide turning radius that reduces the stress concentration of the wire joint at the exit of the Micro-D connector. In this way wire contact with sharp edges and the wall is limited and reduces the risk of wire damage.

In certain embodiments, the housing affords concentric and decoupled mounting of the RIEG to 15 pin connector containment channel.

In certain embodiments, the housing comprises an open wire containment channel that allows for the RIEG and capacitor to be assembled independent from the housing, which significantly increases the manufacturability of the system. The open wire containment channel provides for drop in place mounting of the 15 pin Micro-D connector. In a particular embodiment, the tapered entrance of the open wire containment channel limits the contact of the wires with edges and channel walls.

In certain embodiments, the housing further comprises a removable thin walled housing cover. In certain embodiments, the removable thin walled housing chassis cover provides for unobstructed path for wires to be routed along side the RIEG structure and/or the control circuit within the chassis. In a particular embodiment, a radial extrusion of the housing insert provides a mounting face for the removable thin walled cover.

In certain embodiments, the assembly of the RIEG, control circuit, and any HTRES may further comprise a 37 pin connector as a removable interface between the RIEG module, the control circuit module, and/or the HTRES module, e.g., capacitor module. This removable interface creates the inherent modularity of the system.

In certain embodiments, the 37 pin connector may be disposed in a removable housing interface between separate housings containing the RIEG, the control circuit, and the HTRES, e.g., an ultracapacitor string described herein. This provides for seamless and repeatable connection disconnection of electronics module and capacitor module. In certain embodiments, the 37 pin connection(s), e.g., Micro-D, is axially mounted and reduces the radial footprint required to secure the connector in place. In certain embodiments, the dual open wire channel of the separate housing interface accommodates the routing of two sets of wires from the 37 pin Micro-D connector. "Through all pockets" in one or two sides of the housing interface provides for a wide turning radius for the wires from the connector into the open channel.

As such, in one embodiment of the invention, the housing is modular, and comprises a three component housing system to separately contain (1) the control circuit, (2) the RIEG, e.g., in an MSID housing, and (3) the connecting wiring between the two, e.g., in a wiring interface housing. In addition, the housing may also comprise a fourth component of an HTRES housing, e.g., housing for the ultracapacitor strings described herein. In certain embodiments, each component of the housing system may be separated into its own housing assembly that separately contains the RIEG, the control circuit, the HTRES, or the wiring, e.g., in which each housing component is designed to interface with the other housing assemblies. In certain embodiments the connecting wiring between the RIEG and the HTRES further comprises a connector, e.g., a 37 pin connector. In certain embodiments, the separate wiring interface affords modularity to the housing, which may serve to increase serviceability, improve the ease of manufacture, and reduce costs of production and/or maintenance. In certain embodiments, the system is a power system.

In certain embodiments, high temperature chemical resistant O-rings, e.g., viton O-rings, provide secure mounting and dampening which reduces the transmission of vibration from the pressure to barrel to system housing. In a particular embodiment, the O-rings are located at the base of the 15 and 37 pin connector housings, e.g., and provide for concentric mounting of the system housing within a pressure barrel.

i. Potting

In certain embodiments, the housing container further comprises an encapsulant that encapsulates the energy storage and the controller, such process also being known as "potting." In a particular embodiment, the control circuit and/or the HTRES may be immersed in an encapsulant for protection against vibration and shock in high temperature environments Accordingly, the power and data systems described herein may be "potted," or inserted into the housing that is then filled with encapsulant. Among other things, the encapsulant provides for damping of mechanical shock as well as protection from electrical and environmental interferences. In one embodiment, the housing is filled with SYLGARD® 170 silicone elastomer (available from Dow Corning of Midland, Mich.) as the encapsulant.

Embodiments of the encapsulant may include, for example, a fast cure silicone elastomer, e.g., SYLGARD 170 (available from Dow Corning of Midland Mich.), which exhibits a low viscosity prior to curing, a dielectric constant at 100 kHz of 2.9, a dielectric strength of 530 volts per mil v/mil, and a dissipation factor at 100 Hz of 0.005, and a temperature range of about minus forty five degrees Celsius to about two hundred degrees Celsius. Other encapsulants may be used. An encapsulant may be selected, for example, according to electrical properties, temperature range, viscosity, hardness, and the like.

ii. Advanced Potting

In certain embodiments, by providing a sufficient number of expansion voids, e.g., at least one expansion void, in the encapsulation material, e.g. a silicone elastomer gel, in which the controller is potted in the housing, e.g., using the advanced potting method described herein, deformation of the circuit boards is reduced at high temperatures.

In certain embodiments, advanced potting methods may be utilized to prepare the systems of the present invention, e.g., in the fabrication process.

The advanced potting method comprises incorporating the use of removable inserts that are inserted, e.g., radially, through slots in the housing chassis wall. The inserts are placed at high silicone elastomer volume regions (e.g., centered between boards) during the potting process. Once silicone within chassis has cured, inserts are extracted through the slots leaving an air void of equal volume to the insert.

The advanced potting methods provided herein serve to reduce or eliminate circuit board deformation due to the thermal expansion of the silicone elastomer potting compound. Silicone elastomer has a particularly high coefficient of thermal expansion and as a result during high temperature conditions high stress concentrations develop on the circuit boards causing plastic deformation.

The advanced potting process creates air voids, e.g., at least one air void, at various high volume regions along the control circuit. During high temperature conditions these air voids provide an expansion path for the expanding silicone elastomer. As a result, stress concentrations are drawn away from circuit boards. Reduction in the stress concentrations on the circuit boards also reduces the stress on the solder joints of the surface mount components.

7. Ultracapacitors Used in the Power Supplies of the Invention

A. Ultracapacitors

Further disclosed herein are capacitors for use the present invention that provide users with improved performance in a wide range of temperatures. Such ultracapacitors may comprise an energy storage cell and an electrolyte system within an hermetically sealed housing, the cell electrically coupled to a positive contact and a negative contact, wherein the ultracapacitor is configured to operate at a temperature within a temperature range between about −40 degrees Celsius to about 210 degrees Celsius. For example, the capacitors for use in the present invention may comprise advanced electrolyte systems described herein, and may be operable at temperatures ranging from about as low as minus 40 degrees Celsius to as high as about 210 degrees Celsius. Such capacitors shall be described herein with reference to FIG. 3.

In general, the capacitor of the present invention includes energy storage media that is adapted for providing a combination of high reliability, wide operating temperature range, high power density and high energy density when compared to prior art devices. The capacitor includes components that are configured to ensure operation over the temperature range, and includes electrolytes 6 that are selected, e.g., from known electrolyte systems or from the advanced electrolyte systems described herein. The combination of construction, energy storage media and electrolyte systems described herein provide the robust capacitors for use in the present invention that afford operation under extreme conditions with enhanced properties over existing capacitors, and with greater performance and durability.

Accordingly, the present invention may comprise an ultracapacitor comprising: an energy storage cell and an advanced electrolyte system (AES) within an hermetically sealed housing, the cell electrically coupled to a positive contact and a negative contact, wherein the ultracapacitor is configured to operate at a temperature within a temperature range ("operating temperature") between about −40 degrees Celsius to about 210 degrees Celsius; about −35 degrees Celsius to about 210 degrees Celsius; about −40 degrees Celsius to about 205 degrees Celsius; about −30 degrees Celsius to about 210 degrees Celsius; about −40 degrees Celsius to about 200 degrees Celsius; about −25 degrees Celsius to about 210 degrees Celsius; about −40 degrees Celsius to about 195 degrees Celsius; about −20 degrees Celsius to about 210 degrees Celsius; about −40 degrees Celsius to about 190 degrees Celsius; about −15 degrees Celsius to about 210 degrees Celsius; about −40 degrees Celsius to about 185 degrees Celsius; about −10 degrees Celsius to about 210 degrees Celsius; about −40 degrees Celsius to about 180 degrees Celsius; about −5 degrees Celsius to about 210 degrees Celsius; about −40 degrees Celsius to about 175 degrees Celsius; about 0 degrees Celsius to about 210 degrees Celsius; about −40 degrees Celsius to about 170 degrees Celsius; about 5 degrees Celsius to about 210 degrees Celsius; about −40 degrees Celsius to about 165 degrees Celsius; about 10 degrees Celsius to about 210 degrees Celsius; about −40 degrees Celsius to about 160 degrees Celsius; about 15 degrees Celsius to about 210 degrees Celsius; about −40 degrees Celsius to about 155 degrees Celsius; about 20 degrees Celsius to about 210 degrees Celsius; about −40 degrees Celsius to about 150 degrees Celsius.

Figure 3:
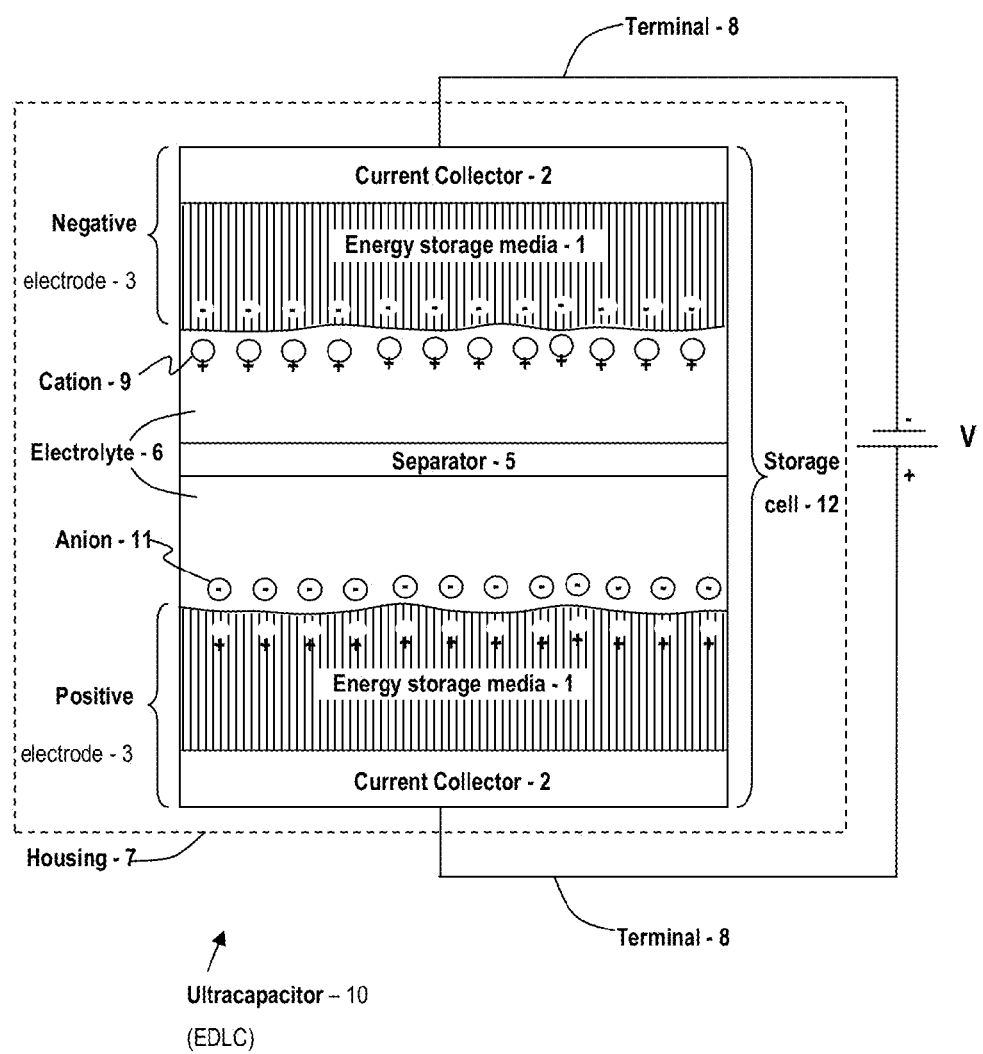
FIG. 3 illustrates aspects of an exemplary ultracapacitor.

For example, as shown in FIG. 3, an exemplary embodiment of a capacitor is shown. In this case, the capacitor is an "ultracapacitor 10." The exemplary ultracapacitor 10 is an electric double-layer capacitor (EDLC). The ultracapacitor 10 may be embodied in several different form factors (i.e., exhibit a certain appearance). Examples of potentially useful form factors include a cylindrical cell, an annular or ring-shaped cell, a flat prismatic cell or a stack of flat prismatic cells comprising a box-like cell, and a flat prismatic cell that is shaped to accommodate a particular geometry such as a curved space. A cylindrical form factor may be most useful in conjunction with a cylindrical system or a system mounted in a cylindrical form factor or having a cylindrical cavity. An annular or ring-shaped form factor may be most useful in conjunction with a system that is ring-shaped or mounted in a ring-shaped form factor or having a ring-shaped cavity. A flat prismatic form factor may be most useful in conjunction with a system that is rectangularly-shaped, or mounted in a rectangularly-shaped form factor or having a rectangularly-shaped cavity.

While generally disclosed herein in terms of a "jelly roll" application (i.e., a storage cell 12 that is configured for a cylindrically shaped housing 7), the rolled storage cell 23 (referring to FIG. 25) may take any form desired. For example, as opposed to rolling the storage cell 12, folding of the storage cell 12 may be performed to provide for the rolled storage cell 23. Other types of assembly may be used. As one example, the storage cell 12 may be a flat cell, referred to as a coin type, pouch type, or prismatic type of cell. Accordingly, rolling is merely one option for assembly of the rolled storage cell 23. Therefore, although discussed herein in terms of being a "rolled storage cell 23", this is not limiting. It may be considered that the term "rolled storage cell 23" generally includes any appropriate form of packaging or packing the storage cell 12 to fit well within a given design of the housing 7.

Various forms of the ultracapacitor 10 may be joined together. The various forms may be joined using known techniques, such as welding contacts together, by use of at least one mechanical connector, by placing contacts in electrical contact with each other and the like. A plurality of the ultracapacitors 10 may be electrically connected in at least one of a parallel and a series fashion.

For the purposes of this invention, an ultracapacitor 10 may have a volume in the range from about 0.05 cc to about 7.5 liters.

The components of the ultracapacitors of the present invention will now be discussed, in turn.

B. Electrolyte Systems i. Electrolytes

Figure 4:
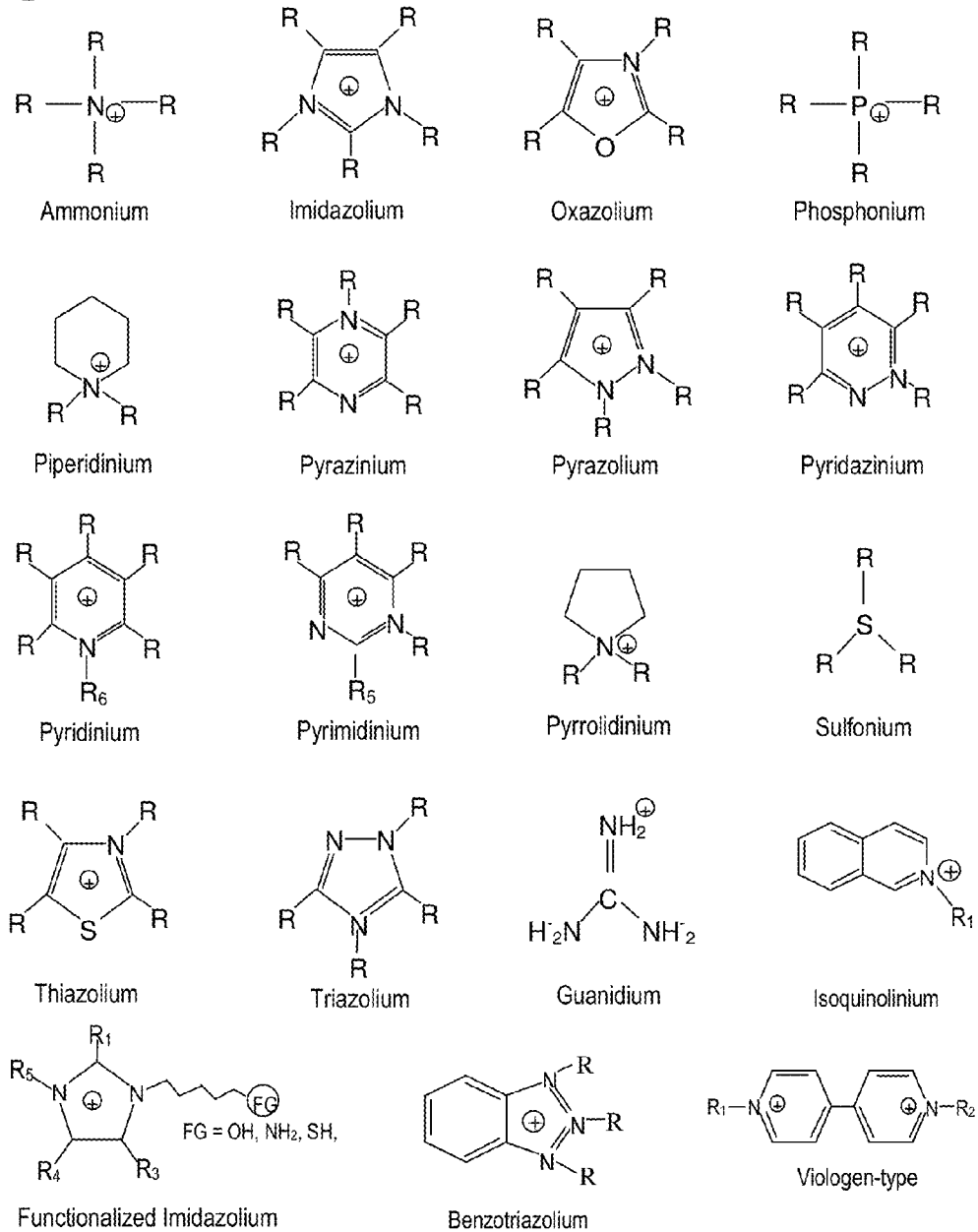
FIG. 4 depicts embodiments of primary structures for cations that may be included in an exemplary ultracapacitor.

The electrolyte 6 includes a pairing of cations 9 and anions 11 and may include a solvent. The electrolyte 6 may be referred to as an "ionic liquid" as appropriate. Various combinations of cations 9, anions 11 and solvent may be used. In the exemplary ultracapacitor 10, the cations 9 may include at least one of 1-(3-Cyanopropyl)-3-methylimidazolium, 1,2-Dimethyl-3-propylimidazolium, 1,3-Bis(3-cyanopropyl) imidazolium, 1,3-Diethoxyimidazolium, 1-Butyl-1-methylpiperidinium, 1-Butyl-2,3-dimethylimidazolium, 1-Butyl-3-methylimidazolium, 1-Butyl-4-methylpyridinium, 1-Butylpyridinium, 1-Decyl-3-methylimidazolium, 1-Ethyl-3-methylimidazolium, 3-Methyl-1-propylpyridinium, and combinations thereof as well as other equivalents as deemed appropriate. Additional exemplary cations 9 include imidazolium, pyrazinium, piperidinium, pyridinium, pyrimidinium, and pyrrolidinium (structures of which are depicted in FIG. 4). In the exemplary ultracapacitor 10, the anions 11 may include at least one of bis(trifluoromethanesulfonate) imide, tris(trifluoromethanesulfonate)methide, dicyanamide, tetrafluoroborate, hexafluorophosphate, trifluoromethanesulfonate, bis(pentafluoroethanesulfonate)imide, thiocyanate, trifluoro(trifluoromethyl)borate, and combinations thereof as well as other equivalents as deemed appropriate.

The solvent may include acetonitrile, amides, benzonitrile, butyrolactone, cyclic ether, dibutyl carbonate, diethyl carbonate, diethylether, dimethoxyethane, dimethyl carbonate, dimethylformamide, dimethylsulfone, dioxane, dioxolane, ethyl formate, ethylene carbonate, ethylmethyl carbonate, lactone, linear ether, methyl formate, methyl propionate, methyltetrahydrofuran, nitrile, nitrobenzene, nitromethane, n-methylpyrrolidone, propylene carbonate, sulfolane, sulfone, tetrahydrofuran, tetramethylene sulfone, thiophene, ethylene glycol, diethylene glycol, triethylene glycol, polyethylene glycols, carbonic acid ester, 5'-butyrolactone, nitrile, tricyanohexane, any combination thereof or other material(s) that exhibit appropriate performance characteristics.

Referring now to FIG. 4, there are shown various additional embodiments of cations 9 suited for use in an ionic liquid to provide the electrolyte 6. These cations 9 may be used alone or in combination with each other, in combination with at least some of the foregoing embodiments of cations 9, and may also be used in combination with other cations 9 that are deemed compatible and appropriate by a user, designer, manufacturer or other similarly interested party. The cations 9 depicted in FIG. 4 include, without limitation, ammonium, imidazolium, oxazolium, phosphonium, piperidinium, pyrazinium, pyrazinium, pyridazinium, pyridinium, pyrimidinium, pyrrolidinium, sulfonium, thiazolium, triazolium, guanidium, isoquinolinium, benzotriazolium, viologentypes, and functionalized imidazolium cations.

With regard to the cations 9 shown in FIG. 4, various branch groups ($R_1, R_2, R_3, \ldots R_x$) are included. In the case of the cations 9, each branch groups ($R_x$) may be one of alkyl, heteroalkyl, alkenyl, heteroalkenyl, alkynyl, heteroalkynyl, halo, amino, nitro, cyano, hydroxyl, sulfate, sulfonate, or a carbonyl group any of which is optionally substituted.

Generally, any ion with a negative charge maybe used as the anion 11. The anion 11 selected is generally paired with a large organic cation 9 to form a low temperature melting ionic salt. Room temperature (and lower) melting salts come from mainly large anions 9 with a charge of −1. Salts that melt at even lower temperatures generally are realized with anions 11 with easily delocalized electrons. Anything that will decrease the affinity between ions (distance, delocalization of charge) will subsequently decrease the melting point. Although possible anion formations are virtually infinite, only a subset of these will work in low temperature ionic liquid application. This is a non-limiting overview of possible anion formations for ionic liquids.

Common substitute groups (a) suited for use of the anions 11 provided in Table 1 include: —F$^-$, —Cl$^-$, —Br$^-$, —I$^-$, —OCH$_3^-$, —CN$^-$, —SCN$^-$, —C$_2$H$_3$O$_2^-$, —ClO$^-$, —ClO$_2^-$, —ClO$_3^-$, —ClO$_4^-$, —NCO$^-$, —NCS$^-$, —NCSe$^-$, —NCN$^-$, —OCH(CH$_3$)$_2^-$, —CH$_2$OCH$_3^-$, —COOH$^-$, —OH$^-$, —SOCH$_3^-$, —SO$_2$CH$_3^-$, —SOCH$_3^-$, —SO$_2$CF$_3^-$, —SO$_3$H$^-$, —SO$_3$CF$_3^-$, —O(CF$_3$)$_2$C$_2$(CF$_3$)$_2$O$^-$, —CF$_3^-$, —CHF$_2^-$, —CH$_2$F$^-$, —CH$_3^-$, —NO$_3^-$, —NO$_2^-$, —SO$_3^-$, —SO$_4^{2-}$, —SF$_5^-$, —CB$_{11}$H$_{12}^-$, —CB$_{11}$H$_6$C$_{16}^-$, —CH$_3$CB$_{11}$H$_{11}^-$, —C$_2$H$_5$CB$_{11}$H$_{11}^-$, -A-PO$_4^-$, -A-SO$_2^-$, A-SO$_3^-$, -A-SO$_3$H$^-$, -A-COO$^-$, -A-CO$^-$ {where A is a phenyl (the phenyl group or phenyl ring is a cyclic group of atoms with the formula C$_6$H$_5$) or substituted phenyl, alkyl, (a radical that has the general formula CnH$_{2n+1}$, formed by removing a hydrogen atom from an alkane) or substituted alkyl group, negatively charged radical alkanes, (alkane are chemical compounds that consist only of hydrogen and carbon atoms and are bonded exclusively by single bonds) halogenated alkanes and ethers (which are a class of organic compounds that contain an oxygen atom connected to two alkyl or aryl groups).

With regard to anions 11 suited for use in an ionic liquid that provides the electrolyte 6, various organic anions 11 may be used. Exemplary anions 11 and structures thereof are provided in Table 1. In a first embodiment, (No. 1), exemplary anions 11 are formulated from the list of substitute groups (a) provided above, or their equivalent. In additional embodiments, (Nos. 2-5), exemplary anions 11 are formulated from a respective base structure (Y$_2$, Y$_3$, Y$_4$, . . . Y$_n$) and a respective number of anion substitute groups (á$_1$, á$_2$, á$_3$, . . . á$_n$), where the respective number of anion substitute groups (á) may be selected from the list of substitute (á) groups provided above, or their equivalent. Note that in some embodiments, a plurality of anion substitute groups (á) (i.e., at least one differing anion substitute group (á)) may be used in any one embodiment of the anion 11. Also, note that in some embodiments, the base structure (Y) is a single atom or a designated molecule (as described in Table 1), or may be an equivalent.

More specifically, and by way of example, with regard to the exemplary anions provided in Table 1, certain combinations may be realized. As one example, in the case of No. 2, the base structure (Y$_2$) includes a single structure (e.g., an atom, or a molecule) that is bonded to two anion substitute groups (á$_2$). While shown as having two identical anion substitute groups (á$_2$), this need not be the case. That is, the base structure (Y$_2$) may be bonded to varying anion substitute groups (á$_2$), such as any of the anion substitute groups (a) listed above. Similarly, the base structure (Y$_3$) includes a single structure (e.g., an atom) that is bonded to three anion substitute groups (á$_3$), as shown in case No. 3. Again, each of the anion substitute groups (á) included in the anion may be varied or diverse, and need not repeat (be repetitive or be symmetric) as shown in Table 1. In general, with regard to the notation in Table 1, a subscript on one of the base structures denotes a number of bonds that the respective base structure may have with anion substitute groups (á). That is, the subscript on the respective base structure (Y$_n$) denotes a number of accompanying anion substitute groups (á$_n$) in the respective anion.

TABLE 1

Exemplary Organic Anions for an Ionic Liquid

| No.: | Ion | Guidelines for Anion Structure and Exemplary Ionic Liquids |
|---|---|---|
| 1 | -á$_1$ | Some of the above á may mix with organic cations to form an ionic liquid.<br>An exemplary anion: Cl$^-$ Exemplary ionic liquid: [BMI*][Cl]<br>*BMI—butyl methyl immadizolium |
| 2 | -Y$_2$á$_2$ | Y$_2$ may be any of the following: N, O, C=O, S=O.<br>Exemplary anions include: B (CF$_3$C0$_2$)$_4^-$ N(SO$_2$CF$_3$)$_2^-$<br>Exemplary ionic liquid: [EMI*][NTF$_2$]<br>*EMI—ethyl methyl immadizolium |
| 3 | -Y$_3$á$_3$ | Y$_3$ may be any of the following: Be, C, N, O, Mg, Ca, Ba, Ra, Au.<br>Exemplary anions include: —C(SO$_2$CF$_3$)$_3^-$<br>Exemplary ionic liquid: [BMI] C(SO$_2$CF$_3$)$_3^-$ |
| 4 | -Y$_4$á$_4$ | Y$_4$ may be any of the following: B, Al, Ga, Th, In, P.<br>Exemplary anions include: —BF$_4^-$, —AlCl$_4^-$<br>Exemplary ionic liquid: [BMI][BF$_4$] |
| 5 | -Y$_6$á$_6$ | Y$_6$ can be any of the following: P, S, Sb, As, N, Bi, Nb, Sb.<br>Exemplary anions include: —P(CF$_3$)$_4$F$_2^-$, —AsF$_6^-$<br>Exemplary ionic liquid: [BMI][PF$_6$] | ii. Advanced Electrolyte Systems of the Invention

The advanced electrolyte systems that may be used in the capacitors of the present invention provide the electrolyte component of the ultracapacitors of the present invention, and are noted as "electrolyte 6" in FIG. 3. The electrolyte 6 fills void spaces in and between the electrode 3 and the separator 5. In general, the advanced electrolyte systems of the invention comprise unique electrolytes, purified enhanced electrolytes, or combinations thereof, wherein the electrolyte 6 is a substance, e.g., comprised of one or more salts or ionic liquids, which disassociate into electrically charged ions (i.e., positively charged cations and negatively charged anions) and may include a solvent. In the advanced electrolyte systems of the present invention, such electrolyte components are selected based on the enhancement of certain performance and durability characteristics, and may be combined with one or more solvents, which dissolve the substance to generate compositions with novel and useful electrochemical stability and performance.

The advanced electrolyte systems that may be used in the capacitors of the present invention afford unique and distinct advantages to the ultracapacitors over existing energy storage devices (e.g., energy storage devices containing electrolytes not disclosed herein, or energy storage devices containing electrolytes having insufficient purity). These advantages include improvements in both performance and durability characteristics, such as one or more of the following: decreased total resistance, increased long-term stability of resistance (e.g., reduction in increased resistance of material over time at a given temperature), increased total capacitance, increased long-term stability of capacitance (e.g. reduction in decreased capacitance of a capacitor over time at a given temperature), increased energy density (e.g. by supporting a higher voltage and/or by leading to a higher capacitance), increased voltage stability, reduced vapor pressure, wider temperature range performance for an individual capacitor (e.g. without a significant drop in capacitance and/or increase in ESR when transitioning between two temperatures, e.g. without more than a 90% decrease in capacitance and/or a 1000% increase in ESR when transitioning from about +30°

C. to about −40° C.), increased temperature durability for an individual capacitor (e.g., less than a 50% decrease in capacitance at a given temperature after a given time and/or less than a 100% increase in ESR at a given temperature after a given time, and/or less than 10 A/L of leakage current at a given temperature after a given time, e.g., less than a 40% decrease in capacitance and/or a 75% increase in ESR, and/or less than 5 A/L of leakage current, e.g., less than a 30% decrease in capacitance and/or a 50% increase in ESR, and/or less than 1 A/L of leakage current); increased ease of manufacturability (e.g. by having a reduced vapor pressure, and therefore better yield and/or more efficient methods of filling a capacitor with electrolyte), and improved cost effectiveness (e.g. by filling void space with material that is less costly than another material). For clarity, performance characteristics relate to the properties directed to utility of the device at a given point of use suitable for comparison among materials at a similar given point of use, while durability characteristics relate to properties directed to ability to maintain such properties over time. The performance and durability examples above should serve to provide context for what are considered "significant changes in performance or durability" herein.

The properties of the AES, or Electrolyte 6, may be the result of improvements in properties selected from increases in capacitance, reductions in equivalent-series-resistance (ESR), high thermal stability, a low glass transition temperature (Tg), an improved viscosity, a particular rhoepectic or thixotropic property (e.g., one that is dependent upon temperature), as well as high conductivity and exhibited good electric performance over a wide range of temperatures. As examples, the electrolyte 6 may have a high degree of fluidicity, or, in contrast, be substantially solid, such that separation of electrode 3 is assured.

The advanced electrolyte systems of the present invention include, novel electrolytes described herein for use in high temperature ultracapacitors, highly purified electrolytes for use in high temperature ultracapacitors, and enhanced electrolyte combinations suitable for use in temperature ranges from −40 degrees Celsius to 210 degrees Celsius, without a significant drop in performance or durability across all temperatures.

In one particular embodiment, the AES comprises a novel electrolyte entity (NEE), e.g., wherein the NEE is adapted for use in high temperature ultracapacitors. In certain embodiments, the ultracapacitor is configured to operate at a temperature within a temperature range between about 80 degrees Celsius to about 210 degrees Celsius, e.g., a temperature range between about 80 degrees Celsius to about 150 degrees Celsius.

In one particular embodiment, the AES comprises a highly purified electrolyte, e.g., wherein the highly purified electrolyte is adapted for use in high temperature ultracapacitors. In certain embodiments, the ultracapacitor is configured to operate at a temperature within a temperature range between about 80 degrees Celsius to about 210 degrees Celsius.

In one particular embodiment, the AES comprises an enhanced electrolyte combination, e.g., wherein the enhanced electrolyte combination is adapted for use in both high and low temperature ultracapacitors. In certain embodiments, the ultracapacitor is configured to operate at a temperature within a temperature range between about −40 degrees Celsius to about 150 degrees Celsius.

As such, and as noted above, the advantages over the existing electrolytes of known energy storage devices are selected from one or more of the following improvements: decreased total resistance, increased long-term stability of resistance, increased total capacitance, increased long-term stability of capacitance, increased energy density, increased voltage stability, reduced vapor pressure, wider temperature range performance for an individual capacitor, increased temperature durability for an individual capacitor, increased ease of manufacturability, and improved cost effectiveness.

In certain embodiments of the ultracapacitor, the energy storage cell comprises a positive electrode and a negative electrode.

In certain embodiments of the ultracapacitor, at least one of the electrodes comprises a carbonaceous energy storage media, e.g., wherein the carbonaceous energy storage media comprises carbon nanotubes. In particular embodiments, the carbonaceous energy storage media may comprise at least one of activated carbon, carbon fibers, rayon, graphene, aerogel, carbon cloth, and carbon nanotubes.

In certain embodiments of the ultracapacitor, each electrode comprises a current collector.

In certain embodiments of the ultracapacitor, the AES is purified to reduce impurity content. In certain embodiments of the ultracapacitor, the content of halide ions in the electrolyte is less than about 1,000 parts per million, e.g., less than about 500 parts per million, e.g., less than about 100 parts per million, e.g., less than about 50 parts per million. In a particular embodiment, the halide ion in the electrolyte is selected from one or more of the halide ions selected from the group consisting of chloride, bromide, fluoride and iodide. In particular embodiments, the total concentration of impurities in the electrolyte is less than about 1,000 parts per million. In certain embodiments, the impurities are selected from one or more of the group consisting of bromoethane, chloroethane, 1-bromobutane, 1-chlorobutane, 1-methylimidazole, ethyl acetate and methylene chloride.

In certain embodiments of the ultracapacitor, the total concentration of metallic species in the electrolyte is less than about 1,000 parts per million. In a particular embodiment, the metallic species is selected from one or more metals selected from the group consisting of Cd, Co, Cr, Cu, Fe, K, Li, Mo, Na, Ni, Pb, and Zn. In another particular embodiment, the metallic species is selected from one or more alloys of metals selected from the group consisting of Cd, Co, Cr, Cu, Fe, K, Li, Mo, Na, Ni, Pb, and Zn. In yet another particular embodiment, the metallic species is selected from one or more oxides of metals selected from the group consisting of Cd, Co, Cr, Cu, Fe, K, Li, Mo, Na, Ni, Pb, and Zn.

In certain embodiments of the ultracapacitor, the total water content in the electrolyte is less than about 500 parts per million, e.g., less than about 100 parts per million, e.g., less than about 50 parts per million, e.g., about 20 parts per million.

In certain embodiments of the ultracapacitor, the housing comprises a barrier disposed over a substantial portion of interior surfaces thereof. In particular embodiments, the barrier comprises at least one of polytetrafluoroethylene (PTFE), perfluoroalkoxy (PFA), fluorinated ethylene propylene (FEP), ethylene tetrafluoroethylene (ETFE). In particular embodiments, the barrier comprises a ceramic material. The barrier may also comprise a material that exhibits corrosion resistance, a desired dielectric property, and a low electrochemical reactivity. In a specific embodiment of the barrier, the barrier comprises multiple layers of materials.

In certain embodiments of the ultracapacitor, the housing comprises a multilayer material, e.g., wherein the multilayer material comprises a first material clad onto a second material. In a particular embodiment, the multilayer material comprises at least one of steel, tantalum and aluminum.

In certain embodiments of the ultracapacitor, the housing comprises at least one hemispheric seal.

In certain embodiments of the ultracapacitor, the housing comprises at least one glass-to-metal seal, e.g., wherein a pin of the glass-to-metal seal provides one of the contacts. In a particular embodiment, the glass-to-metal seal comprises a feed-through that is comprised of a material selected from the group consisting of an iron-nickel-cobalt alloy, a nickel iron alloy, tantalum, molybdenum, niobium, tungsten, and a form of stainless and titanium. In another particular embodiment, the glass-to-metal seal comprises a body that is comprised of at least one material selected from the group consisting of nickel, molybdenum, chromium, cobalt, iron, copper, manganese, titanium, zirconium, aluminum, carbon, and tungsten and an alloy thereof.

In certain embodiments of the ultracapacitor, the energy storage cell comprises a separator to provide electrical separation between a positive electrode and a negative electrode, e.g., wherein the separator comprises a material selected from the group consisting of polyamide, polytetrafluoroethylene (PTFE), polyether ether ketone (PEEK), aluminum oxide ($Al_2O_3$), fiberglass, fiberglass reinforced plastic, or any combination thereof. In a particular embodiment, the separator is substantially free of moisture. In another particular embodiment, the separator is substantially hydrophobic.

In certain embodiments of the ultracapacitor, the hermetic seal exhibits a leak rate that is no greater than about $5.0\times10^{-6}$ atm-cc/sec, e.g., no greater than about $5.0\times10^{-7}$ atm-cc/sec, e.g., no greater than about $5.0\times10^{-8}$ atm-cc/sec, e.g., no greater than about $5.0\times10^{-9}$ atm-cc/sec, e.g., no greater than about $5.0\times10^{-10}$ atm-cc/sec.

In certain embodiments of the ultracapacitor, at least one contact is configured for mating with another contact of another ultracapacitor.

In certain embodiments of the ultracapacitor, the storage cell comprises a wrapper disposed over an exterior thereof, e.g., wherein the wrapper comprises one of PTFE and polyimide.

In certain embodiments of the ultracapacitor, a volumetric leakage current is less than about 10 Amperes per Liter within the temperature range.

In certain embodiments of the ultracapacitor, a volumetric leakage current is less than about 10 Amperes per Liter over a specified voltage range between about 0 Volts and about 4 Volts, e.g. between about 0 Volts and about 3 Volts, e.g. between about 0 Volts and about 2 Volts, e.g. between about 0 Volts and about 1 Volt. In certain embodiments of the ultracapacitor, the level of moisture within the housing is less than about 1,000 parts per million (ppm), e.g., less than about 500 parts per million (ppm), e.g., less than about 350 parts per million (ppm).

In certain embodiments of the ultracapacitor, the moisture content in an electrode of the ultracapacitor that is less than about 1,000 ppm, e.g., less than about 500 ppm, e.g., less than about 350 parts per million (ppm).

In certain embodiments of the ultracapacitor, the moisture content in a separator of the ultracapacitor that is less than about 1,000 ppm, e.g., less than about 500 ppm, e.g., less than about 160 parts per million (ppm).

In certain embodiments of the ultracapacitor, the chloride content is less than about 300 ppm for one of the components selected from the group consisting of an electrode, electrolyte and a separator.

In certain embodiments of the ultracapacitor, the volumetric leakage current (mA/cc) of the ultracapacitor is less than about 10 mA/cc while held at the substantially constant temperature, e.g., less than about 1 mA/cc while held at the substantially constant temperature. In a particular embodiment, In certain embodiments of the ultracapacitor, the volumetric leakage current of the ultracapacitor is greater than about 0.0001 mA/cc while held at the substantially constant temperature.

In certain embodiments of the ultracapacitor, volumetric capacitance of the ultracapacitor is between about 6 F/cc and about 1 mF/cc; between about 10 F/cc and about 5 F/cc; or between about 50 F/cc and about 8 F/cc.

In certain embodiments of the ultracapacitor, the volumetric ESR of the ultracapacitor is between about 20 mOhms·cc and 200 mOhms·cc; between about 150 mOhms·cc and 2 Ohms·cc; between about 1.5 Ohms·cc and 200 Ohms·cc; or between about 150 Ohms·cc and 2000 Ohms·cc.

In certain embodiments of the ultracapacitor, the ultracapacitor exhibits a capacitance decrease less than about 90 percent while held at a substantially constant voltage and operating temperature. In a particular embodiment, the ultracapacitor exhibits a capacitance decrease less than about 90 percent while held at a substantially constant voltage and operating temperature for at least 1 hour, e.g. for at least 10 hours, e.g. for at least 50 hours, e.g. for at least 100 hours, e.g. for at least 200 hours, e.g. for at least 300 hours, e.g. for at least 400 hours, e.g. for at least 500 hours, e.g. for at least 1,000 hours.

In certain embodiments of the ultracapacitor, the ultracapacitor exhibits an ESR increase less than about 1,000 percent while held at a substantially constant voltage and operating temperature for at least 1 hour, e.g. for at least 10 hours, e.g. for at least 50 hours, e.g. for at least 100 hours, e.g. for at least 200 hours, e.g. for at least 300 hours, e.g. for at least 400 hours, e.g. for at least 500 hours, e.g. for at least 1,000 hours.

iii. Novel Electrolyte Entities (NEE)

The advanced electrolyte systems (AES) of the present invention comprise, in one embodiment, certain novel electrolytes for use in high temperature ultracapacitors. In this respect, it has been found that maintaining purity and low moisture relates to a degree of performance of the energy storage 30; and that the use of electrolytes that contain hydrophobic materials and which have been found to demonstrate greater purity and lower moisture content are advantageous for obtaining improved performance. These electrolytes exhibit good performance characteristics in a temperature range of about 80 degrees Celsius to about 210 degrees Celsius, e.g., about 80 degrees Celsius to about 200 degrees Celsius, e.g., about 80 degrees Celsius to about 190 degrees Celsius e.g., about 80 degrees Celsius to about 180 degrees Celsius e.g., about 80 degrees Celsius to about 170 degrees Celsius e.g., about 80 degrees Celsius to about 160 degrees Celsius e.g., about 80 degrees Celsius to about 150 degrees Celsius e.g., about 85 degrees Celsius to about 145 degrees Celsius e.g., about 90 degrees Celsius to about 140 degrees Celsius e.g., about 95 degrees Celsius to about 135 degrees Celsius e.g., about 100 degrees Celsius to about 130 degrees Celsius e.g., about 105 degrees Celsius to about 125 degrees Celsius e.g., about 110 degrees Celsius to about 120 degrees Celsius.

Accordingly, novel electrolyte entities useful as the advanced electrolyte system (AES) include species comprising a cation (e.g., cations shown in FIG. 4 and described herein) and an anion, or combinations of such species. In some embodiments, the species comprises a nitrogen-containing, oxygen-containing, phosphorus-containing, and/or sulfur-containing cation, including heteroaryl and heterocyclic cations. In one set of embodiments, the advanced electrolyte system (AES) include species comprising a cation selected from the group consisting of ammonium, imidazolium, oxazolium, phosphonium, piperidinium, pyrazinium, pyrazolium, pyridazinium, pyridinium, pyrimidinium, sulfonium, thiazolium, triazolium, guanidium, isoquinolinium, benzotriazolium, and viologen-type cations, any of which may be substituted with substituents as described herein. In one embodiment, the novel electrolyte entities useful for the advanced electrolyte system (AES) of the present invention include any combination of cations presented in FIG. 4, selected from the group consisting of phosphonium, piperidinium, and ammonium, wherein the various branch groups $R_x$ (e.g., $R_1$, $R_2$, $R_3$, . . . $R_x$) may be selected from the group consisting of alkyl, heteroalkyl, alkenyl, heteroalkenyl, alkynyl, heteroalkynyl, halo, amino, nitro, cyano, hydroxyl, sulfate, sulfonate, and carbonyl, any of which is optionally substituted, and wherein at least two $R_x$ are not H (i.e., such that the selection and orientation of the R groups produce the cationic species shown in FIG. 4); and the anion selected from the group consisting of tetrafluoroborate, bis(trifluoromethylsulfonyl)imide, tetracyanoborate, and trifluoromethanesulfonate.

For example, given the combinations of cations and anions above, in a particular embodiment, the AES may be selected from the group consisting of trihexyltetradecylphosphonium bis(trifluoromethylsulfonyl)imide, 1-butyl-1-methylpiperidinium bis(trifluoromethylsulfonyl)imide, and butyltrimethylammonium bis(trifluoromethylsulfonyl)imide. Data supporting the enhanced performance characteristics in a temperature range as demonstrated through Capacitance and ESR measurements over time, indicate high temperature utility and long term durability.

In certain embodiments, the AES is trihexyltetradecylphosphonium bis(trifluoromethylsulfonyl)imide.

In certain embodiments, the AES is 1-butyl-1-methylpiperidinium bis(trifluoromethylsulfonyl)imide.

In certain embodiments, the AES is butyltrimethylammonium bis(trifluoromethylsulfonyl)imide.

In another embodiment, the novel electrolyte entities useful for the advanced electrolyte system (AES) of the present invention include any combination of cations presented in FIG. 4, selected from the group consisting of imidazolium and pyrrolidinium, wherein the various branch groups $R_x$ (e.g., $R_1$, $R_2$, $R_3$, . . . $R_x$) may be selected from the group consisting of alkyl, heteroalkyl, alkenyl, heteroalkenyl, alkynyl, heteroalkynyl, halo, amino, nitro, cyano, hydroxyl, sulfate, sulfonate, and carbonyl, any of which is optionally substituted, and wherein at least two $R_x$ are not H (i.e., such that the selection and orientation of the R groups produce the cationic species shown in FIG. 4); and the anion selected from the group consisting of tetrafluoroborate, bis(trifluoromethylsulfonyl)imide, tetracyanoborate, and trifluoromethanesulfonate. In one particular embodiment, the two $R_x$ that are not H, are alkyl. Moreover, the noted cations exhibit high thermal stability, as well as high conductivity and exhibit good electrochemical performance over a wide range of temperatures.

For example, given the combinations of cations and anions above, in a particular embodiment, the AES may be selected from the group consisting of 1-butyl-3-methylimidazolium tetrafluoroborate; 1-butyl-3-methylimidazolium bis(trifluoromethylsulfonyl)imide, 1-ethyl-3-methylimidazolium tetrafluoroborate; 1-ethyl-3-methylimidazolium tetracyanoborate; 1-hexyl-3-methylimidazolium tetracyanoborate; 1-butyl-1-methylpyrrolidinium bis(trifluoromethylsulfonyl)imide; 1-butyl-1-methylpyrrolidinium tris(pentafluoroethyl)trifluorophosphate; 1-butyl-1-methylpyrrolidinium tetracyanoborate, and 1-butyl-3-methylimidazolium trifluoromethanesulfonate.

In one embodiment, the AES is 1-butyl-3-methylimidazolium tetrafluoroborate.

In one embodiment, the AES is 1-butyl-3-methylimidazolium bis(trifluoromethylsulfonyl)imide.

In one embodiment, the AES is 1-ethyl-3-methylimidazolium tetrafluoroborate.

In one embodiment, the AES is 1-ethyl-3-methylimidazolium tetracyanoborate.

In one embodiment, the AES is 1-hexyl-3-methylimidazolium tetracyanoborate.

In one embodiment, the AES is 1-butyl-1-methylpyrrolidinium bis(trifluoromethylsulfonyl)imide.

In one embodiment, the AES is 1-butyl-1-methylpyrrolidinium tris(pentafluoroethyl)trifluorophosphate.

In one embodiment, the AES is 1-butyl-1-methylpyrrolidinium tetracyanoborate.

In one embodiment, the AES is 1-butyl-3-methylimidazolium trifluoromethanesulfonate.

In another particular embodiment, one of the two $R_x$ that are not H, is alkyl, e.g., methyl, and the other is an alkyl substituted with an alkoxy. Moreover, it has been found that cations having an N,O-acetal skeleton structure of the formula (I) in the molecule have high electrical conductivity, and that an ammonium cation included among these cations and having a pyrrolidine skeleton and an N,O-acetal group is especially high in electrical conductivity and solubility in organic solvents and supports relatively high voltage.

Examples of cations of the AES of the present invention comprising a Novel Electrolyte Entity of formula (I), and which are composed of a quaternary ammonium cation shown in formula (I) and a cyanoborate anion are selected from N-methyl-N-methoxymethylpyrrolidinium (N-methoxymethyl-N-methylpyrrolidinium), N-ethyl-N-methoxymethylpyrrolidinium, N-methoxymethyl-N-n-propylpyrrolidinium, N-methoxymethyl-N-iso-propylpyrrolidinium, N-n-butyl-N-methoxymethylpyrrolidinium, N-iso-butyl-N-methoxymethylpyrrolidinium, N-tert-butyl-N-methoxymethylpyrrolidinium, N-ethoxymethyl-N-methylpyrrolidinium, N-ethyl-N-ethoxymethylpyrrolidinium (N-ethoxymethyl-N-ethylpyrrolidinium), N-ethoxymethyl-N-n-propylpyrrolidinium, N-ethoxymethyl-N-iso-propylpyrrolidinium, N-n-butyl-N-ethoxymethylpyrrolidinium, N-iso-butyl-N-ethoxymethylpyrrolidinium and N-tert-butyl-N-ethoxymethylpyrrolidinium. Other examples include N-methyl-N-methoxymethylpyrrolidinium (N-methoxymethyl-N-methylpyrrolidinium), N-ethyl-N-methoxymethylpyrrolidinium and N-ethoxymethyl-N-methylpyrrolidinium.

Additional examples of the cation of formula (I) in combination with additional anions may be selected from N-methyl-N-methoxymethylpyrrolidinium tetracyanoborate (N-methoxymethyl-N-methylpyrrolidinium tetracyanoborate), N-ethyl-N-methoxymethylpyrrolidinium tetracyanoborate, N-ethoxymethyl-N-methylpyrrolidinium tetracyanoborate, N-methyl-N-methoxymethylpyrrolidinium bistrifluoromethanesulfonylimide, (N-methoxymethyl-N-methylpyrrolidinium bistrifluoromethanesulfonylimide), N-ethyl-N-methoxymethylpyrrolidinium bistrifluoromethanesulfonylimide, N-ethoxymethyl-N-methylpyrrolidinium bistrifluoromethanesulfonylimide, N-methyl-N-methoxymethylpyrrolidinium trifluoromethanesulfolate (N-methoxymethyl-N-methyltrifluoromethanesulfolate).

When to be used as an electrolyte, the quaternary ammonium salt may be used as admixed with a suitable organic solvent. Useful solvents include cyclic carbonic acid esters, chain carbonic acid esters, phosphoric acid esters, cyclic ethers, chain ethers, lactone compounds, chain esters, nitrile compounds, amide compounds and sulfone compounds. Examples of such compounds are given below although the solvents to be used are not limited to these compounds.

Examples of cyclic carbonic acid esters are ethylene carbonate, propylene carbonate, butylene carbonate and the like, among which propylene carbonate is preferable.

Examples of chain carbonic acid esters are dimethyl carbonate, ethylmethyl carbonate, diethyl carbonate and the like, among which dimethyl carbonate and ethylmethyl carbonate are preferred.

Examples of phosphoric acid esters are trimethyl phosphate, triethyl phosphate, ethyldimethyl phosphate, diethylmethyl phosphate and the like. Examples of cyclic ethers are tetrahydrofuran, 2-methyltetrahydrofuran and the like. Examples of chain ethers are dimethoxyethane and the like. Examples of lactone compounds are ã-butyrolactone and the like. Examples of chain esters are methyl propionate, methyl acetate, ethyl acetate, methyl formate and the like. Examples of nitrile compounds are acetonitrile and the like. Examples of amide compounds are dimethylformamide and the like. Examples of sulfone compounds are sulfolane, methyl sulfolane and the like. Cyclic carbonic acid esters, chain carbonic acid esters, nitrile compounds and sulfone compounds may be particularly desirable, in some embodiments.

These solvents may be used singly, or at least two kinds of solvents may be used in admixture. Examples of preferred organic solvent mixtures are mixtures of cyclic carbonic acid ester and chain carbonic acid ester such as those of ethylene carbonate and dimethyl carbonate, ethylene carbonate and ethylmethyl carbonate, ethylene carbonate and diethyl carbonate, propylene carbonate and dimethyl carbonate, propylene carbonate and ethylmethyl carbonate and propylene carbonate and diethyl carbonate, mixtures of chain carbonic acid esters such as dimethyl carbonate and ethylmethyl carbonate, and mixtures of sulfolane compounds such as sulfolane and methylsulfolane. More preferable are mixtures of ethylene carbonate and ethylmethyl carbonate, propylene carbonate and ethylmethyl carbonate, and dimethyl carbonate and ethylmethyl carbonate.

In some embodiments, when the quaternary ammonium salt of the invention is to be used as an electrolyte, the electrolyte concentration is at least 0.1 M, in some cases at least 0.5 M and may be at least 1 M. If the concentration is less than 0.1 M, low electrical conductivity will result, producing electrochemical devices of impaired performance. The upper limit concentration is a separation concentration when the electrolyte is a liquid salt at room temperature. When the solution does not separate, the limit concentration is 100%. When the salt is solid at room temperature, the limit concentration is the concentration at which the solution is saturated with the salt.

In certain embodiments, the advanced electrolyte system (AES) may be admixed with electrolytes other than those disclosed herein provided that such combination does not significantly affect the advantages achieved by utilization of the advanced electrolyte system, e.g., by altering the performance or durability characteristics by greater than 10%. Examples of electrolytes that may be suited to be admixed with the AES are alkali metal salts, quaternary ammonium salts, quaternary phosphonium salts, etc. These electrolytes may be used singly, or at least two kinds of them are usable in combination, as admixed with the AES disclosed herein. Useful alkali metal salts include lithium salts, sodium salts and potassium salts. Examples of such lithium salts are lithium hexafluorophosphate, lithium borofluoride, lithium perchlorate, lithium trifluoromethanesulfonate, sulfonylimide lithium, sulfonylmethide lithium and the like, which nevertheless are not limitative. Examples of useful sodium salts are sodium hexafluorophosphate, sodium borofluoride, sodium perchlorate, sodium trifluoromethanesulfonate, sulfonylimide sodium, sulfonylmethide sodium and the like. Examples of useful potassium salts are potassium hexafluorophosphate, potassium borofluoride, potassium perchlorate, potassium trifluoromethanesulfonate, sulfonylimide potassium, sulfonylmethide potassium and the like although these are not limitative.

Useful quaternary ammonium salts that may be used in the combinations described above (i.e., which do not significantly affect the advantages achieved by utilization of the advanced electrolyte system) include tetraalkylammonium salts, imidazolium salts, pyrazolium salts, pyridinium salts, triazolium salts, pyridazinium salts, etc., which are not limitative. Examples of useful tetraalkylammonium salts are tetraethylammonium tetracyanoborate, tetramethylammonium tetracyanoborate, tetrapropylammonium tetracyanoborate, tetrabutylammonium tetracyanoborate, triethylmethylammonium tetracyanoborate, trimethylethylammonium tetracyanoborate, dimethyldiethylammonium tetracyanoborate, trimethylpropylammonium tetracyanoborate, trimethylbutylammonium tetracyanoborate, dimethylethylpropylammonium tetracyanoborate, methylethylpropylbutylammonium tetracyanoborate, N,N-dimethylpyrrolidinium tetracyanoborate, N-ethyl-N-methylpyrrolidinium tetracyanoborate, N-methyl-N-propylpyrrolidinium tetracyanoborate, N-ethyl-N-propylpyrrolidinium tetracyanoborate, N,N-dimethylpiperidinium tetracyanoborate, N-methyl-N-ethylpiperidinium tetracyanoborate, N-methyl-N-propylpiperidinium tetracyanoborate, N-ethyl-N-propylpiperidinium tetracyanoborate, N,N-dimethylmorpholinium tetracyanoborate, N-methyl-N-ethylmorpholinium tetracyanoborate, N-methyl-N-propylmorpholinium tetracyanoborate, N-ethyl-N-propylmorpholinium tetracyanoborate and the like, whereas these examples are not limitative.

Examples of imidazolium salts that may be used in the combinations described above (i.e., which do not significantly affect the advantages achieved by utilization of the advanced electrolyte system) include 1,3-dimethylimidazolium tetracyanoborate, 1-ethyl-3-methylimidazolium tetracyanoborate, 1,3-diethylimidazolium tetracyanoborate, 1,2-dimethyl-3-ethylimidazolium tetracyanoborate and 1,2-dimethyl-3-propylimidazolium tetracyanoborate, but are not limited to these. Examples of pyrazolium salts are 1,2-dimethylpyrazolium tetracyanoborate, 1-methyl-2-ethylpyrazolium tetracyanoborate, 1-propyl-2-methylpyrazolium tetracyanoborate and 1-methyl-2-butylpyrazolium tetracyanoborate, but are not limited to these. Examples of pyridinium salts are N-methylpyridinium tetracyanoborate, N-ethylpyridinium tetracyanoborate, N-propylpyridinium tetracyanoborate and N-butylpyridinium tetracyanoborate, but are not limited to these. Examples of triazolium salts are 1-methyltriazolium tetracyanoborate, 1-ethyltriazolium tetracyanoborate, 1-propyltriazolium tetracyanoborate and 1-butyltriazolium tetracyanoborate, but are not limited to these. Examples of pyridazinium salts are 1-methylpyridazinium tetracyanoborate, 1-ethylpyridazinium tetracyanoborate, 1-propylpyridazinium tetracyanoborate and 1-butylpyridazinium tetracyanoborate, but are not limited to these. Examples of quaternary phosphonium salts are tetraethylphosphonium tetracyanoborate, tetramethylphosphonium tetracyanoborate, tetrapropylphosphonium tetracyanoborate, tetrabutylphosphonium tetracyanoborate, triethylmethylphosphonium tetrafluoroborate, trimethylethylphosphonium tetracyanoborate, dimethyldiethylphosphonium tetracyanoborate, trimethylpropylphosphonium tetracyanoborate, trimethylbutylphosphonium tetracyanoborate, dimethylethylpropylphosphonium tetracyanoborate, methylethylpropylbutylphosphonium tetracyanoborate, but are not limited to these.

In certain embodiments, the novel electrolytes selected herein for use the advanced electrolyte systems may also be purified. Such purification may be performed using art-recognized techniques or the techniques provided herein. This purification may further improve the characteristics of the Novel Electrolyte Entities described herein.

iv. Highly Purified Electrolytes

The advanced electrolyte systems of the present comprise, in one embodiment, certain highly purified electrolytes for use in high temperature ultracapacitors. In certain embodiments. The highly purified electrolytes that comprise the AES of the present invention are those electrolytes described below as well as those novel electrolytes described above purified by the purification process described herein. The purification methods provided herein produce impurity levels that afford an advanced electrolyte system with enhanced properties for use in high temperature applications, e.g., high temperature ultracapacitors, for example in a temperature range of about 80 degrees Celsius to about 210 degrees Celsius, e.g., about 80 degrees Celsius to about 200 degrees Celsius, e.g., about 80 degrees Celsius to about 190 degrees Celsius e.g., about 80 degrees Celsius to about 180 degrees Celsius e.g., about 80 degrees Celsius to about 170 degrees Celsius e.g., about 80 degrees Celsius to about 160 degrees Celsius e.g., about 80 degrees Celsius to about 150 degrees Celsius e.g., about 85 degrees Celsius to about 145 degrees Celsius e.g., about 90 degrees Celsius to about 140 degrees Celsius e.g., about 95 degrees Celsius to about 135 degrees Celsius e.g., about 100 degrees Celsius to about 130 degrees Celsius e.g., about 105 degrees Celsius to about 125 degrees Celsius e.g., about 110 degrees Celsius to about 120 degrees Celsius.

Obtaining improved properties of the ultracapacitor 10 results in a requirement for better electrolyte systems than presently available. For example, it has been found that increasing the operational temperature range may be achieved by the significant reduction/removal of impurities from certain forms of known electrolytes. Impurities of particular concern include water, halide ions (chloride, bromide, fluoride, iodide), free amines (ammonia), sulfate, and metal cations (Ag, Al, Ba, Ca, Cd, Co, Cr, Cu, Fe, K, Li, Mg, Mn, Mo, Na, Ni, Pb, Sr, Ti, Zn). The highly purified electrolyte product of such purification provides electrolytes that are surprisingly far superior to the unpurified electrolyte, and as such, fall with the advanced electrolyte systems of the present invention.

In a particular embodiment, the present invention provides a purified mixture of cation 9 and anion 11 and, in some instances a solvent, which may serve as the AES of the present invention which comprises less than about 5000 parts per million (ppm) of chloride ions; less than about 1000 ppm of fluoride ions; and/or less than about 1000 ppm of water (e.g. less than about 2000 ppm of chloride ions; less than about less than about 200 ppm of fluoride ions; and/or less than about 200 ppm of water, e.g. less than about 1000 ppm of chloride ions; less than about less than about 100 ppm of fluoride ions; and/or less than about 100 ppm of water, e.g. less than about 500 ppm of chloride ions; less than about less than about 50 ppm of fluoride ions; and/or less than about 50 ppm of water, e.g. less than about 780 parts per million of chloride ions; less than about 11 parts per million of fluoride ions; and less than about 20 parts per million of water.)

Generally, impurities in the purified electrolyte are removed using the methods of purification described herein. For example, in some embodiments, a total concentration of halide ions (chloride, bromide, fluoride, iodide), may be reduced to below about 1,000 ppm. A total concentration of metallic species (e.g., Cd, Co, Cr, Cu, Fe, K, Li, Mo, Na, Ni, Pb, Zn, including an at least one of an alloy and an oxide thereof), may be reduced to below about 1,000 ppm. Further, impurities from solvents and precursors used in the synthesis process may be reduced to below about 1,000 ppm and can include, for example, bromoethane, chloroethane, 1-bromobutane, 1-chlorobutane, 1-methylimidazole, ethyl acetate, methylene chloride and so forth.

In some embodiments, the impurity content of the ultracapacitor 10 has been measured using ion selective electrodes and the Karl Fischer titration procedure, which has been applied to electrolyte 6 of the ultracapacitor 10. In certain embodiments, it has been found that the total halide content in the ultracapacitor 10 according to the teachings herein has been found to be less than about 200 ppm of halides ($Cl^-$ and $F^-$) and water content is less than about 100 ppm.

Impurities can be measured using a variety of techniques, such as, for example, Atomic Absorption Spectrometry (AAS), Inductively Coupled Plasma-Mass Spectrometry (ICPMS), or simplified solubilizing and electrochemical sensing of trace heavy metal oxide particulates. AAS is a spectro-analytical procedure for the qualitative and quantitative determination of chemical elements employing the absorption of optical radiation (light) by free atoms in the gaseous state. The technique is used for determining the concentration of a particular element (the analyte) in a sample to be analyzed. AAS can be used to determine over seventy different elements in solution or directly in solid samples. ICPMS is a type of mass spectrometry that is highly sensitive and capable of the determination of a range of metals and several non-metals at concentrations below one part in $10^{12}$ (part per trillion). This technique is based on coupling together an inductively coupled plasma as a method of producing ions (ionization) with a mass spectrometer as a method of separating and detecting the ions. ICPMS is also capable of monitoring isotopic speciation for the ions of choice.

Additional techniques may be used for analysis of impurities. Some of these techniques are particularly advantageous for analyzing impurities in solid samples. Ion Chromatography (IC) may be used for determination of trace levels of halide impurities in the electrolyte 6 (e.g., an ionic liquid). One advantage of Ion Chromatography is that relevant halide species can be measured in a single chromatographic analysis. A Dionex AS9-HC column using an eluent consisting 20 mM NaOH and 10% (v/v) acetonitrile is one example of an apparatus that may be used for the quantification of halides from the ionic liquids. A further technique is that of X-ray fluorescence.

X-ray fluorescence (XRF) instruments may be used to measure halogen content in solid samples. In this technique, the sample to be analyzed is placed in a sample cup and the sample cup is then placed in the analyzer where it is irradiated with X-rays of a specific wavelength. Any halogen atoms in the sample absorb a portion of the X-rays and then reflect radiation at a wavelength that is characteristic for a given halogen. A detector in the instrument then quantifies the amount of radiation coming back from the halogen atoms and measures the intensity of radiation. By knowing the surface area that is exposed, concentration of halogens in the sample can be determined. A further technique for assessing impurities in a solid sample is that of pyrolysis.

Adsorption of impurities may be effectively measured through use of pyrolysis and microcoulometers. Microcoulometers are capable of testing almost any type of material for total chlorine content. As an example, a small amount of sample (less than 10 milligrams) is either injected or placed into a quartz combustion tube where the temperature ranges from about 600 degrees Celsius to about 1,000 degrees Celsius. Pure oxygen is passed through the quartz tube and any chlorine containing components are combusted completely. The resulting combustion products are swept into a titration cell where the chloride ions are trapped in an electrolyte solution. The electrolyte solution contains silver ions that immediately combine with any chloride ions and drop out of solution as insoluble silver chloride. A silver electrode in the titration cell electrically replaces the used up silver ions until the concentration of silver ions is back to where it was before the titration began. By keeping track of the amount of current needed to generate the required amount of silver, the instrument is capable of determining how much chlorine was present in the original sample. Dividing the total amount of chlorine present by the weight of the sample gives the concentration of chlorine that is actually in the sample. Other techniques for assessing impurities may be used.

Surface characterization and water content in the electrode 3 may be examined, for example, by infrared spectroscopy techniques. The four major absorption bands at around 1130, 1560, 3250 and 2300 cm$^{-1}$, correspond to iC=O in, iC=C in aryl, iO—H and iC—N, respectively. By measuring the intensity and peak position, it is possible to quantitatively identify the surface impurities within the electrode 3.

Another technique for identifying impurities in the electrolyte 6 and the ultracapacitor 10 is Raman spectroscopy. This spectroscopic technique relies on inelastic scattering, or Raman scattering, of monochromatic light, usually from a laser in the visible, near infrared, or near ultraviolet range. The laser light interacts with molecular vibrations, phonons or other excitations in the system, resulting in the energy of the laser photons being shifted up or down. Thus, this technique may be used to characterize atoms and molecules within the ultracapacitor 10. A number of variations of Raman spectroscopy are used, and may prove useful in characterizing contents the ultracapacitor 10.

v. Enhanced Electrolyte Combinations

The advanced electrolyte systems of the present comprise, in one embodiment, include certain enhanced electrolyte combinations suitable for use in temperature ranges from −40 degrees Celsius to 210 degrees Celsius, e.g., −40 degrees Celsius to 150 degrees Celsius, e.g., −30 degrees Celsius to 150 degrees Celsius, e.g., −30 degrees Celsius to 140 degrees Celsius, e.g., −20 degrees Celsius to 140 degrees Celsius, e.g., −20 degrees Celsius to 130 degrees Celsius, e.g., −10 degrees Celsius to 130 degrees Celsius, e.g., −10 degrees Celsius to 120 degrees Celsius, e.g., 0 degrees Celsius to 120 degrees Celsius, e.g., 0 degrees Celsius to 110 degrees Celsius, e.g., 0 degrees Celsius to 100 degrees Celsius, e.g., 0 degrees Celsius to 90 degrees Celsius, e.g., 0 degrees Celsius to 80 degrees Celsius, e.g., 0 degrees Celsius to 70 degrees Celsius, without a significant drop in performance or durability.

Generally, a higher degree of durability at a given temperature may be coincident with a higher degree of voltage stability at a lower temperature. Accordingly, the development of a high temperature durability AES, with enhanced electrolyte combinations, generally leads to simultaneous development of high voltage, but lower temperature AES, such that these enhanced electrolyte combinations described herein may also be useful at higher voltages, and thus higher energy densities, but at lower temperatures.

In one embodiment, the present invention provides an enhanced electrolyte combination suitable for use in an energy storage cell, e.g., an ultracapacitor, comprising a novel mixture of electrolytes selected from the group consisting of an ionic liquid mixed with a second ionic liquid, an ionic liquid mixed with an organic solvent, and an ionic liquid mixed with a second ionic liquid and an organic solvent:

wherein each ionic liquid is selected from the salt of any combination of the following cations and anions, wherein the cations are selected from the group consisting of 1-butyl-3-methylimidazolium, 1-ethyl-3-methylimidazolium, 1-hexyl-3-methylimidazolium, 1-butyl-1-methylpiperidinium, butyltrimethylammonium, 1-butyl-1-methylpyrrolidinium, trihexyltetradecylphosphonium, and 1-butyl-3-methylimidaxolium; and the anions are selected from the group consisting of tetrafluoroborate, bis(trifluoromethylsulfonyl)imide, tetracyanoborate, and trifluoromethanesulfonate; and wherein the organic solvent is selected from the group consisting of linear sulfones (e.g., ethyl isopropyl sulfone, ethyl isobutyl sulfone, ethyl methyl sulfone, methyl isopropyl sulfone, isopropyl isobutyl sulfone, isopropyl s-butyl sulfone, butyl isobutyl sulfone, and dimethyl sulfone), linear carbonates (e.g., ethylene carbonate, propylene carbonate, and dimethyl carbonate), and acetonitrile.

For example, given the combinations of cations and anions above, each ionic liquid may be selected from the group consisting of 1-butyl-3-methylimidazolium tetrafluoroborate; 1-butyl-3-methylimidazolium bis(trifluoromethylsulfonyl)imide; 1-ethyl-3-methylimidazolium tetrafluoroborate; 1-ethyl-3-methylimidazolium tetracyanoborate; 1-hexyl-3-methylimidazolium tetracyanoborate; 1-butyl-1-methylpyrrolidinium bis(trifluoromethylsulfonyl)imide; 1-butyl-1-methylpyrrolidinium tris(pentafluoroethyl)trifluorophosphate; 1-butyl-1-methylpyrrolidinium tetracyanoborate; trihexyltetradecylphosphonium bis(trifluoromethylsulfonyl)imide, 1-butyl-1-methylpiperidinium bis(trifluoromethylsulfonyl)imide, butyltrimethylammonium bis(trifluoromethylsulfonyl)imide, and 1-butyl-3-methylimidazolium trifluoromethanesulfonate.

In certain embodiments, the ionic liquid is 1-butyl-3-methylimidazolium tetrafluoroborate.

In certain embodiments, the ionic liquid is 1-butyl-3-methylimidazolium bis(trifluoromethylsulfonyl)imide.

In certain embodiments, the ionic liquid is 1-ethyl-3-methylimidazolium tetrafluoroborate.

In certain embodiments, the ionic liquid is 1-ethyl-3-methylimidazolium tetracyanoborate.

In certain embodiments, the ionic liquid is 1-hexyl-3-methylimidazolium tetracyanoborate.

In certain embodiments, the ionic liquid is 1-butyl-1-methylpyrrolidinium bis(trifluoromethylsulfonyl)imide.

In one embodiment, the ionic liquid is 1-butyl-1-methylpyrrolidinium tris(pentafluoroethyl)trifluorophosphate.

In certain embodiments, the ionic liquid is 1-butyl-1-methylpyrrolidinium tetracyanoborate.

In certain embodiments, the ionic liquid is trihexyltetradecylphosphonium bis(trifluoromethylsulfonyl)imide.

In certain embodiments, the ionic liquid is 1-butyl-1-methylpiperidinium bis(trifluoromethylsulfonyl)imide.

In certain embodiments, the ionic liquid is butyltrimethylammonium bis(trifluoromethylsulfonyl)imide In certain embodiments, the ionic liquid is 1-butyl-3-methylimidazolium trifluoromethanesulfonate.

In certain embodiments, the organic solvent is selected from ethyl isopropyl sulfone, ethyl isobutyl sulfone, ethyl methyl sulfone, methyl isopropyl sulfone, isopropyl isobutyl sulfone, isopropyl s-butyl sulfone, butyl isobutyl sulfone, or bimethyl sulfone, linear sulfones.

In certain embodiments, the organic solvent is selected from polypropylene carbonate, propylene carbonate, dimethyl carbonate, ethylene carbonate.

In certain embodiments, the organic solvent is acetonitrile.

In certain embodiments, the enhanced electrolyte composition is an ionic liquid with an organic solvent, wherein the organic solvent is 55%-90%, e.g., 37.5%, by volume of the composition.

In certain embodiments, the enhanced electrolyte composition is an ionic liquid with a second ionic liquid, wherein one ionic liquid is 5%-90%, e.g., 60%, by volume of the composition.

The enhanced electrolyte combinations of the present invention provide a wider temperature range performance for an individual capacitor (e.g. without a significant drop in capacitance and/or increase in ESR when transitioning between two temperatures, e.g. without more than a 90% decrease in capacitance and/or a 1000% increase in ESR when transitioning from about +30° C. to about −40° C.), and increased temperature durability for an individual capacitor (e.g., less than a 50% decrease in capacitance at a given temperature after a given time and/or less than a 100% increase in ESR at a given temperature after a given time, and/or less than 10 A/L of leakage current at a given temperature after a given time, e.g., less than a 40% decrease in capacitance and/or a 75% increase in ESR, and/or less than 5 A/L of leakage current, e.g., less than a 30% decrease in capacitance and/or a 50% increase in ESR, and/or less than 1 A/L of leakage current).

Without wishing to be bound by theory, the combinations described above provide enhanced eutectic properties that affect the freezing point of the advanced electrolyte system to afford ultracapacitors that operate within performance and durability standards at temperatures of down to −40 degrees Celsius.

As described above for the novel electrolytes of the present invention, in certain embodiments, the advanced electrolyte system (AES) may be admixed with electrolytes provided that such combination does not significantly affect the advantages achieved by utilization of the advanced electrolyte system.

In certain embodiments, the enhanced electrolyte combinations are selected herein for use the advanced electrolyte systems may also be purified. Such purification may be performed using art-recognized techniques or techniques provided herein.

C. Electrodes

The EDLC includes at least one pair of electrode 3 (where the electrode 3 may be referred to as a negative electrodes 33 and a positive electrodes 34, merely for purposes of referencing herein). When assembled into the ultracapacitor 10, each of the electrode 3 presents a double layer of charge at an electrolyte interface. In some embodiments, a plurality of electrode 3 is included (for example, in some embodiments, at least two pairs of electrode 3 are included). However, for purposes of discussion, only one pair of electrode 3 are shown. As a matter of convention herein, at least one of the electrodes 33/34 uses a carbon-based energy storage media 1 (as discussed further herein) to provide energy storage. However, for purposes of discussion herein, it is generally assumed that each of the electrodes includes the carbon-based energy storage media 1.

i. Current Collector

Each of the electrode 3 includes a respective current collector 2 (also referred to as a "charge collector"). In some embodiments, the electrode 3 are separated by a separator 5. In general, the separator 5 is a thin structural material (usually a sheet) used to separate the negative electrode 3 from the positive electrode 3. The separator 5 may also serve to separate pairs of the electrode 3. Note that, in some embodiments, the carbon-based energy storage media 1 may not be included on one or both of the electrode 3. That is, in some embodiments, a respective electrode 3 might consist of only the current collector 2. The material used to provide the current collector 2 could be roughened, anodized or the like to increase a surface area thereof. In these embodiments, the current collector 2 alone may serve as the electrode 3. With this in mind, however, as used herein, the term "electrode 3" generally refers to a combination of the energy storage media 1 and the current collector 2 (but this is not limiting, for at least the foregoing reason).

ii. Energy Storage Media

In the exemplary ultracapacitor 10, the energy storage media 1 is formed of carbon nanotubes. The energy storage media 1 may include other carbonaceous materials including, for example, activated carbon, carbon fibers, rayon, graphene, aerogel, carbon cloth, and a plurality of forms of carbon nanotubes. Activated carbon electrodes can be manufactured, for example, by producing a carbon base material by carrying out a first activation treatment to a carbon material obtained by carbonization of a carbon compound, producing a formed body by adding a binder to the carbon base material, carbonizing the formed body, and finally producing an active carbon electrode by carrying out a second activation treatment to the carbonized formed body. Carbon fiber electrodes can be produced, for example, by using paper or cloth pre-form with high surface area carbon fibers.

In an exemplary method for fabricating carbon nanotubes, an apparatus for producing an aligned carbon-nanotube aggregate includes apparatus for synthesizing the aligned carbon-nanotube aggregate on a base material having a catalyst on a surface thereof. The apparatus includes a formation unit that processes a formation step of causing an environment surrounding the catalyst to be an environment of a reducing gas and heating at least either the catalyst or the reducing gas; a growth unit that processes a growth step of synthesizing the aligned carbon-nanotube aggregate by causing the environment surrounding the catalyst to be an environment of a raw material gas and by heating at least either the catalyst or the raw material gas; and a transfer unit that transfers the base material at least from the formation unit to the growth unit. A variety of other methods and apparatus may be employed to provide the aligned carbon-nanotube aggregate.

In some embodiments, material used to form the energy storage media 1 may include material other than pure carbon (and the various forms of carbon as may presently exist or be later devised). That is, various formulations of other materials may be included in the energy storage media 1. More specifically, and as a non-limiting example, at least one binder material may be used in the energy storage media 1, however, this is not to suggest or require addition of other materials (such as the binder material). In general, however, the energy storage media 1 is substantially formed of carbon, and may therefore referred to herein as a "carbonaceous material," as a "carbonaceous layer" and by other similar terms. In short, although formed predominantly of carbon, the energy storage media 1 may include any form of carbon (as well as any additives or impurities as deemed appropriate or acceptable) to provide for desired functionality as energy storage media 1.

In one set of embodiments, the carbonaceous material includes at least about 60% elemental carbon by mass, and in other embodiments at least about 75%, 85%, 90%, 95% or 98% by mass elemental carbon.

Carbonaceous material can include carbon in a variety forms, including carbon black, graphite, and others. The carbonaceous material can include carbon particles, including nanoparticles, such as nanotubes, nanorods, graphene sheets in sheet form, and/or formed into cones, rods, spheres (buckyballs) and the like.

Some embodiments of various forms of carbonaceous material suited for use in energy storage media 1 are provided herein as examples. These embodiments provide robust energy storage and are well suited for use in the electrode 3. It should be noted that these examples are illustrative and are not limiting of embodiments of carbonaceous material suited for use in energy storage media 1.

In certain embodiments, the porosity of the energy storage media 1 of each electrode may be selected based on the size of the respective electrolyte to improve the performance of the capacitor.

An exemplary process for complimenting the energy storage media 1 with the current collector 2 to provide the electrode 3 is now provided. Referring now to FIG. 2, a substrate 14 that is host to carbonaceous material in the form of carbon nanotube aggregate (CNT) is shown. In the embodiment shown, the substrate 14 includes a base material 17 with a thin layer of a catalyst 18 disposed thereon.

In general, the substrate 14 is at least somewhat flexible (i.e., the substrate 14 is not brittle), and is fabricated from components that can withstand environments for deposition of the energy storage media 1 (e.g., CNT). For example, the substrate 14 may withstand a high-temperature environment of between about 400 degrees Celsius to about 1,100 degrees Celsius. A variety of materials may be used for the substrate 14, as determined appropriate.

Once the energy storage media 1 (e.g., CNT) has been fabricated on the substrate 14, the current collector 2 may be disposed thereon. In some embodiments, the current collector 2 is between about 0.5 micrometers (μm) to about 25 micrometers (μm) thick. In some embodiments, the current collector 2 is between about 20 micrometers (μm) to about 40 micrometers (μm) thick. The current collector 2 may appear as a thin layer, such as layer that is applied by chemical vapor deposition (CVD), sputtering, e-beam, thermal evaporation or through another suitable technique. Generally, the current collector 2 is selected for its properties such as conductivity, being electrochemically inert and compatible with the energy storage media 1 (e.g., CNT). Some exemplary materials include aluminum, platinum, gold, tantalum, titanium, and may include other materials as well as various alloys.

Once the current collector 2 is disposed onto the energy storage media 1 (e.g., CNT), an electrode element 15 is realized. Each electrode element 15 may be used individually as the electrode 3, or may be coupled to at least another electrode element 15 to provide for the electrode 3.

Once the current collector 2 has been fabricated according to a desired standard, post-fabrication treatment may be undertaken. Exemplary post-treatment includes heating and cooling of the energy storage media 1 (e.g., CNT) in a slightly oxidizing environment. Subsequent to fabrication (and optional post-treatment), a transfer tool may be applied to the current collector 2.

In one embodiment of an application of transfer tool 13 to the current collector 2, the transfer tool 13 is a thermal release tape, used in a "dry" transfer method. Exemplary thermal release tape is manufactured by NITTO DENKO CORPORATION of Fremont, Calif. and Osaka, Japan. One suitable transfer tape is marketed as REVALPHA. This release tape may be characterized as an adhesive tape that adheres tightly at room temperature and can be peeled off by heating. This tape, and other suitable embodiments of thermal release tape, will release at a predetermined temperature. Advantageously, the release tape does not leave a chemically active residue on the electrode element 15.

In another process, referred to as a "wet" transfer method, tape designed for chemical release may be used. Once applied, the tape is then removed by immersion in a solvent. The solvent is designed to dissolve the adhesive.

In other embodiments, the transfer tool 13 uses a "pneumatic" method, such as by application of suction to the current collector 2. The suction may be applied, for example, through a slightly oversized paddle having a plurality of perforations for distributing the suction. In another example, the suction is applied through a roller having a plurality of perforations for distributing the suction. Suction driven embodiments offer advantages of being electrically controlled and economic as consumable materials are not used as a part of the transfer process. Other embodiments of the transfer tool 13 may be used.

Once the transfer tool 13 has been temporarily coupled to the current collector 2, the electrode element 15 is gently removed from the substrate 14. The removal generally involves peeling the energy storage media 1 (e.g., CNT) from the substrate 14, beginning at one edge of the substrate 14 and energy storage media 1 (e.g., CNT).

Subsequently, the transfer tool 13 may be separated from the electrode element 15. In some embodiments, the transfer tool 13 is used to install the electrode element 15. For example, the transfer tool 13 may be used to place the electrode element 15 onto the separator 5. In general, once removed from the substrate 14, the electrode element 15 is available for use.

In instances where a large electrode 3 is desired, a plurality of the electrode elements 15 may be mated. A plurality of the electrode elements 15 may be mated by, for example, coupling a coupling 52 to each electrode element 15 of the plurality of electrode elements 15. The mated electrode elements 15 provide for an embodiment of the electrode 3.

In some embodiments, the coupling 22 is coupled to each of the electrode elements 15 at a weld 21. Each of the welds 21 may be provided as an ultrasonic weld 21. It has been found that ultrasonic welding techniques are particularly well suited to providing each weld 21. That is, in general, the aggregate of energy storage media 1 (e.g., CNT) is not compatible with welding, where only a nominal current collector, such as disclosed herein is employed. As a result, many techniques for joining electrode elements 15 are disruptive, and damage the element 15. However, in other embodiments, other forms of coupling are used, and the coupling 22 is not a weld 21.

The coupling 22 may be a foil, a mesh, a plurality of wires or in other forms. Generally, the coupling 22 is selected for properties such as conductivity and being electrochemically inert. In some embodiments, the coupling 22 is fabricated from the same material(s) as are present in the current collector 2.

In some embodiments, the coupling 22 is prepared by removing an oxide layer thereon. The oxide may be removed by, for example, etching the coupling 22 before providing the weld 21. The etching may be accomplished, for example, with potassium hydroxide (KOH). The electrode 3 may be used in a variety of embodiments of the ultracapacitor 10. For example, the electrode 3 may be rolled up into a "jelly roll" type of energy storage.

D. Separator

The separator 5 may be fabricated from various materials. In some embodiments, the separator 5 is non-woven glass. The separator 5 may also be fabricated from fiberglass, ceramics and fluoro-polymers, such as polytetrafluoroethylene (PTFE), commonly marketed as TEFLON™ by DuPont Chemicals of Wilmington, Del. For example, using non-woven glass, the separator 5 can include main fibers and binder fibers each having a fiber diameter smaller than that of each of the main fibers and allowing the main fibers to be bonded together.

For longevity of the ultracapacitor 10 and to assure performance at high temperature, the separator 5 should have a reduced amount of impurities and in particular, a very limited amount of moisture contained therein. In particular, it has been found that a limitation of about 200 ppm of moisture is desired to reduce chemical reactions and improve the lifetime of the ultracapacitor 10, and to provide for good performance in high temperature applications. Some embodiments of materials for use in the separator 5 include polyamide, polytetrafluoroethylene (PTFE), polyetheretherketone (PEEK), aluminum oxide ($Al_2O_3$), fiberglass, and glass-reinforced plastic (GRP).

In general, materials used for the separator 5 are chosen according to moisture content, porosity, melting point, impurity content, resulting electrical performance, thickness, cost, availability and the like. In some embodiments, the separator 5 is formed of hydrophobic materials.

Accordingly, procedures may be employed to ensure excess moisture is eliminated from each separator 5. Among other techniques, a vacuum drying procedure may be used. A selection of materials for use in the separator 5 is provided in Table 2. Some related performance data is provided in Table 3.

TABLE 2

Separator Materials

| Material | Melting point | PPM $H_2O$ unbaked | PPM $H_2O$ baked | Vacuum dry procedure |
|---|---|---|---|---|
| Polyamide | 256° C. | 2052 | 20 | 180° C. for 24 h |
| Polytetrafluoroethylene, PTFE | 327° C. | 286 | 135 | 150° C. for 24 h |
| Polyether ether ketone, PEEK | 256° C. | 130 | 50 | 215° C. for 12 h |
| Aluminum Oxide, $Al_2O_3$ | 330° C. | 1600 | 100 | 215° C. for 24 h |
| Fiberglass (GRP) | 320° C. | 2000 | 167 | 215° C. for 12 h |

TABLE 3

Separator Performance Data

| Material | μm | Porosity | ESR $1^{st}$ test (Ω) | ESR $2^{nd}$ test (Ω) | After 10 CV |
|---|---|---|---|---|---|
| Polyamide | 42 | Nonwoven | 1.069 | 1.069 | 1.213 |
| PEEK | 45 | Mesh | 1.665 | 1.675 | 2.160 |
| PEEK 60% | 25 | 60% | 0.829 | 0.840 | 0.883 |
| Fiberglass (GRP) | 160 | Nonwoven | 0.828 | 0.828 | 0.824 |
| Aluminum Oxide, $Al_2O_3$ | 25 | — | 2.400 | 2.400 | 2.400 |

In order to collect data for Table 2, two electrode 3, based on carbonaceous material, were provided. The electrode 3 were disposed opposite to and facing each other. Each of the separators 5 were placed between the electrode 3 to prevent a short circuit. The three components were then wetted with electrolyte 6 and compressed together. Two aluminum bars and PTFE material was used as an external structure to enclose the resulting ultracapacitor 10.

The ESR $1^{st}$ test and ESR $2^{nd}$ test were performed with the same configuration one after the other. The second test was run five minutes after the first test, leaving time for the electrolyte 6 to further soak into the components.

In certain embodiments, the ultracapacitor 10 does not include the separator 5. For example, in particular embodiments, such as where the electrode 3 are assured of physical separation by a geometry of construction, it suffices to have electrolyte 6 alone between the electrode 3. More specifically, and as an example of physical separation, one such ultracapacitor 10 may include electrode 3 that are disposed within a housing such that separation is assured on a continuous basis. A bench-top example would include an ultracapacitor 10 provided in a beaker.

E. Storage Cell

Once assembled, the electrode 3 and the separator 5 provide a storage cell 12. Generally, the storage cell 12 is formed into one of a wound form or prismatic form which is then packaged into a cylindrical or prismatic housing 7. Once the electrolyte 6 has been included, the housing 7 may be hermetically sealed. In various examples, the package is hermetically sealed by techniques making use of laser, ultrasonic, and/or welding technologies. In addition to providing robust physical protection of the storage cell 12, the housing 7 is configured with external contacts to provide electrical communication with respective terminals 8 within the housing 7. Each of the terminals 8, in turn, provides electrical access to energy stored in the energy storage media 1, generally through electrical leads which are coupled to the energy storage media 1.

Generally, the ultracapacitor 10 disclosed herein is capable of providing a hermetic seal that has a leak rate no greater than about $5.0 \times 10^{-6}$ atm-cc/sec, and may exhibit a leak rate no higher than about $5.0 \times 10^{-10}$ atm-cc/sec. It is also considered that performance of a successfully hermetic seal is to be judged by the user, designer or manufacturer as appropriate, and that "hermetic" ultimately implies a standard that is to be defined by a user, designer, manufacturer or other interested party.

Leak detection may be accomplished, for example, by use of a tracer gas. Using tracer gas such as helium for leak testing is advantageous as it is a dry, fast, accurate and non destructive method. In one example of this technique, the ultracapacitor 10 is placed into an environment of helium. The ultracapacitor 10 is subjected to pressurized helium. The ultracapacitor 10 is then placed into a vacuum chamber that is connected to a detector capable of monitoring helium presence (such as an atomic absorption unit). With knowledge of pressurization time, pressure and internal volume, the leak rate of the ultracapacitor 10 may be determined.

In some embodiments, at least one lead (which may also be referred to herein as a "tab") is electrically coupled to a respective one of the current collectors 2. A plurality of the leads (accordingly to a polarity of the ultracapacitor 10) may be grouped together and coupled to into a respective terminal 8. In turn, the terminal 8 may be coupled to an electrical access, referred to as a "contact" (e.g., one of the housing 7 and an external electrode (also referred to herein for convention as a "feed-through" or "pin")).

F. Housing of Capacitor

Figure 5:
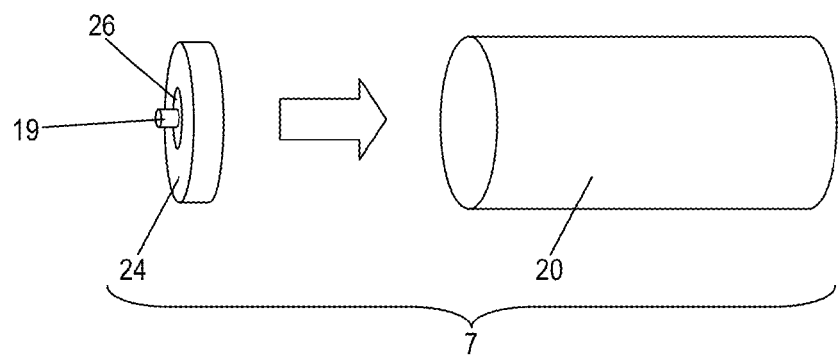
FIG. 5 depicts an embodiment of a housing for an exemplary ultracapacitor.

FIG. 5 depicts aspects of an exemplary housing 7. Among other things, the housing 7 provides structure and physical protection for the ultracapacitor 10. In this example, the housing 7 includes an annular cylindrically shaped body 10 and a complimentary cap 24. In this embodiment, the cap 24 includes a central portion that has been removed and filled with an electrical insulator 26. A cap feed-through 19 penetrates through the electrical insulator 26 to provide users with access to the stored energy. Moreover, the housing may also include an inner barrier 30.

Although this example depicts only one feed-through 19 on the cap 24, it should be recognized that the construction of the housing 7 is not limited by the embodiments discussed herein. For example, the cap 24 may include a plurality of feed-throughs 19. In some embodiments, the body 10 includes a second, similar cap 24 at the opposing end of the annular cylinder. Further, it should be recognized that the housing 7 is not limited to embodiments having an annular cylindrically shaped body 10. For example, the housing 7 may be a clamshell design, a prismatic design, a pouch, or of any other design that is appropriate for the needs of the designer, manufacturer or user.

Figure 6:
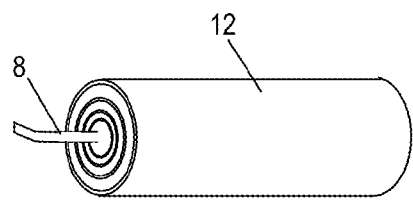
FIG. 6 illustrates an embodiment of a storage cell for an exemplary capacitor.

Referring now to FIG. 6, there is shown an exemplary energy storage cell 12. In this example, the energy storage cell 12 is a "jelly roll" type of energy storage. In these embodiments, the energy storage materials are rolled up into a tight package. A plurality of leads generally form each terminal 8 and provide electrical access to the appropriate layer of the energy storage cell 12. Generally, when assembled, each terminal 8 is electrically coupled to the housing 7 (such as to a respective feed-through 19 and/or directly to the housing 7). The energy storage cell 12 may assume a variety of forms. There are generally at least two plurality of leads (e.g., terminals 8), one for each current collector 2.

A highly efficient seal of the housing 7 is desired. That is, preventing intrusion of the external environment (such as air, humidity, etc) helps to maintain purity of the components of the energy storage cell 12. Further, this prevents leakage of electrolyte 6 from the energy storage cell 12.

In this example, the cap 24 is fabricated with an outer diameter that is designed for fitting snugly within an inner diameter of the body 10. When assembled, the cap 24 may be welded into the body 10, thus providing users with a hermetic seal. Exemplary welding techniques include laser welding and TIG welding, and may include other forms of welding as deemed appropriate.

Common materials for the housing 7 include stainless steel, aluminum, tantalum, titanium, nickel, copper, tin, various alloys, laminates, and the like. Structural materials, such as some polymer-based materials may be used in the housing 7 (generally in combination with at least some metallic components).

In some embodiments, a material used for construction of the body 10 includes aluminum, which may include any type of aluminum or aluminum alloy deemed appropriate by a designer or fabricator (all of which are broadly referred to herein simply as "aluminum"). Various alloys, laminates, and the like may be disposed over (e.g., clad to) the aluminum (the aluminum being exposed to an interior of the body 10). Additional materials (such as structural materials or electrically insulative materials, such as some polymer-based materials) may be used to compliment the body and/or the housing 7. The materials disposed over the aluminum may likewise be chosen by what is deemed appropriate by a designer or fabricator.

In some embodiments, the multi-layer material is used for internal components. For example, aluminum may be clad with stainless steel to provide for a multi-layer material in at least one of the terminals 8. In some of these embodiments, a portion of the aluminum may be removed to expose the stainless steel. The exposed stainless steel may then be used to attach the terminal 8 to the feed-through 19 by use of simple welding procedures.

Using the clad material for internal components may call for particular embodiments of the clad material. For example, it may be beneficial to use clad material that include aluminum (bottom layer), stainless steel and/or tantalum (intermediate layer) and aluminum (top layer), which thus limits exposure of stainless steel to the internal environment of the ultracapacitor 10. These embodiments may be augmented by, for example, additional coating with polymeric materials, such as PTFE.

Accordingly, providing a housing 7 that takes advantage of multi-layered material provides for an energy storage that exhibits leakage current with comparatively low initial values and substantially slower increases in leakage current over time in view of the prior art. Significantly, the leakage current of the energy storage remains at practical (i.e., desirably low) levels when the ultracapacitor 10 is exposed to ambient temperatures for which prior art capacitors would exhibit prohibitively large initial values of leakage current and/or prohibitively rapid increases in leakage current over time.

Additionally, the ultracapacitor 10 may exhibit other benefits as a result of reduced reaction between the housing 7 and the energy storage cell 12. For example, an effective series resistance (ESR) of the energy storage may exhibit comparatively lower values over time. Further, the unwanted chemical reactions that take place in a prior art capacitor often create unwanted effects such as out-gassing, or in the case of a hermetically sealed housing, bulging of the housing 7. In both cases, this leads to a compromise of the structural integrity of the housing 7 and/or hermetic seal of the energy storage. Ultimately, this may lead to leaks or catastrophic failure of the prior art capacitor. These effects may be substantially reduced or eliminated by the application of a disclosed barrier.

By use of a multi-layer material (e.g., a clad material), stainless steel may be incorporated into the housing 7, and thus components with glass-to-metal seals may be used. The components may be welded to the stainless steel side of the clad material using techniques such as laser or resistance welding, while the aluminum side of the clad material may be welded to other aluminum parts (e.g., the body 10).

Figure 17:
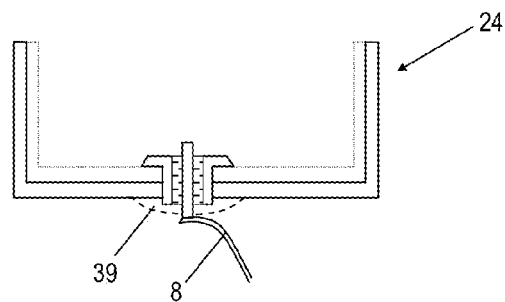
FIG. 17 depicts use of polymeric insulation over an exemplary electrode assembly.
Figure 18A:
FIGS. 18A, 18B and 18C, collectively referred to herein as FIG. 18, depict aspects of an exemplary template for another embodiment of the cap for the energy storage.
Figure 18B:
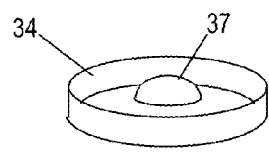
Figure 18C:
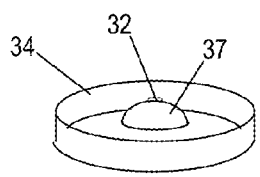

In some embodiments, an insulative polymer may be used to coat parts of the housing 7. In this manner, it is possible to insure that the components of the energy storage are only exposed to acceptable types of metal (such as the aluminum). Exemplary insulative polymer includes PFA, FEP, TFE, and PTFE. Suitable polymers (or other materials) are limited only by the needs of a system designer or fabricator and the properties of the respective materials. Reference may be had to FIG. 17, where a small amount of insulative material 39 is included to limit exposure of electrolyte 6 to the stainless steel of the sleeve 51 and the feed-through 19. In this example, the terminal 8 is coupled to the feed-through 19, such as by welding, and then coated with the insulative material 39.

G. Housing Cap

Although this example depicts only one feed-through 19 on the cap 24, it should be recognized that the construction of the housing 7 is not limited by the embodiments discussed herein. For example, the cap 24 may include a plurality of feed-throughs 19. In some embodiments, the body 10 includes a second, similar cap 24 at an opposing end of the annular cylinder. Further, it should be recognized that the housing 7 is not limited to embodiments having an annular cylindrically shaped body 10. For example, the housing 7 may be a clamshell design, a prismatic design, a pouch, or of any other design that is appropriate for the needs of the designer, manufacturer or user.

Figure 12A:
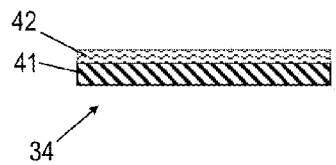
FIGS. 12A, 12B and 12C, collectively referred to herein as FIG. 12, depict exemplary embodiments of a cap that include multi-layered materials.

Referring now to FIG. 12, aspects of embodiments of a blank 34 for the cap 24 are shown. In FIG. 12A, the blank 34 includes a multi-layer material. A layer of a first material 41 may be aluminum. A layer of a second material 42 may be stainless steel. In the embodiments of FIG. 12, the stainless steel is clad onto the aluminum, thus providing for a material that exhibits a desired combination of metallurgical properties. That is, in the embodiments provided herein, the aluminum is exposed to an interior of the energy storage cell (i.e., the housing), while the stainless steel is exposed to exterior. In this manner, advantageous electrical properties of the aluminum are enjoyed, while structural properties (and metallurgical properties, i.e., weldability) of the stainless steel are relied upon for construction. The multi-layer material may include additional layers as deemed appropriate.

Figure 12B:
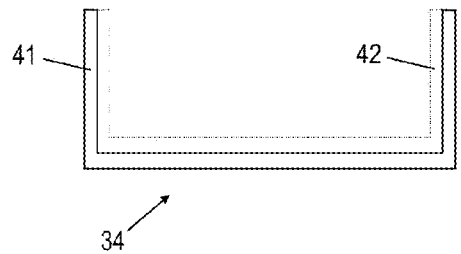
Figure 12C:
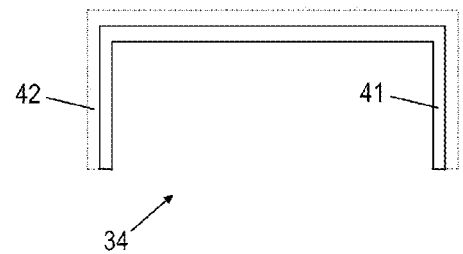

As mentioned above, the layer of first material 41 is clad onto (or with) the layer of second material 42. Referring still to FIG. 12A, in one embodiment, a sheet of flat stock (as shown) is used to provide the blank 34 to create a flat cap 24. A portion of the layer of second material 42 may be removed (such as around a circumference of the cap 24) in order to facilitate attachment of the cap 24 to the body 10. In FIG. 12B, another embodiment of the blank 34 is shown. In this example, the blank 34 is provided as a sheet of clad material that is formed into a concave configuration. In FIG. 12C, the blank 34 is provided as a sheet of clad material that is formed into a convex configuration. The cap 24 that is fabricated from the various embodiments of the blank 34 (such as those shown in FIG. 12), are configured to support welding to the body 10 of the housing 7. More specifically, the embodiment of FIG. 12B is adapted for fitting within an inner diameter of the body 10, while the embodiment of FIG. 12C is adapted for fitting over an outer diameter of the body 10. In various alternative embodiments, the layers of clad material within the sheet may be reversed.

Figure 13:
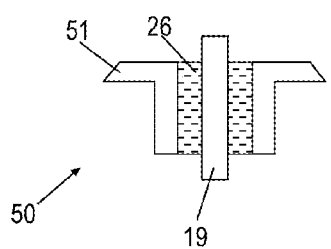
FIG. 13 is a cross-sectional view, according to some embodiments, of an electrode assembly that includes a glass-to-metal seal.

Referring now to FIG. 13, there is shown an embodiment of an electrode assembly 50. The electrode assembly 50 is designed to be installed into the blank 34 and to provide electrical communication from the energy storage media to a user. Generally, the electrode assembly 50 includes a sleeve 51. The sleeve 51 surrounds the insulator 26, which in turn surrounds the feed-through 19. In this example, the sleeve 51 is an annular cylinder with a flanged top portion.

Figure 14:
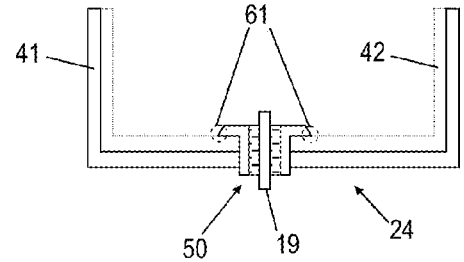
FIG. 14 is a cross-sectional view of the exemplary electrode assembly of FIG. 13 installed in the exemplary cap of FIG. 12B.

In order to assemble the cap 24, a perforation (not shown) is made in the blank 34. The perforation has a geometry that is sized to match the electrode assembly 50. Accordingly, the electrode assembly 50 is inserted into perforation of the blank 34. Once the electrode assembly 50 is inserted, the electrode assembly 50 may be affixed to the blank 34 through a technique such as welding. The welding may be laser welding which welds about a circumference of the flange of sleeve 51. Referring to FIG. 14, points 61 where welding is performed are shown. In this embodiment, the points 61 provide suitable locations for welding of stainless steel to stainless steel, a relatively simple welding procedure. Accordingly, the teachings herein provide for welding the electrode assembly 50 securely into place on the blank 34.

Material for constructing the sleeve 51 may include various types of metals or metal alloys. Generally, materials for the sleeve 51 are selected according to, for example, structural integrity and bondability (to the blank 34). Exemplary materials for the sleeve 51 include 304 stainless steel or 316 stainless steel. Material for constructing the feed-through 19 may include various types of metals or metal alloys. Generally, materials for the feed-through 19 are selected according to, for example, structural integrity and electrical conductance. Exemplary materials for the electrode include 446 stainless steel or 52 alloy.

Generally, the insulator 26 is bonded to the sleeve 51 and the feed-through 19 through known techniques (i.e., glass-to-metal bonding). Material for constructing the insulator 26 may include, without limitation, various types of glass, including high temperature glass, ceramic glass or ceramic materials. Generally, materials for the insulator are selected according to, for example, structural integrity and electrical resistance (i.e., electrical insulation properties).

Use of components (such as the foregoing embodiment of the electrode assembly 50) that rely on glass-to-metal bonding as well as use of various welding techniques provides for hermetic sealing of the energy storage. Other components may be used to provide hermetic sealing as well. As used herein, the term "hermetic seal" generally refers to a seal that exhibits a leak rate no greater than that which is defined herein. However, it is considered that the actual seal efficacy may perform better than this standard.

Additional or other techniques for coupling the electrode assembly 50 to the blank 34 include use of a bonding agent under the flange of the sleeve 51 (between the flange and the layer of second material 42), when such techniques are considered appropriate.

Figure 15:
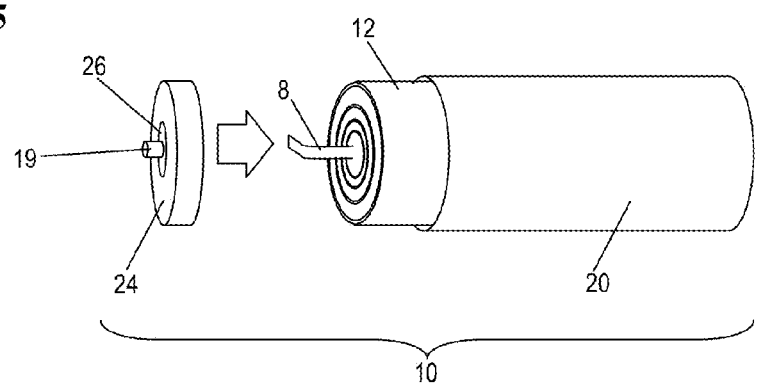
FIG. 15 depicts an exemplary arrangement of an energy storage cell in process of assembly.

Referring now to FIG. 15, the energy storage cell 12 is disposed within the body 10. The at least one terminal 8 is coupled appropriately (such as to the feed-through 19), and the cap 24 is mated with the body 10 to provide for the ultracapacitor 10.

Figure 16A:
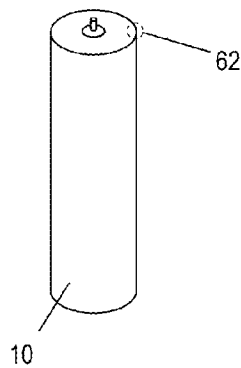
FIGS. 16A, 16B and 16C, collectively referred to herein as FIG. 16, depict certain embodiments of an assembled energy storage cell.
Figure 16B:
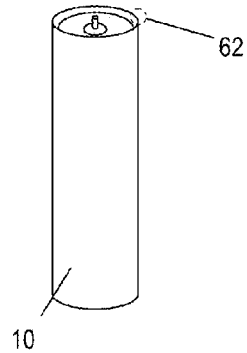
Figure 22:
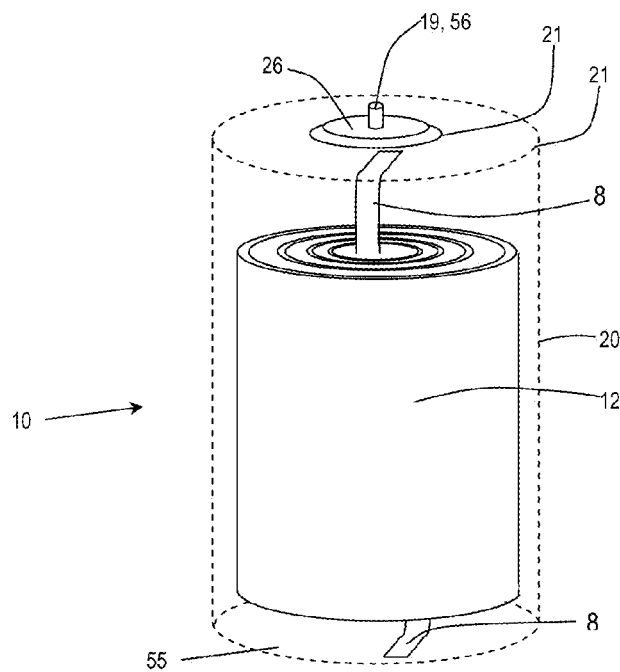
FIG. 22 is a transparent isometric view of an exemplary energy storage cell disposed in a cylindrical housing.

Once assembled, the cap 24 and the body 10 may be sealed. FIG. 22 depicts various embodiments of the assembled energy storage (in this case, the ultracapacitor 10). In FIG. 16A, a flat blank 34 (see FIG. 12A) is used to create a flat cap 24. Once the cap 24 is set on the body 10, the cap 24 and the body 10 are welded to create a seal 62. In this case, as the body 10 is an annular cylinder, the weld proceeds circumferentially about the body 10 and cap 24 to provide the seal 62. In a second embodiment, shown in FIG. 16B, the concave blank 34 (see FIG. 12B) is used to create a concave cap 24. Once the cap 24 is set on the body 10, the cap 24 and the body 10 are welded to create the seal 62. In a third embodiment, shown in FIG. 16C, the convex blank 34 (see FIG. 12C) is used to create a convex cap 24. Once the cap 24 is set on the body 10, the cap 24 and the body 10 may be welded to create the seal 62.

As appropriate, clad material may be removed (by techniques such as, for example, machining or etching, etc) to expose other metal in the multi-layer material. Accordingly, in some embodiments, the seal 62 may include an aluminum-to-aluminum weld. The aluminum-to-aluminum weld may be supplemented with other fasteners, as appropriate.

Other techniques may be used to seal the housing 7. For example, laser welding, TIG welding, resistance welding, ultrasonic welding, and other forms of mechanical sealing may be used. It should be noted, however, that in general, traditional forms of mechanical sealing alone are not adequate for providing the robust hermetic seal offered in the ultracapacitor 10.

Refer now to FIG. 12 in which aspects of assembly another embodiment of the cap 24 are depicted. FIG. 12A depicts a template (i.e., the blank 34) that is used to provide a body of the cap 24. The template is generally sized to mate with the housing 7 of an appropriate type of energy storage cell (such as the ultracapacitor 10). The cap 24 may be formed by initially providing the template forming the template, including a dome 37 within the template (shown in FIG. 12B) and by then perforating the dome 37 to provide a through-way 32 (shown in FIG. 12C). Of course, the blank 34 (e.g., a circular piece of stock) may be pressed or otherwise fabricated such that the foregoing features are simultaneously provided.

In general, and with regard to these embodiments, the cap may be formed of aluminum, or an alloy thereof. However, the cap may be formed of any material that is deemed suitable by a manufacturer, user, designer and the like. For example, the cap 24 may be fabricated from steel and passivated (i.e., coated with an inert coating) or otherwise prepared for use in the housing 7.

Figure 19:
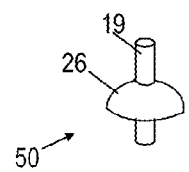
FIG. 19 is a perspective view of an electrode assembly, according to certain embodiments, that includes hemispherically shaped material.

Referring now also to FIG. 19, there is shown another embodiment of the electrode assembly 50. In these embodiments, the electrode assembly 50 includes the feed-through 19 and a hemispherically shaped material disposed about the feed-through 19. The hemispherically shaped material serves as the insulator 26, and is generally shaped to conform to the dome 37. The hemispheric insulator 26 may be fabricated of any suitable material for providing a hermetic seal while withstanding the chemical influence of the electrolyte 6. Exemplary materials include PFA (perfluoroalkoxy polymer), FEP (fluorinated ethylene-propylene), PVF (polyvinylfluoride), TFE (tetrafluoroethylene), CTFE (chlorotrifluoro ethylene), PCTFE (polychlorotrifluoroethylene), ETFE (polyethylenetetrafluoroethylene), ECTFE (polyethylenechlorotrifluoroethylene), PTFE (polytetrafluoroethylene), another fluoropolymer based material as well as any other material that may exhibit similar properties (in varying degrees) and provide for satisfactory performance (such as by exhibiting, among other things, a high resistance to solvents, acids, and bases at high temperatures, low cost and the like).

The feed-through 19 may be formed of aluminum, or an alloy thereof. However, the feed-through 19 may be formed of any material that is deemed suitable by a manufacturer, user, designer and the like. For example, the feed-through 19 may be fabricated from steel and passivated (i.e., coated with an inert coating, such as silicon) or otherwise prepared for use in the electrode assembly 50. An exemplary technique for passivation includes depositing a coating of hydrogenated amorphous silicon on the surface of the substrate and functionalizing the coated substrate by exposing the substrate to a binding reagent having at least one unsaturated hydrocarbon group under pressure and elevated temperature for an effective length of time. The hydrogenated amorphous silicon coating is deposited by exposing the substrate to silicon hydride gas under pressure and elevated temperature for an effective length of time.

The hemispheric insulator 26 may be sized relative to the dome 37 such that a snug fit (i.e., hermetic seal) is achieved when assembled into the cap 24. The hemispheric insulator 26 need not be perfectly symmetric or of classic hemispheric proportions. That is, the hemispheric insulator 26 is substantially hemispheric, and may include, for example, slight adjustments in proportions, a modest flange (such as at the base) and other features as deemed appropriate. The hemispheric insulator 26 is generally formed of homogeneous material, however, this is not a requirement. For example, the hemispheric insulator 26 may include an air or gas filled torus (not shown) therein to provide for desired expansion or compressibility.

Figure 20:
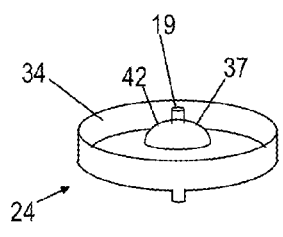
FIG. 20 is a perspective view of an exemplary cap including the electrode assembly of FIG. 19 installed in the template of FIG. 18C.

As shown in FIG. 20, the electrode assembly 50 may be inserted into the template (i.e., the formed blank 34) to provide for an embodiment of the cap 24 that includes a hemispheric hermetic seal.

Figure 21:
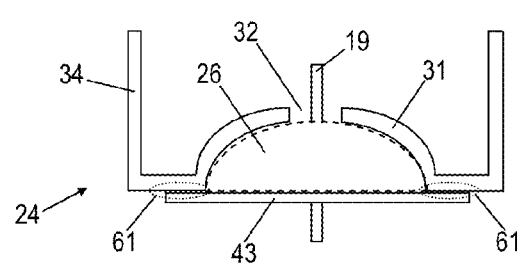
FIG. 21 is a cross-sectional view of the cap of FIG. 20.

As shown in FIG. 21, in various embodiments, a retainer 43 may be bonded or otherwise mated to a bottom of the cap 24 (i.e., a portion of the cap 24 that faces to an interior of the housing 7 and faces the energy storage cell 12). The retainer 43 may be bonded to the cap 24 through various techniques, such as aluminum welding (such as laser, ultrasonic and the like). Other techniques may be used for the bonding, including for example, stamping (i.e., mechanical bonding) and brazing. The bonding may occur, for example, along a perimeter of the retainer 43. Generally, the bonding is provided for in at least one bonding point to create a desired seal 71. At least one fastener, such as a plurality of rivets may be used to seal the insulator 26 within the retainer 43.

Figure 16C:
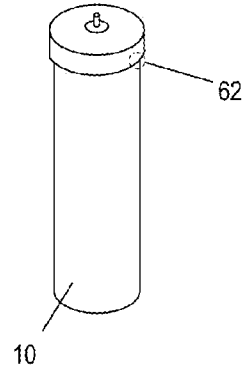

In the example of FIG. 21, the cap 24 is of a concave design (see FIG. 12B). However, other designs may be used. For example, a convex cap 24 may be provided (FIG. 12C), and an over-cap 24 may also be used (a variation of the embodiment of FIG. 12C, which is configured to mount as depicted in FIG. 16C).

The material used for the cap as well as the feed-through 19 may be selected with regard for thermal expansion of the hemispheric insulator 26. Further, manufacturing techniques may also be devised to account for thermal expansion. For example, when assembling the cap 24, a manufacturer may apply pressure to the hemispheric insulator 26, thus at least somewhat compressing the hemispheric insulator 26. In this manner, there at least some thermal expansion of the cap 24 is provided for without jeopardizing efficacy of the hermetic seal.

For further clarification of the assembled ultracapacitor, refer to FIG. 22, where a cut-away view of the ultracapacitor 10 is provided. In this example, the storage cell 12 is inserted into and contained within the body 10. Each plurality of leads are bundled together and coupled to the housing 7 as one of the terminals 8. In some embodiments, the plurality of leads are coupled to a bottom of the body 10 (on the interior), thus turning the body 10 into a negative contact 55. Likewise, another plurality of leads are bundled and coupled to the feed-through 19, to provide a positive contact 56. Electrical isolation of the negative contact 55 and the positive contact 56 is preserved by the electrical insulator 26. Generally, coupling of the leads is accomplished through welding, such as at least one of laser and ultrasonic welding. Of course, other techniques may be used as deemed appropriate.

H. Inner Barrier

Figure 7:
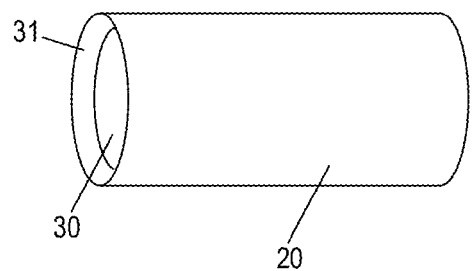
FIG. 7 depicts a barrier disposed on an interior portion of an exemplary body of a housing.

Referring now to FIG. 7, the housing 7 may include an inner barrier 30. In some embodiments, the barrier 30 is a coating. In this example, the barrier 30 is formed of polytetrafluoroethylene (PTFE). Polytetrafluoroethylene (PTFE) exhibits various properties that make this composition well suited for the barrier 30. PTFE has a melting point of about 327 degrees Celsius, has excellent dielectric properties, has a coefficient of friction of between about 0.05 to 0.10, which is the third-lowest of any known solid material, has a high corrosion resistance and other beneficial properties. Generally, an interior portion of the cap 24 may include the barrier 30 disposed thereon.

Other materials may be used for the barrier 30. Among these other materials are forms of ceramics (any type of ceramic that may be suitably applied and meet performance criteria), other polymers (preferably, a high temperature polymer) and the like. Exemplary other polymers include perfluoroalkoxy (PFA) and fluorinated ethylene propylene (FEP) as well as ethylene tetrafluoroethylene (ETFE).

The barrier 30 may include any material or combinations of materials that provide for reductions in electrochemical or other types of reactions between the energy storage cell 12 and the housing 7 or components of the housing 7. In some embodiments, the combinations are manifested as homogeneous dispersions of differing materials within a single layer. In other embodiments, the combinations are manifested as differing materials within a plurality of layers. Other combinations may be used. In short, the barrier 30 may be considered as at least one of an electrical insulator and chemically inert (i.e., exhibiting low reactivity) and therefore substantially resists or impedes at least one of electrical and chemical interactions between the storage cell 12 and the housing 7. In some embodiments, the term "low reactivity" and "low chemical reactivity" generally refer to a rate of chemical interaction that is below a level of concern for an interested party.

Figure 8A:
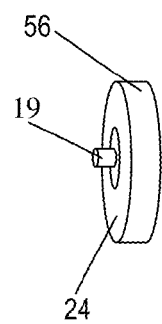
FIGS. 8A and 8B, collectively referred to herein as FIG. 8, depict aspects of an exemplary cap for a housing.
Figure 8B:
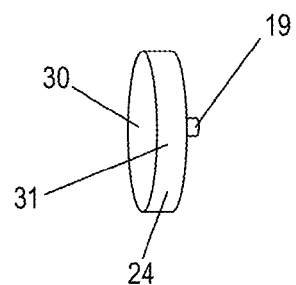

In general, the interior of the housing 7 may be host to the barrier 30 such that all surfaces of the housing 7 which are exposed to the interior are covered. At least one untreated area 31 may be included within the body 10 and on an outer surface 36 of the cap 24 (see FIG. 8A). In some embodiments, untreated areas 31 (see FIG. 8B) may be included to account for assembly requirements, such as areas which will be sealed or connected (such as by welding).

The barrier 30 may be applied to the interior portions using conventional techniques. For example, in the case of PTFE, the barrier 30 may be applied by painting or spraying the barrier 30 onto the interior surface as a coating. A mask may be used as a part of the process to ensure untreated areas 31 retain desired integrity. In short, a variety of techniques may be used to provide the barrier 30.

Figure 9:
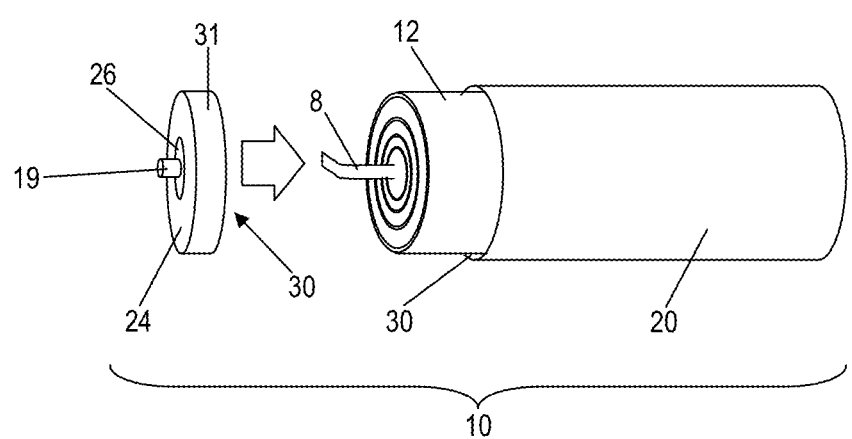
FIG. 9 depicts an exemplary assembly of the ultracapacitor according to certain of the teachings herein.

In an exemplary embodiment, the barrier 30 is about 3 mil to about 5 mil thick, while material used for the barrier 30 is a PFA based material. In this example, surfaces for receiving the material that make up the barrier 30 are prepared with grit blasting, such as with aluminum oxide. Once the surfaces are cleaned, the material is applied, first as a liquid then as a powder. The material is cured by a heat treating process. In some embodiments, the heating cycle is about 10 minutes to about 15 minutes in duration, at temperatures of about 370 degrees Celsius. This results in a continuous finish to the barrier 30 that is substantially free of pin-hole sized or smaller defects. FIG. 9 depicts assembly of an embodiment of the ultracapacitor 10 according to the teachings herein. In this embodiment, the ultracapacitor 10 includes the body 10 that includes the barrier 30 disposed therein, a cap 24 with the barrier 30 disposed therein, and the energy storage cell 12. During assembly, the cap 24 is set over the body 10. A first one of the terminals 8 is electrically coupled to the cap feedthrough 19, while a second one of the terminals 8 is electrically coupled to the housing 7, typically at the bottom, on the side or on the cap 24. In some embodiments, the second one of the terminals 8 is coupled to another feed-through 19 (such as of an opposing cap 24).

With the barrier 30 disposed on the interior surface(s) of the housing 7, electrochemical and other reactions between the housing 7 and the electrolyte are greatly reduced or substantially eliminated. This is particularly significant at higher temperatures where a rate of chemical and other reactions is generally increased.

Notably, the leakage current for ultracapacitor 10 with a barrier indicates a comparably lower initial value and no substantial increase over time while the leakage current for ultracapacitor 10 without a barrier indicates a comparably higher initial value as well as a substantial increase over time.

Generally, the barrier 30 provides a suitable thickness of suitable materials between the energy storage cell 12 and the housing 7. The barrier 30 may include a homogeneous mixture, a heterogeneous mixture and/or at least one layer of materials. The barrier 30 may provide complete coverage (i.e., provide coverage over the interior surface area of the housing with the exception of electrode contacts) or partial coverage. In some embodiments, the barrier 30 is formed of multiple components.

Figure 11:
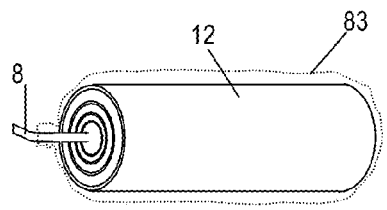
FIG. 11 depicts a barrier disposed about a storage cell as a wrapper, according to certain embodiments.

Referring to FIG. 11, aspects of an additional embodiment are shown. In some embodiments, the energy storage cell 12 is deposited within an envelope 73. That is, the energy storage cell 12 has the barrier 30 disposed thereon, wrapped thereover, or otherwise applied to separate the energy storage cell 12 from the housing 7 once assembled. The envelope 73 may be applied well ahead of packaging the energy storage cell 12 into the housing 7. Therefore, use of an envelope 73 may present certain advantages, such as to manufacturers. (Note that the envelope 73 is shown as loosely disposed over the energy storage cell 12 for purposes of illustration).

In some embodiments, the envelope 73 is used in conjunction with the coating, wherein the coating is disposed over at least a portion of the interior surfaces. For example, in one embodiment, the coating is disposed within the interior of the housing 7 only in areas where the envelope 73 may be at least partially compromised (such as be a protruding terminal 8). Together, the envelope 73 and the coating form an efficient barrier 30.

Accordingly, incorporation of the barrier 30 may provide for an ultracapacitor that exhibits leakage current with comparatively low initial values and substantially slower increases in leakage current over time in view of the prior art. Significantly, the leakage current of the ultracapacitor remains at practical (i.e., desirably low) levels when the ultracapacitor is exposed to ambient temperatures for which prior art capacitors would exhibit prohibitively large initial values of leakage current and/or prohibitively rapid increases in leakage current over time.

Having thus described embodiments of the barrier 30, and various aspects thereof, it should be recognized the ultracapacitor 10 may exhibit other benefits as a result of reduced reaction between the housing 7 and the energy storage media 1. For example, an effective series resistance (ESR) of the ultracapacitor 10 may exhibit comparatively lower values over time. Further, unwanted chemical reactions that take place in a prior art capacitor often create unwanted effects such as out-gassing, or in the case of a hermetically sealed housing, bulging of the housing. In both cases, this leads to a compromise of the structural integrity of the housing and/or hermetic seal of the capacitor. Ultimately, this may lead to leaks or catastrophic failure of the prior art capacitor. In some embodiments, these effects may be substantially reduced or eliminated by the application of a disclosed barrier 30.

It should be recognized that the terms "barrier" and "coating" are not limiting of the teachings herein. That is, any technique for applying the appropriate material to the interior of the housing 7, body 10 and/or cap 24 may be used. For example, in other embodiments, the barrier 30 is actually fabricated into or onto material making up the housing body 10, the material then being worked or shaped as appropriate to form the various components of the housing 7. When considering some of the many possible techniques for applying the barrier 30, it may be equally appropriate to roll on, sputter, sinter, laminate, print, or otherwise apply the material(s). In short, the barrier 30 may be applied using any technique deemed appropriate by a manufacturer, designer and/or user.

Materials used in the barrier 30 may be selected according to properties such as reactivity, dielectric value, melting point, adhesion to materials of the housing 7, coefficient of friction, cost, and other such factors. Combinations of materials (such as layered, mixed, or otherwise combined) may be used to provide for desired properties.

Using an enhanced housing 7, such as one with the barrier 30, may, in some embodiments, limit degradation of the advanced electrolyte system. While the barrier 30 presents one technique for providing an enhanced housing 7, other techniques may be used. For example, use of a housing 7 fabricated from aluminum would be advantageous, due to the electrochemical properties of aluminum in the presence of electrolyte 6. However, given the difficulties in fabrication of aluminum, it has not been possible (until now) to construct embodiments of the housing 7 that take advantage of aluminum.

Additional embodiments of the housing 7 include those that present aluminum to all interior surfaces, which may be exposed to electrolyte, while providing users with an ability to weld and hermetically seal the housing. Improved performance of the ultracapacitor 10 may be realized through reduced internal corrosion, elimination of problems associated with use of dissimilar metals in a conductive media and for other reasons. Advantageously, the housing 7 makes use of existing technology, such available electrode inserts that include glass-to-metal seals (and may include those fabricated from stainless steel, tantalum or other advantageous materials and components), and therefore is economic to fabricate.

Although disclosed herein as embodiments of the housing 7 that are suited for the ultracapacitor 10, these embodiments (as is the case with the barrier 30) may be used with any type of energy storage deemed appropriate, and may include any type of technology practicable. For example, other forms of energy storage may be used, including electrochemical batteries, in particular, lithium based batteries.

In general, the material(s) exposed to an interior of the housing 7 exhibit adequately low reactivity when exposed to the electrolyte 6, i.e., the advanced electrolyte system of the present invention, and therefore are merely illustrative of some of the embodiments and are not limiting of the teachings herein.

I. Factors for General Construction of Capacitors

An important aspect for consideration in construction of the ultracapacitor 10 is maintaining good chemical hygiene. In order to assure purity of the components, in various embodiments, the activated carbon, carbon fibers, rayon, carbon cloth, and/or nanotubes making up the energy storage media 1 for the two electrode 3, are dried at elevated temperature in a vacuum environment. The separator 5 is also dried at elevated temperature in a vacuum environment. Once the electrode 3 and the separator 5 are dried under vacuum, they are packaged in the housing 7 without a final seal or cap in an atmosphere with less than 50 parts per million (ppm) of water. The uncapped ultracapacitor 10 may be dried, for example, under vacuum over a temperature range of about 100 degrees Celsius to about 300 degrees Celsius. Once this final drying is complete, the electrolyte 6 may be added and the housing 7 is sealed in a relatively dry atmosphere (such as an atmosphere with less than about 50 ppm of moisture). Of course, other methods of assembly may be used, and the foregoing provides merely a few exemplary aspects of assembly of the ultracapacitor 10.

J. Supporting Methods of the Invention

Certain methods are provided herein for producing the ultracapacitors that may be utilized by the systems of the present invention, including methods of reducing impurities or fabricating devices of the present invention. Such methods of purification are also additionally applicable to any advanced electrolyte system of the present invention i. AES Contaminants In certain embodiments, the advanced electrolyte system (AES) of the present invention is purified remove contaminants and to provide desired enhanced performance characteristics described herein. As such, the present disclosure provides a method for purifying an AES, the method comprising: mixing water into an advanced electrolyte system to provide a first mixture; partitioning the first mixture; collecting the advanced electrolyte system from the first mixture; adding a solvent to the collected liquid to provide a second mixture; mixing carbon into the second mixture to provide a third mixture; separating the advanced electrolyte system from the third mixture to obtain the purified advanced electrolyte system. Generally, the process calls for selecting an electrolyte, adding de-ionized water as well as activated carbon under controlled conditions. The de-ionized water and activated carbon are subsequently removed, resulting in an electrolyte that is substantially purified. The purified electrolyte is suited for use in, among other things, an ultracapacitor.

This method may be used to ensure a high degree of purity of the advanced electrolyte system (AES) of the present invention. It should be noted that although the process is presented in terms of specific parameters (such as quantities, formulations, times and the like), that the presentation is merely exemplary and illustrative of the process for purifying electrolyte and is not limiting thereof.

For example, the method may further comprise one or more of the following steps or characterizations: heating the first mixture; wherein partitioning comprises letting the first mixture sit undisturbed until the water and the AES are substantially partitioned; wherein adding a solvent comprises adding at least one of diethylether, pentone, cyclopentone, hexane, cyclohexane, benzene, toluene, 1-4 dioxane, and chloroform; wherein mixing carbon comprises mixing carbon powder; wherein mixing carbon comprises stirring the third mixture substantially constantly; wherein separating the AES comprises at least one of filtering carbon from the third mixture and evaporating the solvent from the third mixture.

In a first step of the process for purifying electrolyte, the electrolyte 6 (in some embodiments, the ionic liquid) is mixed with deionized water, and then raised to a moderate temperature for some period of time. In a proof of concept, fifty (50) milliliters (ml) of ionic liquid was mixed with eight hundred and fifty (850) milliliters (ml) of the deionized water. The mixture was raised to a constant temperature of sixty (60) degrees Celsius for about twelve (12) hours and subjected to constant stirring (of about one hundred and twenty (120) revolutions per minute (rpm)).

In a second step, the mixture of ionic liquid and deionized water is permitted to partition. In this example, the mixture was transferred via a funnel, and allowed to sit for about four (4) hours.

In a third step, the ionic liquid is collected. In this example, a water phase of the mixture resided on the bottom, with an ionic liquid phase on the top. The ionic liquid phase was transferred into another beaker.

In a fourth step, a solvent was mixed with the ionic liquid. In this example, a volume of about twenty five (25) milliliters (ml) of ethyl acetate was mixed with the ionic liquid. This mixture was again raised to a moderate temperature and stirred for some time.

Although ethyl acetate was used as the solvent, the solvent can be at least one of diethylether, pentone, cyclopentone, hexane, cyclohexane, benzene, toluene, 1-4 dioxane, chloroform or any combination thereof as well as other material(s) that exhibit appropriate performance characteristics. Some of the desired performance characteristics include those of a non-polar solvent as well as a high degree of volatility.

In a fifth step, carbon powder is added to the mixture of the ionic liquid and solvent. In this example, about twenty (20) weight percent (wt %) of carbon (of about a 0.45 micrometer diameter) was added to the mixture.

In a sixth step, the ionic liquid is again mixed. In this example, the mixture with the carbon powder was then subjected to constant stirring (120 rpm) overnight at about seventy (70) degrees Celsius.

In a seventh step, the carbon and the ethyl acetate are separated from the ionic liquid. In this example, the carbon was separated using Buchner filtration with a glass microfiber filter. Multiple filtrations (three) were performed. The ionic liquid collected was then passed through a 0.2 micrometer syringe filter in order to remove substantially all of the carbon particles. In this example, the solvent was then subsequently separated from the ionic liquid by employing rotary evaporation. Specifically, the sample of ionic liquid was stirred while increasing temperature from seventy (70) degrees Celsius to eighty (80) degrees Celsius, and finished at one hundred (100) degrees Celsius. Evaporation was performed for about fifteen (15) minutes at each of the respective temperatures.

The process for purifying electrolyte has proven to be very effective. For the sample ionic liquid, water content was measured by titration, with a titration instrument provided by Mettler-Toledo Inc., of Columbus, Ohio (model No: AQC22). Halide content was measured with an ISE instrument provided by Hanna Instruments of Woonsocket, R.I. (model no. AQC22). The standards solution for the ISE instrument was obtained from Hanna, and included HI 4007-03 (1,000 ppm chloride standard), HI 4010-03 (1,000 ppm fluoride standard) HI 4000-00 (ISA for halide electrodes), and HI 4010-00 (TISAB solution for fluoride electrode only). Prior to performing measurements, the ISE instrument was calibrated with the standards solutions using 0.1, 10, 100 and 1,000 parts per million (ppm) of the standards, mixed in with deionized water. ISA buffer was added to the standard in a 1:50 ratio for measurement of Cl— ions. Results are shown in Table 4.

TABLE 4

Purification Data for Electrolyte Containing 1-butyl-1-methylpyrolidinium and tetracyanoborate

| Impurity | Before (ppm) | After (ppm) | DI Water (ppm) |
|---|---|---|---|
| $Cl^-$ | 5,300.90 | 769 | 9.23E-1 |
| F— | 75.61 | 10.61 | 1.10E-1 |
| $H_2O$ | 1080 | 20 | — |

A four step process was used to measure the halide ions. First, Cl— and F— ions were measured in the deionized water. Next, a 0.01 M solution of ionic liquid was prepared with deionized water. Subsequently, Cl— and F— ions were measured in the solution. Estimation of the halide content was then determined by subtracting the quantity of ions in the water from the quantity of ions in the solution.

Purification standards were also examined with respect to the electrolyte contaminant compositions through the analysis of leakage current. Leakage current for purified electrolyte in a similarly structured ultracapacitor 10 shows a substantial decrease in initial leakage current, as well as a modest decrease in leakage current over the later portion of the measurement interval. More information is provided on the construction of each embodiment in Table 5.

TABLE 5

Test Ultracapacitor Configuration

| Parameter | | |
|---|---|---|
| Cell Size: | Open Sub C | Open Sub C |
| Casing: | Coated P870 | Coated P870 |
| Electrode Material: | Double Sided Activated Carbon (150/40) | Double Sided Activated Carbon (150/40) |
| Separator: | Fiberglass | Fiberglass |
| Size of Electrodes: | IE: 233 × 34 mm OE: 256 × 34 mm | IE: 233 × 34 mm OE: 256 × 34 mm |
| Tabs: | 0.005" Aluminum (3 Tabs) | 0.005" Aluminum (3 Tabs) |
| Temperature | 150° C. | 150° C. |
| Electrolyte: | Unpurified AES | Purified AES |

Other benefits are also realized, including improvements in stability of resistance and capacitance of the ultracapacitor 10.

Leakage current may be determined in a number of ways. Qualitatively, leakage current may be considered as current drawn into a device, once the device has reached a state of equilibrium. In practice, it is always or almost always necessary to estimate the actual leakage current as a state of equilibrium that may generally only be asymptotically approached. Thus, the leakage current in a given measurement may be approximated by measuring the current drawn into the ultracapacitor 10, while the ultracapacitor 10 is held at a substantially fixed voltage and exposed to a substantially fixed ambient temperature for a relatively long period of time. In some instances, a relatively long period of time may be determined by approximating the current time function as an exponential function, then allowing for several (e.g., about 3 to 5) characteristic time constants to pass. Often, such a duration ranges from about 50 hours to about 100 hours for many ultracapacitor technologies. Alternatively, if such a long period of time is impractical for any reason, the leakage current may simply be extrapolated, again, perhaps, by approximating the current time function as an exponential or any approximating function deemed appropriate. Notably, leakage current will generally depend on ambient temperature. So, in order to characterize performance of a device at a temperature or in a temperature range, it is generally important to expose the device to the ambient temperature of interest when measuring leakage current.

Note that one approach to reduce the volumetric leakage current at a specific temperature is to reduce the operating voltage at that temperature. Another approach to reduce the volumetric leakage current at a specific temperature is to increase the void volume of the ultracapacitor. Yet another approach to reduce the leakage current is to reduce loading of the energy storage media 1 on the electrode 3.

Having disclosed aspects of embodiments for purification of electrolyte and ionic liquid, it should be recognized that a variety of embodiments may be realized. Further a variety of techniques may be practiced. For example, steps may be adjusted, the order of steps and the like.

ii. Water/Moisture Content and Removal

The housing 7 of a sealed ultracapacitor 10 may be opened, and the storage cell 12 sampled for impurities. Water content may be measured using the Karl Fischer method for the electrodes, separator and electrolyte from the cell 42. Three measurements may be taken and averaged.

In general, a method for characterizing a contaminant within the ultracapacitor includes breaching the housing 7 to access contents thereof, sampling the contents and analyzing the sample. Techniques disclosed elsewhere herein may be used in support of the characterizing.

Note that to ensure accurate measurement of impurities in the ultracapacitor and components thereof, including the electrode, the electrolyte and the separator, assembly and disassembly may be performed in an appropriate environment, such as in an inert environment within a glove box.

By reducing the moisture content in the ultracapacitor 10 (e.g., to less than 500 part per million (ppm) over the weight and volume of the electrolyte and the impurities to less than 1,000 ppm), the ultracapacitor 10 can more efficiently operate over the temperature range, with a leakage current (I/L) that is less than 10 Amperes per Liter within that temperature range and voltage range.

In one embodiment, leakage current (I/L) at a specific temperature is measured by holding the voltage of the ultracapacitor 10 constant at the rated voltage (i.e., the maximum rated operating voltage) for seventy two (72) hours. During this period, the temperature remains relatively constant at the specified temperature. At the end of the measurement interval, the leakage current of the ultracapacitor 10 is measured.

In some embodiments, a maximum voltage rating of the ultracapacitor 10 is about 4 V at room temperature. An approach to ensure performance of the ultracapacitor 10 at elevated temperatures (for example, over 210 degrees Celsius), is to derate (i.e., to reduce) the voltage rating of the ultracapacitor 10. For example, the voltage rating may be adjusted down to about 0.5 V, such that extended durations of operation at higher temperature are achievable.

iii. Fabrication Techniques for Ultracapacitors

Moreover, it should be recognized that certain robust assembly techniques may be required to provide highly efficient energy storage of the ultracapacitors described herein. Accordingly, some of the techniques for assembly are now discussed.

Once the ultracapacitor 10 is fabricated, it may be used in high temperature applications with little or no leakage current and little increase in resistance. The ultracapacitor 10 described herein can operate efficiently at temperatures from about minus 40 degrees Celsius to about 210 degrees Celsius with leakage currents normalized over the volume of the device less than 10 amperes per liter (A/L) of volume of the device within the entire operating voltage and temperature range. In certain embodiments, the capacitor is operable across temperatures from minus 40 degrees Celsius to 210 degrees Celsius.

As an overview, a method of assembly of a cylindrically shaped ultracapacitor 10 is provided. Beginning with the electrode 3, each electrode 3 is fabricated once the energy storage media 1 has been associated with the current collector 2. A plurality of leads are then coupled to each electrode 3 at appropriate locations. A plurality of electrode 3 are then oriented and assembled with an appropriate number of separators 5 therebetween to form the storage cell 12. The storage cell 12 may then be rolled into a cylinder, and may be secured with a wrapper. Generally, respective ones of the leads are then bundled to form each of the terminals 8.

Prior to incorporation of the electrolyte 6, i.e., the advanced electrolyte systems of the present invention, into the ultracapacitor 10 (such as prior to assembly of the storage cell 12, or thereafter) each component of the ultracapacitor 10 may be dried to remove moisture. This may be performed with unassembled components (i.e., an empty housing 7, as well as each of the electrode 3 and each of the separators 5), and subsequently with assembled components (such as the storage cell 12).

Drying may be performed, for example, at an elevated temperature in a vacuum environment. Once drying has been performed, the storage cell 12 may then be packaged in the housing 7 without a final seal or cap. In some embodiments, the packaging is performed in an atmosphere with less than 50 parts per million (ppm) of water. The uncapped ultracapacitor 10 may then be dried again. For example, the ultracapacitor 10 may be dried under vacuum over a temperature range of about 100 degrees Celsius to about 300 degrees Celsius. Once this final drying is complete, the housing 7 may then be sealed in, for example, an atmosphere with less than 50 ppm of moisture.

In some embodiments, once the drying process (which may also be referred to a "baking" process) has been completed, the environment surrounding the components may be filled with an inert gas. Exemplary gasses include argon, nitrogen, helium, and other gasses exhibiting similar properties (as well as combinations thereof).

Generally, a fill port (a perforation in a surface of the housing 7) is included in the housing 7, or may be later added. Once the ultracapacitor 10 has been filled with electrolyte 6, i.e., the advanced electrolyte systems of the present invention, the fill port may then be closed. Closing the fill port may be completed, for example, by welding material (e.g., a metal that is compatible with the housing 7) into or over the fill port. In some embodiments, the fill port may be temporarily closed prior to filling, such that the ultracapacitor 10 may be moved to another environment, for subsequent re-opening, filling and closure. However, as discussed herein, it is considered that the ultracapacitor 10 is dried and filled in the same environment.

A number of methods may be used to fill the housing 7 with a desired quantity of the advanced electrolyte system. Generally, controlling the fill process may provide for, among other things, increases in capacitance, reductions in equivalent-series-resistance (ESR), and limiting waste of electrolyte. A vacuum filling method is provided as a non-limiting example of a technique for filling the housing 7 and wetting the storage cell 12 with the electrolyte 6.

First, however, note that measures may be taken to ensure that any material that has a potential to contaminate components of the ultracapacitor 10 is clean, compatible and dry. As a matter of convention, it may be considered that "good hygiene" is practiced to ensure assembly processes and components do not introduce contaminants into the ultracapacitor 10.

In the "vacuum method" a container is placed onto the housing 7 around the fill port. A quantity of electrolyte 6, i.e., the advanced electrolyte systems of the present invention, is then placed into the container in an environment that is substantially free of oxygen and water (i.e., moisture). A vacuum is then drawn in the environment, thus pulling any air out of the housing and thus simultaneously drawing the electrolyte 6 into the housing 7. The surrounding environment may then be refilled with inert gas (such as argon, nitrogen, or the like, or some combination of inert gases), if desired. The ultracapacitor 10 may be checked to see if the desired amount of electrolyte 6 has been drawn in. The process may be repeated as necessary until the desired amount of electrolyte 6 is in the ultracapacitor 10.

After filling with electrolyte 6, i.e., the advanced electrolyte systems of the present invention, in certain embodiments, material may be fit into the fill port to seal the ultracapacitor 10. The material may be, for example, a metal that is compatible with the housing 7 and the electrolyte 6. In one example, material is force fit into the fill port, essentially performing a "cold weld" of a plug in the fill port. In particular embodiments, the force fit may be complimented with other welding techniques as discussed further herein.

In general, assembly of the housing often involves placing the storage cell 12 within the body 10 and filling the body 10 with the advanced electrolyte system. Another drying process may be performed. Exemplary drying includes heating the body 10 with the storage cell 12 and advanced electrolyte system therein, often under a reduced pressure (e.g., a vacuum). Once adequate (optional) drying has been performed, final steps of assembly may be performed. In the final steps, internal electrical connections are made, the cap 24 is installed, and the cap 24 is hermetically sealed to the body 10, by, for example, welding the cap 24 to the body 10.

In some embodiments, at least one of the housing 7 and the cap 24 is fabricated to include materials that include a plurality of layers. For example, a first layer of material may include aluminum, with a second layer of material being stainless steel. In this example, the stainless steel is clad onto the aluminum, thus providing for a material that exhibits a desired combination of metallurgical properties. That is, in the embodiments provided herein, the aluminum is exposed to an interior of the energy storage cell (i.e., the housing), while the stainless steel is exposed to exterior. In this manner, advantageous electrical properties of the aluminum are enjoyed, while structural properties (and metallurgical properties, i.e., weldability) of the stainless steel are relied upon for construction. The multi-layer material may include additional layers as deemed appropriate. Advantageously, this provides for welding of stainless steel to stainless steel, a relatively simple welding procedure.

While material used for construction of the body 10 includes aluminum, any type of aluminum or aluminum alloy deemed appropriate by a designer or fabricator (all of which are broadly referred to herein simply as "aluminum"). Various alloys, laminates, and the like may be disposed over (e.g., clad to) the aluminum (the aluminum being exposed to an interior of the body 10. Additional materials (such as structural materials or electrically insulative materials, such as some polymer-based materials) may be used to compliment the body and/or the housing 7. The materials disposed over the aluminum may likewise be chosen by what is deemed appropriate by a designer or fabricator.

Use of aluminum is not necessary or required. In short, material selection may provide for use of any material deemed appropriate by a designer, fabricator, or user and the like. Considerations may be given to various factors, such as, for example, reduction of electrochemical interaction with the electrolyte 6, structural properties, cost and the like.

Embodiments of the ultracapacitor 10 that exhibit a relatively small volume may be fabricated in a prismatic form factor such that the electrode 3 of the ultracapacitor 10 oppose one another, at least one electrode 3 having an internal contact to a glass to metal seal, the other having an internal contact to a housing or to a glass to metal seal.

A volume of a particular ultracapacitor 10 may be extended by combining several storage cells (e.g., welding together several jelly rolls) within one housing 7 such that they are electrically in parallel or in series.

In a variety of embodiments, it is useful to use a plurality of the ultracapacitors 10 together to provide a power supply. In order to provide for reliable operation, individual ultracapacitors 10 may be tested in advance of use. In order to perform various types of testing, each of the ultracapacitors 10 may be tested as a singular cell, in series or in parallel with multiple ultracapacitors 10 attached. Using different metals joined by various techniques (such as by welding) can reduce the ESR of the connection as well as increase the strength of the connections. Some aspects of connections between ultracapacitors 10 are now introduced.

In some embodiments, the ultracapacitor 10 includes two contacts. The two contacts are the glass-to-metal seal pin (i.e., the feed-through 19) and the entire rest of the housing 7. When connecting a plurality of the ultracapacitors 10 in series, it is often desired to couple an interconnection between a bottom of the housing 7 (in the case of the cylindrical form housing 7), such that distance to the internal leads is minimized, and therefore of a minimal resistance. In these embodiments, an opposing end of the interconnection is usually coupled to the pin of the glass-to-metal seal.

With regard to interconnections, a common type of weld involves use of a parallel tip electric resistance welder. The weld may be made by aligning an end of the interconnection above the pin and welding the interconnection directly to the pin. Using a number of welds will increase the strength and connection between the interconnection and the pin. Generally, when welding to the pin, configuring a shape of the end of the interconnection to mate well with the pin serves to ensure there is substantially no excess material overlapping the pin that would cause a short circuit.

An opposed tip electric resistance welder may be used to weld the interconnection to the pin, while an ultrasonic welder may used to weld the interconnection to the bottom of the housing 7. Soldering techniques may used when metals involved are compatible.

With regard to materials used in interconnections, a common type of material used for the interconnection is nickel. Nickel may be used as it welds well with stainless steel and has a strong interface. Other metals and alloys may be used in place of nickel, for example, to reduce resistance in the interconnection.

Generally, material selected for the interconnection is chosen for compatibility with materials in the pin as well as materials in the housing 7. Exemplary materials include copper, nickel, tantalum, aluminum, and nickel copper clad. Further metals that may be used include silver, gold, brass, platinum, and tin.

In some embodiments, such as where the pin (i.e., the feed-through 19) is made of tantalum, the interconnection may make use of intermediate metals, such as by employing a short bridge connection. An exemplary bridge connection includes a strip of tantalum, which has been modified by use of the opposed tip resistance welder to weld a strip of aluminum/copper/nickel to the bridge. A parallel resistance welder is then used to weld the tantalum strip to the tantalum pin.

The bridge may also be used on the contact that is the housing 7. For example, a piece of nickel may be resistance welded to the bottom of the housing 7. A strip of copper may then be ultrasonic welded to the nickel bridge. This technique helps to decrease resistance of cell interconnections. Using different metals for each connection can reduce the ESR of the interconnections between cells in series.

Having thus described aspects of a robust ultracapacitor 10 that is useful for high temperature environments (i.e., up to about 210 degrees Celsius), some additional aspects are now provided and/or defined.

A variety of materials may be used in construction of the ultracapacitor 10. Integrity of the ultracapacitor 10 is essential if oxygen and moisture are to be excluded and the electrolyte 6 is to be prevented from escaping. To accomplish this, seam welds and any other sealing points should meet standards for hermiticity over the intended temperature range for operation. Also, materials selected should be compatible with other materials, such as ionic liquids and solvents that may be used in the formulation of the advanced electrolyte system.

In some embodiments, the feed-through 19 is formed of metal such as at least one of KOVAR™ (a trademark of Carpenter Technology Corporation of Reading, Pa., where KOVAR is a vacuum melted, iron-nickel-cobalt, low expansion alloy whose chemical composition is controlled within narrow limits to assure precise uniform thermal expansion properties), Alloy 52 (a nickel iron alloy suitable for glass and ceramic sealing to metal), tantalum, molybdenum, niobium, tungsten, Stainless Steel 446 (a ferritic, non-heat treatable stainless steel that offers good resistance to high temperature corrosion and oxidation) and titanium.

The body of glass-to-metal seals that take advantage of the foregoing may be fabricated from 300 series stainless steels, such as 304, 304L, 316, and 316L alloys. The bodies may also be made from metal such as at least one of various nickel alloys, such as Inconel (a family of austenitic nickel-chromium-based superalloys that are oxidation and corrosion resistant materials well suited for service in extreme environments subjected to pressure and heat) and Hastelloy (a highly corrosion resistant metal alloy that includes nickel and varying percentages of molybdenum, chromium, cobalt, iron, copper, manganese, titanium, zirconium, aluminum, carbon, and tungsten).

The insulating material between the feed-through 19 and the surrounding body in the glass-to-metal seal is typically a glass, the composition of which is proprietary to each manufacturer of seals and depends on whether the seal is under compression or is matched. Other insulative materials may be used in the glass-to-metal seal. For example, various polymers may be used in the seal. As such, the term "glass-to-metal" seal is merely descriptive of a type of seal, and is not meant to imply that the seal must include glass.

The housing 7 for the ultracapacitor 10 may be made from, for example, types 304, 304L, 316, and 316L stainless steels. They may also be constructed from, but not limited to, some of the aluminum alloys, such as 1100, 3003, 5052, 4043 and 6061. Various multi-layer materials may be used, and may include, for example, aluminum clad to stainless steel. Other non-limiting compatible metals that may be used include platinum, gold, rhodium, ruthenium and silver.

Specific examples of glass-to-metal seals that have been used in the ultracapacitor 10 include two different types of glass-to-metal seals. A first one is from SCHOTT with a US location in Elmsford, N.Y. This embodiment uses a stainless steel pin, glass insulator, and a stainless steel body. A second glass-to-metal seal is from HERMETIC SEAL TECHNOLOGY of Cincinnati, Ohio. This second embodiment uses a tantalum pin, glass insulator and a stainless steel body. Varying sizes of the various embodiments may be provided.

An additional embodiment of the glass-to-metal seal includes an embodiment that uses an aluminum seal and an aluminum body. Yet another embodiment of the glass-to-metal seal includes an aluminum seal using epoxy or other insulating materials (such as ceramics or silicon).

A number of aspects of the glass-to-metal seal may be configured as desired. For example, dimensions of housing and pin, and the material of the pin and housing may be modified as appropriate. The pin can also be a tube or solid pin, as well as have multiple pins in one cover. While the most common types of material used for the pin are stainless steel alloys, copper cored stainless steel, molybdenum, platinum-iridium, various nickel-iron alloys, tantalum and other metals, some non-traditional materials may be used (such as aluminum). The housing is usually formed of stainless steel, titanium and/or various other materials.

A variety of fastening techniques may be used in assembly of the ultracapacitor 10. For example, and with regards to welding, a variety of welding techniques may be used. The following is an illustrative listing of types of welding and various purposes for which each type of welding may be used.

Ultrasonic welding may be used for, among other things: welding aluminum tabs to the current collector; welding tabs to the bottom clad cover; welding a jumper tab to the clad bridge connected to the glass-to-metal seal pin; and welding jelly roll tabs together. Pulse or resistance welding may be used for, among other things: welding leads onto the bottom of the can or to the pin; welding leads to the current collector; welding a jumper to a clad bridge; welding a clad bridge to the terminal 8; welding leads to a bottom cover. Laser welding may be used for, among other things: welding a stainless steel cover to a stainless steel can; welding a stainless steel bridge to a stainless steel glass-to-metal seal pin; and welding a plug into the fill port. TIG welding may be used for, among other things: sealing aluminum covers to an aluminum can; and welding aluminum seal into place. Cold welding (compressing metals together with high force) may be used for, among other things: sealing the fillport by force fitting an aluminum ball/tack into the fill port.

iv. Certain Advantageous Embodiments of the Fabrication

Certain advantageous embodiments, which are not intended to be limiting are provided herein below.

Figure 23:
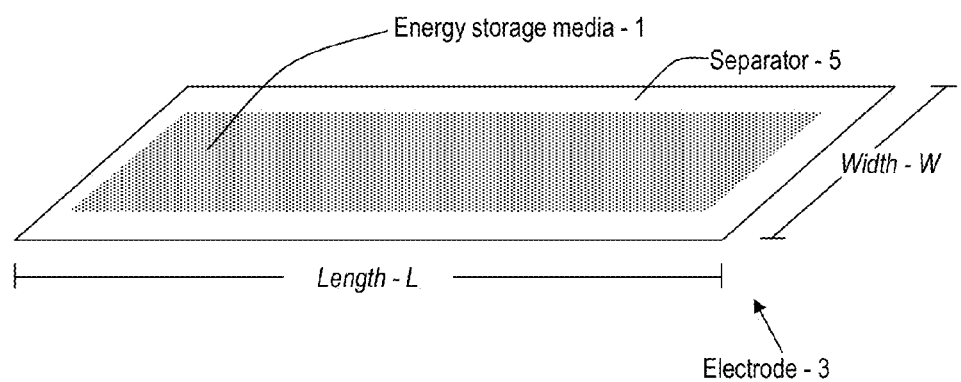
FIG. 23 is an isometric view of an embodiment of an exemplary energy storage cell prior to being rolled into a rolled storage cell.

In one particular embodiment, and referring to FIG. 23, components of an exemplary electrode 3 are shown. In this example, the electrode 3 will be used as the negative electrode 3 (however, this designation is arbitrary and merely for referencing).

As may be noted from the illustration, at least in this embodiment, the separator 5 is generally of a longer length and wider width than the energy storage media 1 (and the current collector 2). By using a larger separator 5, protection is provided against short circuiting of the negative electrode 3 with the positive electrode 3. Use of additional material in the separator 5 also provides for better electrical protection of the leads and the terminal 8.

Figure 24:
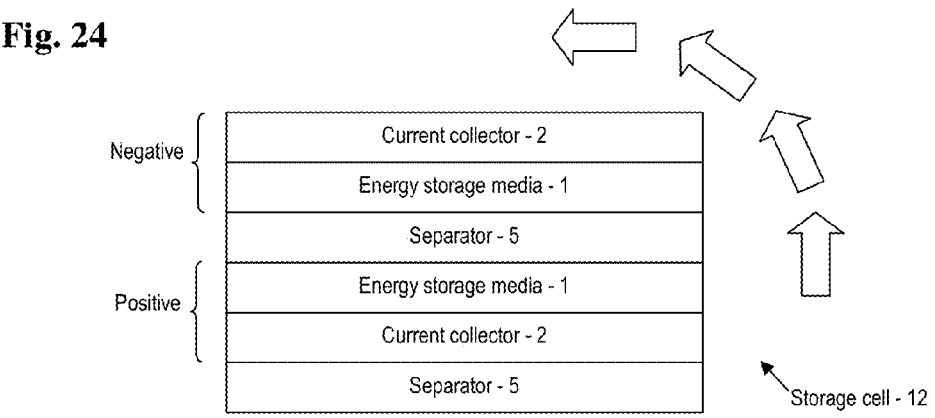
FIG. 24 is a side view of a storage cell, showing the various layers of one embodiment.

Refer now to FIG. 24 which provides a side view of an embodiment of the storage cell 12. In this example, a layered stack of energy storage media 1 includes a first separator 5 and a second separator 5, such that the electrode 3 are electrically separated when the storage cell 12 is assembled into a rolled storage cell 23. Note that the term "positive" and "negative" with regard to the electrode 3 and assembly of the ultracapacitor 10 is merely arbitrary, and makes reference to functionality when configured in the ultracapacitor 10 and charge is stored therein. This convention, which has been commonly adopted in the art, is not meant to apply that charge is stored prior to assembly, or connote any other aspect other than to provide for physical identification of different electrodes.

Prior to winding the storage cell 12, the negative electrode 3 and the positive electrode 3 are aligned with respect to each other. Alignment of the electrode 3 gives better performance of the ultracapacitor 10 as a path length for ionic transport is generally minimized when there is a highest degree of alignment. Further, by providing a high degree of alignment, excess separator 5 is not included and efficiency of the ultracapacitor 10 does not suffer as a result.

Figure 25:
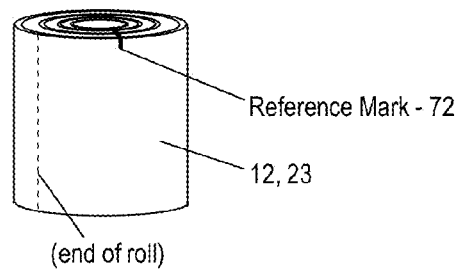
FIG. 25 is an isometric view of a rolled storage cell, according to some embodiments, which includes a reference mark for placing a plurality of leads.

Referring now also to FIG. 25, there is shown an embodiment of the storage cell 12 wherein the electrode 3 have been rolled into the rolled storage cell 23. One of the separators 5 is present as an outermost layer of the storage cell 12 and separates energy storage media 1 from an interior of the housing 7.

"Polarity matching" may be employed to match a polarity of the outermost electrode in the rolled storage cell 23 with a polarity of the body 10. For example, in some embodiments, the negative electrode 3 is on the outermost side of the tightly packed package that provides the rolled storage cell 23. In these embodiments, another degree of assurance against short circuiting is provided. That is, where the negative electrode 3 is coupled to the body 10, the negative electrode 3 is the placed as the outermost electrode in the rolled storage cell 23. Accordingly, should the separator 5 fail, such as by mechanical wear induced by vibration of the ultracapacitor 10 during usage, the ultracapacitor 10 will not fail as a result of a short circuit between the outermost electrode in the rolled storage cell 23 and the body 10.

For each embodiment of the rolled storage cell 23, (see for example, FIG. 25) a reference mark 72 may be in at least the separator 5. The reference mark 72 will be used to provide for locating the leads on each of the electrode 3. In some embodiments, locating of the leads is provided for by calculation. For example, by taking into account an inner diameter of the jelly roll and an overall thickness for the combined separators 5 and electrode 3, a location for placement of each of the leads may be estimated. However, practice has shown that it is more efficient and effective to use a reference mark 72. The reference mark 72 may include, for example, a slit in an edge of the separator(s) 5.

Generally, the reference mark 72 is employed for each new specification of the storage cell 12. That is, as a new specification of the storage cell 12 may call for differing thickness of at least one layer therein (over a prior embodiment), use of prior reference marks may be at least somewhat inaccurate.

Figure 26:
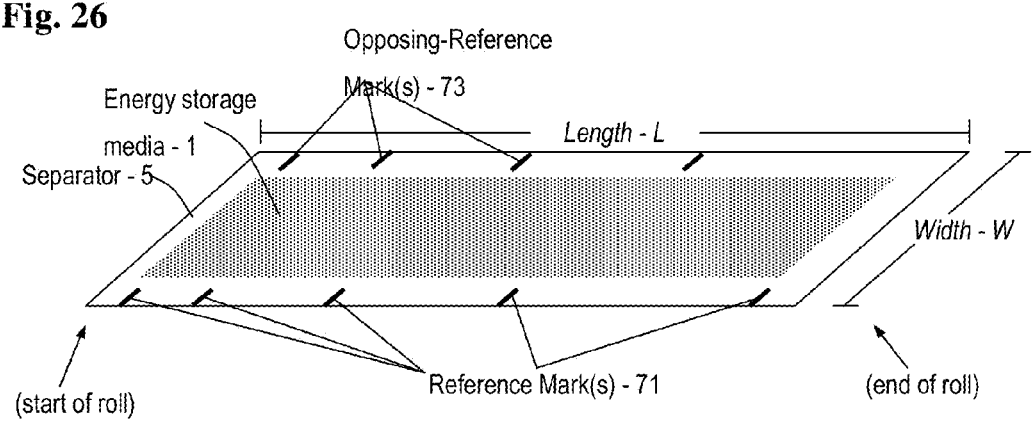
FIG. 26 is an isometric view of the exemplary storage cell of FIG. 25 with reference marks prior to being rolled.

In general, the reference mark 72 is manifested as a single radial line that traverses the roll from a center thereof to a periphery thereof. Accordingly, when the leads are installed along the reference mark 72, each lead will align with the remaining leads. However, when the storage cell 12 is unrolled (for embodiments where the storage cell 12 is or will become a roll), the reference mark 72 may be considered to be a plurality of markings (as shown in FIG. 26). As a matter of convention, regardless of the embodiment or appearance of marking of the storage cell 12, identification of a location for incorporation of the lead is considered to involve determination of a "reference mark 72" or a "set of reference marks 72."

Referring now to FIG. 26, once the reference mark 72 has been established (such as by marking a rolled up storage cell 12), an installation site for installation each of the leads is provided (i.e., described by the reference mark 72). Once each installation site has been identified, for any given build specification of the storage cell 12, the relative location of each installation site may be repeated for additional instances of the particular build of storage cell 12.

Generally, each lead is coupled to a respective current collector 2 in the storage cell 12. In some embodiments, both the current collector 2 and the lead are fabricated from aluminum. Generally, the lead is coupled to the current collector 2 across the width, W, however, the lead may be coupled for only a portion of the width, W. The coupling may be accomplished by, for example, ultrasonic welding of the lead to the current collector 2. In order to accomplish the coupling, at least some of the energy storage media 1 may be removed (as appropriate) such that each lead may be appropriately joined with the current collector 2. Other preparations and accommodations may be made, as deemed appropriate, to provide for the coupling.

In certain embodiments, opposing reference marks 73 may be included. That is, in the same manner as the reference marks 72 are provided, a set of opposing reference marks 73 may be made to account for installation of leads for the opposing polarity. That is, the reference marks 72 may be used for installing leads to a first electrode 3, such as the negative electrode 3, while the opposing reference marks 73 may be used for installing leads to the positive electrode 3. In the embodiment where the rolled storage cell 23 is cylindrical, the opposing reference marks 73 are disposed on an opposite side of the energy storage media 1, and offset lengthwise from the reference marks 72 (as depicted).

Note that in FIG. 26, the reference marks 72 and the opposing reference marks 73 are both shown as being disposed on a single electrode 3. That is, FIG. 23 depicts an embodiment that is merely for illustration of spatial (i.e., linear) relation of the reference marks 72 and the opposing reference marks 73. This is not meant to imply that the positive electrode 3 and the negative electrode 3 share energy storage media 1. However, it should be noted that in instances where the reference marks 72 and the opposing reference marks 73 are placed by rolling up the storage cell 12 and then marking the separator 5, that the reference marks 72 and the opposing reference marks 73 may indeed by provided on a single separator 5. However, in practice, only one set of the reference marks 72 and the opposing reference marks 73 would be used to install the leads for any given electrode 3. That is, it should be recognized that the embodiment depicted in FIG. 26 is to be complimented with another layer of energy storage media 1 for another electrode 3 which will be of an opposing polarity.

Figure 27:
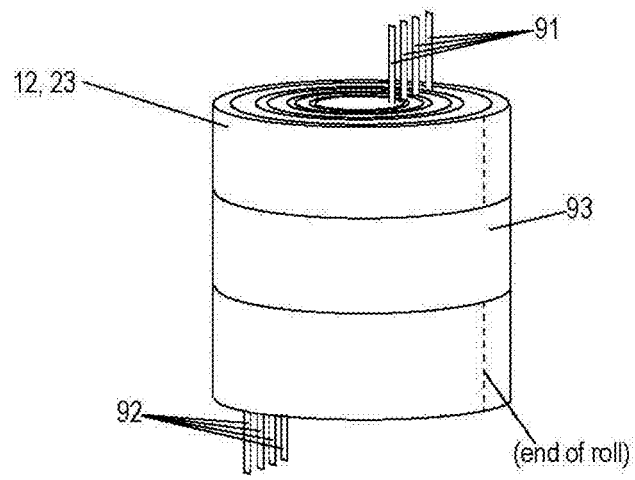
FIG. 27 depicts an exemplary rolled up storage cell with the plurality of leads included.

As shown in FIG. 27, the foregoing assembly technique results in a storage cell 12 that includes at least one set of aligned leads. A first set of aligned leads 91 are particularly useful when coupling the rolled storage cell 23 to one of the negative contact 55 and the positive contact 56, while a set of opposing aligned leads 92 provide for coupling the energy storage media 1 to an opposite contact (55, 56).

The rolled storage cell 23 may be surrounded by a wrapper 93. The wrapper 93 may be realized in a variety of embodiments. For example, the wrapper 93 may be provided as KAPTON™ tape (which is a polyimide film developed by DuPont of Wilmington Del.), or PTFE tape. In this example, the KAPTON™ tape surrounds and is adhered to the rolled storage cell 23. The wrapper 93 may be provided without adhesive, such as a tightly fitting wrapper 93 that is slid onto the rolled storage cell 23. The wrapper 93 may be manifested more as a bag, such as one that generally engulfs the rolled storage cell 23 (e.g., such as the envelope 83 of FIG. 11, discussed above). In some of these embodiments, the wrapper 93 may include a material that functions as a shrink-wrap would, and thereby provides an efficient physical (and in some embodiments, chemical) enclosure of the rolled storage cell 23. Generally, the wrapper 93 is formed of a material that does not interfere with electrochemical functions of the ultracapacitor 10. The wrapper 93 may also provide partial coverage as needed, for example, to aid insertion of the rolled storage cell 23.

In some embodiments, the negative leads and the positive leads are located on opposite sides of the rolled storage cell 23 (in the case of a jelly-roll type rolled storage cell 23, the leads for the negative polarity and the leads for the positive polarity may be diametrically opposed). Generally, placing the leads for the negative polarity and the leads for the positive polarity on opposite sides of the rolled storage cell 23 is performed to facilitate construction of the rolled storage cell 23 as well as to provide improved electrical separation.

In some embodiments, once the aligned leads 91, 92 are assembled, each of the plurality of aligned leads 91, 92 are bundled together (in place) such that a shrink-wrap (not shown) may be disposed around the plurality of aligned leads 91, 92. Generally, the shrink-wrap is formed of PTFE, however, any compatible material may be used.

Figure 28:
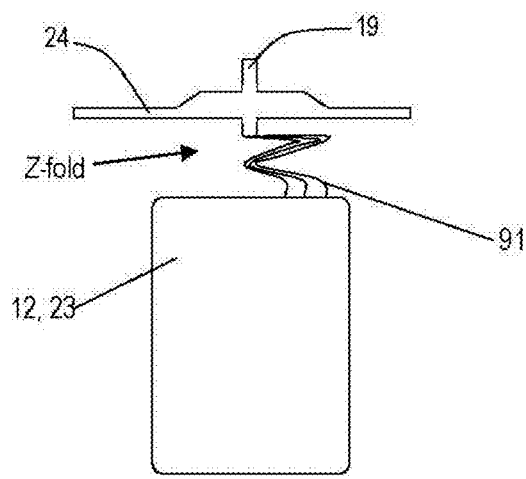
FIG. 28 depicts, according to certain embodiments, a Z-fold imparted into aligned leads (i.e., a terminal) coupled to a storage cell.

In some embodiments, once shrink-wrap material has been placed about the aligned leads 91, the aligned leads 91 are folded into a shape to be assumed when the ultracapacitor 10 has been assembled. That is, with reference to FIG. 28, it may be seen that the aligned leads assume a "Z" shape. After imparting a "Z-fold" into the aligned leads 91, 92 and applying the shrink-wrap, the shrink-wrap may be heated or otherwise activated such that the shrink-wrap shrinks into place about the aligned leads 91, 92. Accordingly, in some embodiments, the aligned leads 91, 92 may be strengthened and protected by a wrapper. Use of the Z-fold is particularly useful when coupling the energy storage media 1 to the feed-through 19 disposed within the cap 24.

Additionally, other embodiments for coupling each set of aligned leads 91, 92 (i.e., each terminal 8) to a respective contact 55, 56 may be practiced. For example, in one embodiment, an intermediate lead is coupled to the one of the feed-through 19 and the housing 7, such that coupling with a respective set of aligned leads 91, 92 is facilitated.

Furthermore, materials used may be selected according to properties such as reactivity, dielectric value, melting point, adhesion to other materials, weldability, coefficient of friction, cost, and other such factors. Combinations of materials (such as layered, mixed, or otherwise combined) may be used to provide for desired properties.

v. Particular Ultracapacitor Embodiments

Physical aspects of an exemplary ultracapacitor 10 of the present invention are shown below. Note that in the following tables, the terminology "tab" generally refers to the "lead" as discussed above; the terms "bridge" and "jumper" also making reference to aspects of the lead (for example, the bridge may be coupled to the feed-through, or "pin," while the jumper is useful for connecting the bridge to the tabs, or leads). Use of various connections may facilitate the assembly process, and take advantage of certain assembly techniques. For example, the bridge may be laser welded or resistance welded to the pin, and coupled with an ultrasonic weld to the jumper.

TABLE 6

Weights of Complete Cell With Electrolyte

| Component | Weight (grams) | Percent of total |
|---|---|---|
| SS Can (body of the housing) | 14.451 | 20.87% |
| SS Top cover (cap) | 5.085 | 7.34% |
| Tantalum glass-metal Seal | 12.523 | 18.09% |
| SS/Al Clad Bottom | 10.150 | 14.66% |
| Tack (seal for fill hole) | 0.200 | 0.29% |
| Inner Electrode (cleared, no tabs) | 3.727 | 5.38% |
| Inner Electrode Aluminum | 1.713 | 2.47% |
| Inner Electrode Carbon | 2.014 | 2.91% |
| Outer Electrode (cleared, no tabs) | 4.034 | 5.83% |
| Outer Electrode Aluminum | 1.810 | 2.61% |
| Outer Electrode Carbon | 2.224 | 3.21% |
| Separator | 1.487 | 2.15% |
| Alum. Jelly roll Tabs (all 8) | 0.407 | 0.59% |
| Ta/Al clad bridge | 0.216 | 0.31% |
| Alum. Jumper (bridge-JR tabs) | 0.055 | 0.08% |
| Teflon heat shrink | 0.201 | 0.29% |
| AES | 16.700 | 24.12% |
| Total Weight | 69.236 | 100.00% |

TABLE 7

Weights of Complete Cell Without Electrolyte

| Component | Weight (grams) | Percent of total |
|---|---|---|
| SS Can | 14.451 | 27.51% |
| SS Top cover | 5.085 | 9.68% |
| Tantalum glass-metal Seal | 12.523 | 23.84% |
| SS/Al Clad Bottom | 10.150 | 19.32% |
| Tack | 0.200 | 0.38% |
| Inner Electrode (cleared, no tabs) | 3.727 | 7.09% |
| Outer Electrode (cleared, no tabs) | 4.034 | 7.68% |
| Separator | 1.487 | 2.83% |
| Alum. Jelly roll Tabs (all 8) | 0.407 | 0.77% |
| Ta/Al clad bridge | 0.216 | 0.41% |
| Alum. Jumper (bridge-JR tabs) | 0.055 | 0.10% |
| Teflon heat shrink | 0.201 | 0.38% |
| Total Weight | 52.536 | 100.00% |

TABLE 8

Weights of Cell Components in Full Cell with Electrolyte

| Component | Weight (grams) | Percent of total |
|---|---|---|
| Can, covers, seal, bridge, jumper, heat shrink, tack | 42.881 | 61.93% |
| Jelly Roll with Electrodes, tabs, separator | 9.655 | 13.95% |
| Electrolyte | 16.700 | 24.12% |
| Total Weight | 69.236 | 100.00% |

TABLE 9

Weights of Electrode

| Component | Weight (grams) | Percent of total |
|---|---|---|
| Inner electrode carbon | 2.014 | 25.95% |
| Inner electrode aluminum | 1.713 | 22.07% |
| Outer electrode carbon | 2.224 | 28.66% |
| Outer electrode aluminum | 1.810 | 23.32% |
| Total Weight | 7.761 | 100.00% |

Generally, the ultracapacitor 10 may be used under a variety of environmental conditions and demands. For example, terminal voltage may range from about 100 mV to 10 V. Ambient temperatures may range from about minus 40 degrees Celsius to plus 210 degrees Celsius. Typical high temperature ambient temperatures range from plus 60 degrees Celsius to plus 210 degrees Celsius.

Tables 10 and 11 provide comparative performance data for these embodiments of the ultracapacitor 10. The performance data was collected for a variety of operating conditions as shown.

TABLE 10

Comparative Performance Data

| Cell # | Temperature (° C.) | Voltage (V) | Time (Hrs) | ESR Initial (mOhm) | % ESR Increase | Capacitance Initial (F) | % Capacitance Decrease | Cell Weight (g) | Ending Current (mA) |
|---|---|---|---|---|---|---|---|---|---|
| D2011-09 | 150 | 1.25 | 1500 | 30 | 0 | 93 | 5 | — | 0.5 |
| C1041-02 | 150 | 1.5 | 1150 | 45 | 60 | 32 | — | 28.35 | 0.5 |
| C2021-01 | 150 | 1.5 | 1465 | 33 | 100 | 32 | 70 | 26.61 | 0.8 |
| D5311-05 | 150 | 1.6 | 150 | 9 | 10 | 87 | 4 | — | 5 |
| C6221-05 | 150 | 1.75 | 340 | 15 | 50 | — | — | 38.31 | 1 |
| C6221-05 | 150 | 1.75 | 500 | 15 | 100 | — | — | 38.31 | 2 |
| C6221-05 | 150 | 1.75 | 600 | 15 | 200 | — | — | 38.31 | 2 |
| C6221-05 | 150 | 1.75 | 650 | 15 | 300 | — | — | 38.31 | 2 |
| D1043-02 | 150 | 1.75 | 615 | 43 | 50 | 100 | — | — | 3 |
| D1043-02 | 150 | 1.75 | 700 | 43 | 100 | 100 | — | — | 3 |
| C5071-01 | 150 | 1.75 | 600 | 26 | 100 | 27 | 32 | — | 2 |
| C5071-01 | 150 | 1.75 | 690 | 26 | 200 | 27 | 35 | — | 2 |
| C5071-01 | 150 | 1.75 | 725 | 26 | 300 | 27 | 50 | — | 2 |
| C8091-06 | 125 | 1.75 | 500 | 38 | 5 | 63 | 11 | 37.9 | 0.5 |
| C9021-02 | 125 | 1.75 | 1250 | 37 | 10 | 61 | — | 39.19 | 0.3 |
| D5011-02 | 125 | 1.9 | 150 | 13 | 0 | 105 | 0 | — | 1.4 |
| C8091-06 | 125 | 2 | 745 | 41 | 22 | 56 | — | 37.9 | 1.2 |
| D2011-08 | 175 | 1 | 650 | 33 | 12 | 89 | 30 | — | 4 |
| D1043-10 | 175 | 1.3 | 480 | 30 | 100 | 93 | 50 | — | 6.5 |
| C2021-04 | 175 | 1.4 | 150 | 35 | 100 | 27 | — | 27.17 | 3.5 |
| C4041-04 | 210 | 0.5 | 10 | 28 | 0 | 32 | — | 28.68 | 1 |
| C4041-04 | 210 | 0.5 | 20 | 28 | 0 | 32 | — | 28.68 | 7 |
| C4041-04 | 210 | 0.5 | 50 | 28 | 100 | 32 | — | 28.68 | 18 |

TABLE 11

Comparative Performance Data

| Cell # | T (° C.) | Voltage (V) | Time (Hrs) | ESR Initial (mOhm) | Initial Capacitance (F) | Leakage Current (mA) | Volumetric ESR (Ohms x cc) | Volumetric Capacitance (F/cc) | Volumetric Leakage Current (mA/cc) | % ESR Increase | % Capacitance Decrease | Volume (cc) |
|---|---|---|---|---|---|---|---|---|---|---|---|---|
| D2011-09 | 150 | 1.25 | 1500 | 30 | 93 | 0.5 | 0.75 | 3.72 | 0.02 | 0 | 5 | 25 |
| C2021-01 | 150 | 1.5 | 1465 | 33 | 32 | 0.75 | 0.396 | 2.67 | 0.06 | 100 | 5 | 12 |
| C5071-01 | 150 | 1.75 | 600 | 26 | 27 | 2 | 0.338 | 2.08 | 0.15 | 100 | 32 | 13 |
| C5071-01 | 150 | 1.75 | 690 | 26 | 27 | 2 | 0.338 | 2.08 | 0.15 | 200 | 35 | 13 |
| C5071-01 | 150 | 1.75 | 725 | 26 | 27 | 2 | 0.338 | 2.08 | 0.15 | 300 | 50 | 13 |
| C8091-06 | 125 | 1.75 | 500 | 38 | 63 | 0.5 | 0.494 | 4.85 | 0.04 | 5 | 11 | 13 |
| C9021-02 | 125 | 1.75 | 1250 | 37 | 61 | 0.25 | 0.481 | 4.69 | 0.02 | 10 | 11 | 13 |
| D2011-08 | 175 | 1 | 650 | 33 | 89 | 4 | 0.825 | 3.56 | 0.16 | 12 | 30 | 25 |
| D1043-10 | 175 | 1.3 | 480 | 30 | 93 | 6.5 | 0.75 | 3.72 | 0.26 | 100 | 50 | 25 |
| C4041-04 | 210 | 0.5 | 50 | 28 | 32 | 18 | 0.336 | 2.67 | 1.50 | 100 | 50 | 12 |

Thus, data provided in Tables 10 and 11 demonstrate that the teachings herein enable performance of ultracapacitors in extreme conditions. Ultracapacitors fabricated accordingly may, for example, exhibit leakage currents of less than about 1 mA per milliliter of cell volume, and an ESR increase of less than about 100 percent in 500 hours (while held at voltages of less than about 2 V and temperatures less than about 150 degrees Celsius). As trade-offs may be made among various demands of the ultracapacitor (for example, voltage and temperature) performance ratings for the ultracapacitor may be managed (for example, a rate of increase for ESR, capacitance, etc) may be adjusted to accommodate a particular need. Note that in reference to the foregoing, "performance ratings" is given a generally conventional definition, which is with regard to values for parameters describing conditions of operation.

Another exemplary ultracapacitor tested included an AES comprising 1-butyl-3-methylimidazolium bis(trifluoromethylsulfonyl)imide.

Another exemplary ultracapacitor tested included an AES comprising 1-ethyl-3-methylimidazolium tetrafluoroborate.

Another exemplary ultracapacitor tested included an AES comprising 1-ethyl-3-methylimidazolium tetracyanoborate.

Another exemplary ultracapacitor tested included an AES comprising 1-hexyl-3-methylimidazolium tetracyanoborate.

Another exemplary ultracapacitor tested included an AES comprising 1-butyl-1-methylpyrrolidinium bis(trifluoromethylsulfonyl)imide Another exemplary ultracapacitor tested included an AES comprising 1-butyl-1-methylpyrrolidinium tris(pentafluoroethyl)trifluorophosphate.

Another exemplary ultracapacitor tested included an AES comprising 1-butyl-1-methylpyrrolidinium tetracyanoborate.

Another exemplary ultracapacitor tested included an AES comprising 1-butyl-3-methylimidazolium trifluoromethanesulfonate.

Another exemplary ultracapacitor tested included an AES comprising 1-ethyl-3-methylimidazolium tetracyanoborate.

Another exemplary ultracapacitor tested included an AES comprising 1-ethyl-3-methylimidazolium and 1-butyl-1-methylpyrrolidinium and tetracyanoborate.

Another exemplary ultracapacitor tested included an AES comprising 1-butyl-1-methylpyrrolidinium and tetracyanoborate and ethyl isopropyl sulfone.

Note that measures of capacitance as well as ESR, as presented in Table 10 and elsewhere herein, followed generally known methods. Consider first, techniques for measuring capacitance.

Capacitance may be measured in a number of ways. One method involves monitoring the voltage presented at the capacitor terminals while a known current is drawn from (during a "discharge") or supplied to (during a "charge") of the ultracapacitor. More specifically, we may use the fact that an ideal capacitor is governed by the equation:

$$I = C*dV/dt,$$

where I represents charging current, C represents capacitance and dV/dt represents the time-derivative of the ideal capacitor voltage, V. An ideal capacitor is one whose internal resistance is zero and whose capacitance is voltage-independent, among other things. When the charging current, I, is constant, the voltage V is linear with time, so dV/dt may be computed as the slope of that line, or as DeltaV/DeltaT. However, this method is generally an approximation and the voltage difference provided by the effective series resistance (the ESR drop) of the capacitor should be considered in the computation or measurement of a capacitance. The effective series resistance (ESR) may generally be a lumped element approximation of dissipative or other effects within a capacitor. Capacitor behavior is often derived from a circuit model comprising an ideal capacitor in series with a resistor having a resistance value equal to the ESR. Generally, this yields good approximations to actual capacitor behavior.

In one method of measuring capacitance, one may largely neglect the effect of the ESR drop in the case that the internal resistance is substantially voltage-independent, and the charging or discharging current is substantially fixed. In that case, the ESR drop may be approximated as a constant and is naturally subtracted out of the computation of the change in voltage during said constant-current charge or discharge. Then, the change in voltage is substantially a reflection of the change in stored charge on the capacitor. Thus, that change in voltage may be taken as an indicator, through computation, of the capacitance.

For example, during a constant-current discharge, the constant current, I, is known. Measuring the voltage change during the discharge, DeltaV, during a measured time interval DeltaT, and dividing the current value I by the ratio DeltaV/DeltaT, yields an approximation of the capacitance. When I is measured in amperes, DeltaV in volts, and DeltaT in seconds, the capacitance result will be in units of Farads.

Turning to estimation of ESR, the effective series resistance (ESR) of the ultracapacitor may also be measured in a number of ways. One method involves monitoring the voltage presented at the capacitor terminals while a known current is drawn from (during a "discharge") or supplied to (during a "charge") the ultracapacitor. More specifically, one may use the fact that ESR is governed by the equation:

$$V = I*R,$$

where I represents the current effectively passing through the ESR, R represents the resistance value of the ESR, and V represents the voltage difference provided by the ESR (the ESR drop). ESR may generally be a lumped element approximation of dissipative or other effects within the ultracapacitor. Behavior of the ultracapacitor is often derived from a circuit model comprising an ideal capacitor in series with a resistor having a resistance value equal to the ESR. Generally, this yields good approximations of actual capacitor behavior.

In one method of measuring ESR, one may begin drawing a discharge current from a capacitor that had been at rest (one that had not been charging or discharging with a substantial current). During a time interval in which the change in voltage presented by the capacitor due to the change in stored charge on the capacitor is small compared to the measured change in voltage, that measured change in voltage is substantially a reflection of the ESR of the capacitor. Under these conditions, the immediate voltage change presented by the capacitor may be taken as an indicator, through computation, of the ESR.

For example, upon initiating a discharge current draw from a capacitor, one may be presented with an immediate voltage change Delta V over a measurement interval DeltaT. So long as the capacitance of the capacitor, C, discharged by the known current, I, during the measurement interval, DeltaT, would yield a voltage change that is small compared to the measured voltage change, DeltaV, one may divide Delta V during the time interval DeltaT by the discharge current, I, to yield an approximation to the ESR. When I is measured in amperes and Delta V in volts, the ESR result will have units of Ohms.

Both ESR and capacitance may depend on ambient temperature. Therefore, a relevant measurement may require the user to subject the ultracapacitor 10 to a specific ambient temperature of interest during the measurement.

Performance requirements for leakage current are generally defined by the environmental conditions prevalent in a particular application. For example, with regard to a capacitor having a volume of 20 mL, a practical limit on leakage current may fall below 100 mA.

Nominal values of normalized parameters may be obtained by multiplying or dividing the normalized parameters (e.g. volumetric leakage current) by a normalizing characteristic (e.g. volume). For instance, the nominal leakage current of an ultracapacitor having a volumetric leakage current of 10 mA/cc and a volume of 50 cc is the product of the volumetric leakage current and the volume, 500 mA. Meanwhile the nominal ESR of an ultracapacitor having a volumetric ESR of 20 mOhm·cc and a volume of 50 cc is the quotient of the volumetric ESR and the volume, 0.4 mOhm.

Designs of the Present Invention

Any designs that are novel for their aesthetic appearance, are intended to be included as part of the present invention.

INCORPORATION BY REFERENCE

The entire contents of all patents, published patent applications and other references cited herein are hereby expressly incorporated herein in their entireties by reference.

EQUIVALENTS

Those skilled in the art will recognize, or be able to ascertain using no more than routine experimentation, numerous equivalents to the specific procedures described herein. Such equivalents were considered to be within the scope of this invention and are covered by the following claims. Moreover, any numerical or alphabetical ranges provided herein are intended to include both the upper and lower value of those ranges. In addition, any listing or grouping is intended, at least in one embodiment, to represent a shorthand or convenient manner of listing independent embodiments; as such, each member of the list should be considered a separate embodiment.

In support of the teachings herein, various analysis components may be used, including a digital system and/or an analog system. The system(s) may have components such as a processor, storage media, memory, input, output, communications link (wired, wireless, pulsed mud, optical or other), user interfaces, software and firmware programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

It should be recognized that the teachings herein are merely illustrative and are not limiting of the invention. Further, one skilled in the art will recognize that additional components, configurations, arrangements and the like may be realized while remaining within the scope of this invention. For example, configurations of layers, electrodes, leads, terminals, contacts, feed-throughs, caps and the like may be varied from embodiments disclosed herein. Generally, design and/or application of components of the ultracapacitor and ultracapacitors making use of the electrodes are limited only by the needs of a system designer, manufacturer, operator and/or user and demands presented in any particular situation.

Further, various other components may be included and called upon for providing for aspects of the teachings herein. For example, an additional power supply (e.g., at least one of a generator, a wireline, a remote supply and a chemical battery), cooling component, heating component, pressure retaining component, insulation, actuator, sensor, electrodes, transmitter, receiver, transceiver, antenna, controller, electrical unit or electromechanical unit may be included in support of the various aspects discussed herein or in support of other functions beyond this disclosure.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention but to be construed by the claims appended herein.

What is claimed is:

1. A rotational inertial energy generator (RIEG) comprising
    an inertial mass rotating around a central axis;
    a ratcheting assembly that prevents the mass from rotating in one direction while providing a free-wheeling motion in the other direction; and
    a rotor/stator assembly, wherein the rotor/stator assembly is configured to translate shock and vibration energy of the inertial mass into electrical energy.

2. The RIEG of claim 1, wherein the RIEG is configured to provide electrical energy to a downhole tool.

3. The RIEG of claim 1, wherein the RIEG is disposed in a hermetically sealed housing.

4. A power supply adapted to supply power to a downhole tool, the power supply comprising:
    an energy generator coupled to a control circuit and a rechargeable energy storage device that is configured to operate at a temperature within a temperature range between about minus 40 degrees Celsius to about 210 degrees Celsius;
    wherein the energy generator comprises an inertial energy generator (IEG) that is configured for translating shock and vibration energy experienced by the IEG, into electrical energy; and wherein the control circuit is configured for receiving electrical energy from the IEG and storing the electrical energy in the rechargeable energy storage device.

5. The power supply of claim 4, wherein the IEG is directionally biased.

6. The power supply of claim 4, further comprising:
    at least one additional energy generator coupled to the control circuit;
    wherein the at least one additional energy generator comprises an IEG that is configured for translating shock and vibration energy experienced by the IEG into electrical energy; and wherein the control circuit is further configured for receiving electrical energy from the at least one additional energy generator and storing the electrical energy in the rechargeable energy storage device.

7. The power supply of claim 6, wherein each IEG is oriented to harvest vibrational energy of a predetermined direction.

8. The power supply of claim 7, wherein each IEG is aligned in the same direction.

9. The power supply of claim 7, wherein each IEG is aligned in a different direction.

10. The power supply of claim 4, wherein the IEG is an RIEG of claim 1, which comprises a ratchet and pawl.

11. The power supply of claim 10, wherein the RIEG comprises an eccentric mass.

12. The power supply of claim 10, wherein the RIEG comprises a concentric mass.

13. The power supply of claim 10, wherein the RIEG is a directionally biased.

14. The power supply of claim 4, wherein the power supply is configured to continuously provide power to a load.

15. The power supply of claim 4, wherein the power supply is configured to periodically provide power to a load.

16. The power supply of claim 4, wherein the power supply is configured to provide alternating current (AC) to a load.

17. The power supply of claim 4, wherein the power supply is configured to provide direct current (DC) to the load.

18. The power supply of claim 4, wherein the power supply is disposed in a hermetically sealed housing.

19. The power supply of claim 4, wherein the rechargeable energy storage device is an ultracapacitor string.

20. The power supply of claim 19, wherein the ultracapacitor is configured to operate at a temperature within a temperature range between about 80 degrees Celsius to about 210 degrees Celsius.

21. A method of generating power comprising
    rotating an inertial mass around a central axis;
    preventing the mass from rotating in one direction while providing a freewheeling motion in the other direction with a ratcheting assembly; and
    translating shock and vibration energy of the inertial mass into electrical energy.

22. The method of claim 21, the method comprises utilizing a RIEG of claim 1.

23. The method of claim 21, wherein the shock and vibration energy of the inertial mass is generated by shock and vibration experienced in a downhole environment.

24. The method of claim 21, further comprising providing power directly to a downhole tool.

25. The method of claim 21, further comprising storing power in a rechargeable energy storage device before use by a downhole tool.

* * * * *